(12) United States Patent
McBride et al.

(10) Patent No.: US 8,240,140 B2
(45) Date of Patent: Aug. 14, 2012

(54) HIGH-EFFICIENCY ENERGY-CONVERSION BASED ON FLUID EXPANSION AND COMPRESSION

(75) Inventors: Troy O. McBride, Norwich, VT (US); Michael Neil Scott, West Lebanon, NH (US); Jeffrey Modderno, Andover, MA (US); Benjamin R. Bollinger, Windsor, VT (US)

(73) Assignee: SustainX, Inc., Seabrook, NH (US)

( * ) Notice: Subject to any disclaimer, the term of this patent is extended or adjusted under 35 U.S.C. 154(b) by 0 days.

(21) Appl. No.: 13/221,559

(22) Filed: Aug. 30, 2011

(65) Prior Publication Data

US 2012/0006013 A1   Jan. 12, 2012

Related U.S. Application Data

(63) Continuation-in-part of application No. 12/639,703, filed on Dec. 16, 2009, which is a continuation-in-part of application No. 12/421,057, filed on Apr. 9, 2009, now Pat. No. 7,832,207, which is a continuation-in-part of application No. 12/481,235, filed on Jun. 9, 2009, now Pat. No. 7,802,426, application No. 13/221,559, which is a continuation-in-part of application No. 12/794,237, filed on Jun. 4, 2010, which is a continuation-in-part of application No. 12/879,595, filed on Sep. 10, 2010, now Pat. No. 8,037,678.

(60) Provisional application No. 61/378,108, filed on Aug. 30, 2010, provisional application No. 61/421,964, filed on Dec. 10, 2010, provisional application No. 61/433,016, filed on Jan. 14, 2011, provisional application No. 61/486,550, filed on May 16, 2011, provisional application No. 61/513,215, filed on Jul. 29, 2011, provisional application No. 61/148,691, filed on Jan. 30, 2009, provisional application No. 61/043,630, filed on Apr. 9, 2008, provisional application No. 61/059,964, filed on Jun. 9, 2008, provisional application No. 61/166,448, filed on Apr. 3, 2009, provisional application No. 61/184,166, filed on Jun. 4, 2009, provisional application No. 61/223,564, filed on Jul. 7, 2009, provisional application No. 61/227,222, filed on Jul. 21, 2009, (Continued)

(51) Int. Cl.
*F16D 31/02* (2006.01)
(52) U.S. Cl. .............................. 60/327; 60/410; 60/415
(58) Field of Classification Search .................... 60/327, 60/370, 371, 398, 408, 410, 413, 415
See application file for complete search history.

(56) References Cited

U.S. PATENT DOCUMENTS 114,297 A   5/1871   Ivens et al.
(Continued)

FOREIGN PATENT DOCUMENTS

BE   898225   3/1984
(Continued)

OTHER PUBLICATIONS

"Hydraulic Transformer Supplies Continuous High Pressure," Machine Design, Penton Media, vol. 64, No. 17, (Aug. 1992), 1 page.

(Continued)

*Primary Examiner* — Michael Leslie
(74) *Attorney, Agent, or Firm* — Bingham McCutchen LLP

(57) ABSTRACT

In various embodiments, motor-pump efficiency is increased by limiting the fluid pressure communicated to the motor-pump to a range smaller than that communicated by other components of an energy storage and/or recovery system.

20 Claims, 17 Drawing Sheets

Related U.S. Application Data provisional application No. 61/251,965, filed on Oct. 15, 2009, provisional application No. 61/184,191, filed on Jun. 4, 2009, provisional application No. 61/222,286, filed on Jul. 1, 2009, provisional application No. 61/242,526, filed on Sep. 15, 2009, provisional application No. 61/256,484, filed on Oct. 30, 2009, provisional application No. 61/241,568, filed on Sep. 11, 2009, provisional application No. 61/251,965, filed on Oct. 15, 2009, provisional application No. 61/318,060, filed on Mar. 26, 2010, provisional application No. 61/326,453, filed on Apr. 21, 2010.

(56) References Cited

U.S. PATENT DOCUMENTS

| | | | |
|---|---|---|---|
| 224,081 | A | 2/1880 | Eckart |
| 233,432 | A | 10/1880 | Pitchford |
| 1,353,216 | A | 9/1920 | Carlson |
| 1,635,524 | A | 7/1927 | Aikman |
| 1,681,280 | A | 8/1928 | Bruckner |
| 2,025,142 | A | 12/1935 | Zahm et al. |
| 2,042,991 | A | 6/1936 | Harris, Jr. |
| 2,141,703 | A | 12/1938 | Bays |
| 2,280,100 | A | 4/1942 | SinQleton |
| 2,280,845 | A | 4/1942 | Parker |
| 2,404,660 | A | 7/1946 | Rouleau |
| 2,420,098 | A | 5/1947 | Rouleau |
| 2,486,081 | A | 10/1949 | Weenen |
| 2,539,862 | A | 1/1951 | Rushing |
| 2,628,564 | A | 2/1953 | Jacobs |
| 2,632,995 | A | 3/1953 | Noe |
| 2,712,728 | A | 7/1955 | Lewis et al. |
| 2,813,398 | A | 11/1957 | Wilcox |
| 2,829,501 | A | 4/1958 | Walls |
| 2,880,759 | A | 4/1959 | Wisman |
| 3,041,842 | A | 7/1962 | Heinecke |
| 3,100,965 | A | 8/1963 | Blackburn |
| 3,236,512 | A | 2/1966 | Caslav et al. |
| 3,269,121 | A | 8/1966 | Ludwig |
| 3,538,340 | A | 11/1970 | LanQ |
| 3,608,311 | A | 9/1971 | Roesel, Jr. |
| 3,648,458 | A | 3/1972 | McAlister |
| 3,650,636 | A | 3/1972 | Eskeli |
| 3,672,160 | A | 6/1972 | Kim |
| 3,677,008 | A | 7/1972 | Koutz |
| 3,704,079 | A | 11/1972 | Berlyn |
| 3,757,517 | A | 9/1973 | Rigollot |
| 3,793,848 | A | 2/1974 | Eskeli |
| 3,801,793 | A | 4/1974 | Goebel |
| 3,803,847 | A | 4/1974 | McAlister |
| 3,839,863 | A | 10/1974 | Frazier |
| 3,847,182 | A | 11/1974 | Greer |
| 3,895,493 | A | 7/1975 | Rigollot |
| 3,903,696 | A | 9/1975 | Carman |
| 3,935,469 | A | 1/1976 | Haydock |
| 3,939,356 | A | 2/1976 | Loane |
| 3,942,323 | A | 3/1976 | Maillet |
| 3,945,207 | A | 3/1976 | Hyatt |
| 3,948,049 | A | 4/1976 | Ohms et al. |
| 3,952,516 | A | 4/1976 | Lapp |
| 3,952,723 | A | 4/1976 | Browning |
| 3,958,899 | A | 5/1976 | Coleman, Jr. et al. |
| 3,986,354 | A | 10/1976 | Erb |
| 3,988,592 | A | 10/1976 | Porter |
| 3,988,897 | A | 11/1976 | Strub |
| 3,990,246 | A | 11/1976 | Wilmers |
| 3,991,574 | A | 11/1976 | Frazier |
| 3,996,741 | A | 12/1976 | Herberg |
| 3,998,049 | A | 12/1976 | McKinley et al. |
| 3,999,388 | A | 12/1976 | Nystrom |
| 4,008,006 | A | 2/1977 | Bea |
| 4,027,993 | A | 6/1977 | Wolff |
| 4,030,303 | A | 6/1977 | Kraus et al. |
| 4,031,702 | A | 6/1977 | Burnett et al. |
| 4,031,704 | A | 6/1977 | Moore et al. |
| 4,041,708 | A | 8/1977 | Wolff |
| 4,050,246 | A | 9/1977 | Bourquardez |
| 4,055,950 | A | 11/1977 | Grossman |
| 4,058,979 | A | 11/1977 | Germain |
| 4,075,844 | A | 2/1978 | Schiferli |
| 4,089,744 | A | 5/1978 | Cahn |
| 4,095,118 | A | 6/1978 | Ratbun |
| 4,100,745 | A | 7/1978 | Gyarmathy et al. |
| 4,104,955 | A | 8/1978 | Murphy |
| 4,108,077 | A | 8/1978 | Laing |
| 4,109,465 | A | 8/1978 | Plen |
| 4,110,987 | A | 9/1978 | Cahn et al. |
| 4,112,311 | A | 9/1978 | Theyse |
| 4,117,342 | A | 9/1978 | Melley, Jr. |
| 4,117,696 | A | 10/1978 | Fawcett et al. |
| 4,118,637 | A | 10/1978 | Tackett |
| 4,124,182 | A | 11/1978 | Loeb |
| 4,126,000 | A | 11/1978 | Funk |
| 4,136,432 | A | 1/1979 | Melley, Jr. |
| 4,142,368 | A | 3/1979 | Mantegani |
| 4,147,204 | A | 4/1979 | Pfenninger |
| 4,149,092 | A | 4/1979 | Cros |
| 4,150,547 | A | 4/1979 | Hobson |
| 4,154,292 | A | 5/1979 | Herrick |
| 4,167,372 | A | 9/1979 | Tackett |
| 4,170,878 | A | 10/1979 | Jahnig |
| 4,173,431 | A | 11/1979 | Smith |
| 4,189,925 | A | 2/1980 | Long |
| 4,197,700 | A | 4/1980 | Jahnig |
| 4,197,715 | A | 4/1980 | Fawcett et al. |
| 4,201,514 | A | 5/1980 | Huetter |
| 4,204,126 | A | 5/1980 | Diggs |
| 4,206,608 | A | 6/1980 | Bell |
| 4,209,982 | A | 7/1980 | Pitts |
| 4,220,006 | A | 9/1980 | Kindt |
| 4,229,143 | A | 10/1980 | Pucher |
| 4,229,661 | A | 10/1980 | Mead et al. |
| 4,232,253 | A | 11/1980 | Mortelmans |
| 4,237,692 | A | 12/1980 | Ahrens et al. |
| 4,242,878 | A | 1/1981 | Brinkerhoff |
| 4,246,978 | A | 1/1981 | Schulz et al. |
| 4,262,735 | A | 4/1981 | Courrege |
| 4,273,514 | A | 6/1981 | Shore et al. |
| 4,274,010 | A | 6/1981 | Lawson-tancred |
| 4,275,310 | A | 6/1981 | Summers et al. |
| 4,281,256 | A | 7/1981 | Ahrens |
| 4,293,323 | A | 10/1981 | Cohen |
| 4,299,198 | A | 11/1981 | Woodhull |
| 4,302,684 | A | 11/1981 | Gogins |
| 4,304,103 | A | 12/1981 | Hamrick |
| 4,311,011 | A | 1/1982 | Lewis |
| 4,316,096 | A | 2/1982 | Syverson |
| 4,317,439 | A | 3/1982 | Emmerling |
| 4,335,867 | A | 6/1982 | Bihlmaier |
| 4,340,822 | A | 7/1982 | Gregg |
| 4,341,072 | A | 7/1982 | Clyne |
| 4,348,863 | A | 9/1982 | Taylor et al. |
| 4,353,214 | A | 10/1982 | Gardner |
| 4,354,420 | A | 10/1982 | Bianchetta |
| 4,355,956 | A | 10/1982 | Ringrose et al. |
| 4,358,250 | A | 11/1982 | Payne |
| 4,367,786 | A | 1/1983 | Hafner et al. |
| 4,368,692 | A | 1/1983 | Kita |
| 4,368,775 | A | 1/1983 | Ward |
| 4,370,559 | A | 1/1983 | Langley, Jr. |
| 4,372,114 | A | 2/1983 | Burnham |
| 4,375,387 | A | 3/1983 | deFilippi et al. |
| 4,380,419 | A | 4/1983 | Morton |
| 4,392,062 | A | 7/1983 | Bervig |
| 4,393,752 | A | 7/1983 | Meier |
| 4,411,136 | A | 10/1983 | Funk |
| 4,416,114 | A | 11/1983 | Martini |
| 4,421,661 | A | 12/1983 | Claar et al. |
| 4,428,711 | A | 1/1984 | Archer |
| 4,435,131 | A | 3/1984 | Ruben |
| 4,444,011 | A | 4/1984 | Kolin |
| 4,446,698 | A | 5/1984 | Benson |

| | | | | | | |
|---|---|---|---|---|---|---|
| 4,447,738 A | 5/1984 | Allison | | 5,271,225 A | 12/1993 | Adamides |
| 4,449,372 A | 5/1984 | Rilett | | 5,279,206 A | 1/1994 | Krantz |
| 4,452,046 A | 6/1984 | Valentin | | 5,296,799 A | 3/1994 | Davis |
| 4,454,429 A | 6/1984 | Buonome | | 5,309,713 A | 5/1994 | Vassallo |
| 4,454,720 A | 6/1984 | Leibowitz | | 5,321,946 A | 6/1994 | Abdelmalek |
| 4,455,834 A | 6/1984 | Earle | | 5,327,987 A | 7/1994 | Abdelmalek |
| 4,462,213 A | 7/1984 | Lewis | | 5,339,633 A | 8/1994 | Fujii et al. |
| 4,474,002 A | 10/1984 | Perry | | 5,341,644 A | 8/1994 | Nelson |
| 4,476,851 A | 10/1984 | Brugger et al. | | 5,344,627 A | 9/1994 | Fujii et al. |
| 4,478,553 A | 10/1984 | Leibowitz et al. | | 5,364,611 A | 11/1994 | Iijima et al. |
| 4,489,554 A | 12/1984 | Otters | | 5,365,980 A | 11/1994 | Deberardinis |
| 4,491,739 A | 1/1985 | Watson | | 5,375,417 A | 12/1994 | Barth |
| 4,492,539 A | 1/1985 | Specht | | 5,379,589 A | 1/1995 | Cohn et al. |
| 4,493,189 A | 1/1985 | Slater | | 5,384,489 A | 1/1995 | Bellac |
| 4,496,847 A | 1/1985 | Parkins | | 5,387,089 A | 2/1995 | Stogner et al. |
| 4,498,848 A | 2/1985 | Petrovsky et al. | | 5,394,693 A | 3/1995 | Plyter |
| 4,502,284 A | 3/1985 | Chrisoghilos | | 5,427,194 A | 6/1995 | Miller |
| 4,503,673 A | 3/1985 | Schachle | | 5,436,508 A | 7/1995 | Sorensen |
| 4,515,516 A | 5/1985 | Perrine et al. | | 5,448,889 A | 9/1995 | Bronicki |
| 4,520,840 A | 6/1985 | Michel | | 5,454,408 A | 10/1995 | Dibella et al. |
| 4,525,631 A | 6/1985 | Allison | | 5,454,426 A | 10/1995 | Moseley |
| 4,530,208 A | 7/1985 | Sato | | 5,467,722 A | 11/1995 | Meratla |
| 4,547,209 A | 10/1985 | Netzer | | 5,477,677 A | 12/1995 | Krnavek |
| 4,574,592 A | 3/1986 | Eskeli | | 5,491,969 A | 2/1996 | Cohn et al. |
| 4,585,039 A | 4/1986 | Hamilton | | 5,491,977 A | 2/1996 | Cho |
| 4,589,475 A | 5/1986 | Jones | | 5,524,821 A | 6/1996 | Vie et al. |
| 4,593,202 A | 6/1986 | Dickinson | | 5,537,822 A | 7/1996 | Shnaid et al. |
| 4,619,225 A | 10/1986 | Lowther | | 5,544,698 A | 8/1996 | Paulman |
| 4,624,623 A | 11/1986 | Wagner | | 5,557,934 A | 9/1996 | Beach |
| 4,648,801 A | 3/1987 | Wilson | | 5,561,978 A | 10/1996 | Buschur |
| 4,651,525 A | 3/1987 | Cestero | | 5,562,010 A | 10/1996 | McGuire |
| 4,653,986 A | 3/1987 | Ashton | | 5,579,640 A | 12/1996 | Gray, Jr. et al. |
| 4,671,742 A | 6/1987 | Gyimesi | | 5,584,664 A | 12/1996 | Elliott et al. |
| 4,676,068 A | 6/1987 | Funk | | 5,592,028 A | 1/1997 | Pritchard |
| 4,679,396 A | 7/1987 | Heggie | | 5,598,736 A | 2/1997 | Erskine |
| 4,691,524 A | 9/1987 | Holscher | | 5,599,172 A | 2/1997 | Mccabe |
| 4,693,080 A | 9/1987 | Van Hooff | | 5,600,953 A | 2/1997 | Oshita et al. |
| 4,706,456 A | 11/1987 | Backe | | 5,616,007 A | 4/1997 | Cohen |
| 4,707,988 A | 11/1987 | Palmers | | 5,634,340 A | 6/1997 | Grennan |
| 4,710,100 A | 12/1987 | Laing et al. | | 5,641,273 A | 6/1997 | Moseley |
| 4,735,552 A | 4/1988 | Watson | | 5,674,053 A | 10/1997 | Paul et al. |
| 4,739,620 A | 4/1988 | Pierce | | 5,685,154 A | 11/1997 | Bronicki et al. |
| 4,760,697 A | 8/1988 | Heggie | | 5,685,155 A | 11/1997 | Brown |
| 4,761,118 A | 8/1988 | Zanarini et al. | | 5,768,893 A | 6/1998 | Hoshino et al. |
| 4,765,142 A | 8/1988 | Nakhamkin | | 5,769,610 A | 6/1998 | Paul et al. |
| 4,765,143 A | 8/1988 | Crawford et al. | | 5,771,693 A | 6/1998 | Coney |
| 4,767,938 A | 8/1988 | Bervig | | 5,775,107 A | 7/1998 | Sparkman |
| 4,792,700 A | 12/1988 | Ammons | | 5,778,675 A | 7/1998 | Nakhamkin |
| 4,849,648 A | 7/1989 | Longardner | | 5,794,442 A | 8/1998 | Lisniansky |
| 4,870,816 A | 10/1989 | Nakhamkin | | 5,797,980 A | 8/1998 | Fillet |
| 4,872,307 A | 10/1989 | Nakhamkin | | 5,819,533 A | 10/1998 | Moonen |
| 4,873,828 A | 10/1989 | Laing et al. | | 5,819,635 A | 10/1998 | Moonen |
| 4,873,831 A | 10/1989 | Dehne | | 5,831,757 A | 11/1998 | DiFrancesco |
| 4,876,992 A | 10/1989 | Sobotowski | | 5,832,728 A | 11/1998 | Buck |
| 4,877,530 A | 10/1989 | Moses | | 5,832,906 A | 11/1998 | Douville et al. |
| 4,885,912 A | 12/1989 | Nakhamkin | | 5,839,270 A | 11/1998 | Jirnov et al. |
| 4,886,534 A | 12/1989 | Castan | | 5,845,479 A | 12/1998 | Nakhamkin |
| 4,907,495 A | 3/1990 | Sugahara | | 5,873,250 A | 2/1999 | Lewis |
| 4,936,109 A | 6/1990 | Longardner | | 5,901,809 A | 5/1999 | Berkun |
| 4,942,736 A | 7/1990 | Bronicki | | 5,924,283 A | 7/1999 | Burke, Jr. |
| 4,947,977 A | 8/1990 | Raymond | | 5,934,063 A | 8/1999 | Nakhamkin |
| 4,955,195 A | 9/1990 | Jones et al. | | 5,934,076 A | 8/1999 | Coney |
| 4,984,432 A | 1/1991 | Corey | | 5,937,652 A | 8/1999 | Abdelmalek |
| 5,056,601 A | 10/1991 | Grimmer | | 5,971,027 A | 10/1999 | Beachley et al. |
| 5,058,385 A | 10/1991 | Everett, Jr. | | 6,012,279 A | 1/2000 | Hines |
| 5,062,498 A | 11/1991 | Tobias | | 6,023,105 A | 2/2000 | Youssef |
| 5,107,681 A | 4/1992 | Wolfbauer, III | | 6,026,349 A | 2/2000 | Heneman |
| 5,133,190 A | 7/1992 | Abdelmalek | | 6,029,445 A | 2/2000 | Lech |
| 5,138,838 A | 8/1992 | Crosser | | 6,073,445 A | 6/2000 | Johnson |
| 5,140,170 A | 8/1992 | Henderson | | 6,073,448 A | 6/2000 | Lozada |
| 5,152,260 A | 10/1992 | Erickson et al. | | 6,085,520 A | 7/2000 | Kohno |
| 5,161,449 A | 11/1992 | Everett, Jr. | | 6,090,186 A | 7/2000 | Spencer |
| 5,169,295 A | 12/1992 | Stogner et al. | | 6,119,802 A | 9/2000 | Puett, Jr. |
| 5,182,086 A | 1/1993 | Henderson et al. | | 6,132,181 A | 10/2000 | Mccabe |
| 5,203,168 A | 4/1993 | Oshina | | 6,145,311 A | 11/2000 | Cyphelly |
| 5,209,063 A | 5/1993 | Shirai et al. | | 6,148,602 A | 11/2000 | Demetri |
| 5,213,470 A | 5/1993 | Lundquist | | 6,153,943 A | 11/2000 | Mistr, Jr. |
| 5,239,833 A | 8/1993 | Fineblum | | 6,158,499 A | 12/2000 | Rhodes |
| 5,259,345 A | 11/1993 | Richeson | | 6,170,443 B1 | 1/2001 | Hofbauer |

| | | |
|---|---|---|
| 6,178,735 B1 | 1/2001 | Frutschi |
| 6,179,446 B1 | 1/2001 | Sarmadi |
| 6,188,182 B1 | 2/2001 | Nickols et al. |
| 6,202,707 B1 | 3/2001 | Woodall et al. |
| 6,206,660 B1 | 3/2001 | Coney et al. |
| 6,210,131 B1 | 4/2001 | Whitehead |
| 6,216,462 B1 | 4/2001 | Gray, Jr. |
| 6,225,706 B1 | 5/2001 | Keller |
| 6,276,123 B1 | 8/2001 | Chen et al. |
| 6,327,858 B1 | 12/2001 | Negre et al. |
| 6,327,994 B1 | 12/2001 | Labrador |
| 6,349,543 B1 | 2/2002 | Lisniansky |
| RE37,603 E | 3/2002 | Coney |
| 6,352,576 B1 | 3/2002 | Spencer et al. |
| 6,360,535 B1 | 3/2002 | Fisher |
| 6,367,570 B1 | 4/2002 | Long, III |
| 6,372,023 B1 | 4/2002 | Kiyono et al. |
| 6,389,814 B2 | 5/2002 | Viteri et al. |
| 6,397,578 B2 | 6/2002 | Tsukamoto |
| 6,401,458 B2 | 6/2002 | Jacobson |
| 6,407,465 B1 | 6/2002 | Peltz et al. |
| 6,419,462 B1 | 7/2002 | Horie et al. |
| 6,422,016 B2 | 7/2002 | Alkhamis |
| 6,478,289 B1 | 11/2002 | Trewin |
| 6,512,966 B2 | 1/2003 | Lof |
| 6,513,326 B1 | 2/2003 | Maceda et al. |
| 6,516,615 B1 | 2/2003 | Stockhausen et al. |
| 6,516,616 B2 | 2/2003 | Carver |
| 6,598,392 B2 | 7/2003 | Majeres |
| 6,598,402 B2 | 7/2003 | Kataoka et al. |
| 6,606,860 B2 | 8/2003 | McFarland |
| 6,612,348 B1 | 9/2003 | Wiley |
| 6,619,930 B2 | 9/2003 | Jansen et al. |
| 6,626,212 B2 | 9/2003 | Morioka et al. |
| 6,629,413 B1 | 10/2003 | Wendt et al. |
| 6,637,185 B2 | 10/2003 | Hatamiya et al. |
| 6,652,241 B1 | 11/2003 | Alder |
| 6,652,243 B2 | 11/2003 | Krasnov |
| 6,666,024 B1 | 12/2003 | Moskal |
| 6,670,402 B1 | 12/2003 | Lee et al. |
| 6,672,056 B2 | 1/2004 | Roth et al. |
| 6,675,765 B2 | 1/2004 | Endoh |
| 6,688,108 B1 | 2/2004 | Van Liere |
| 6,698,472 B2 | 3/2004 | Camacho et al. |
| 6,711,984 B2 | 3/2004 | Tagge et al. |
| 6,712,166 B2 | 3/2004 | Rush et al. |
| 6,715,514 B2 | 4/2004 | Parker, III |
| 6,718,761 B2 | 4/2004 | Merswolke et al. |
| 6,739,131 B1 | 5/2004 | Kershaw |
| 6,739,419 B2 | 5/2004 | Jain et al. |
| 6,745,569 B2 | 6/2004 | Gerdes |
| 6,745,801 B1 | 6/2004 | Cohen et al. |
| 6,748,737 B2 | 6/2004 | Lafferty |
| 6,762,926 B1 | 7/2004 | Shiue et al. |
| 6,786,245 B1 | 9/2004 | Eichelberger |
| 6,789,387 B2 | 9/2004 | Brinkman |
| 6,789,576 B2 | 9/2004 | Umetsu et al. |
| 6,797,039 B2 | 9/2004 | Spencer |
| 6,815,840 B1 | 11/2004 | Aldendeshe |
| 6,817,185 B2 | 11/2004 | Coney et al. |
| 6,834,737 B2 | 12/2004 | Bloxham |
| 6,840,309 B2 | 1/2005 | Wilson et al. |
| 6,848,259 B2 | 2/2005 | Keller-sornig |
| 6,857,450 B2 | 2/2005 | Rupp |
| 6,874,453 B2 | 4/2005 | Coney et al. |
| 6,883,775 B2 | 4/2005 | Coney et al. |
| 6,886,326 B2 | 5/2005 | Holtzapple et al. |
| 6,892,802 B2 | 5/2005 | Kelly et al. |
| 6,900,556 B2 | 5/2005 | Provanzana |
| 6,922,991 B2 | 8/2005 | Polcuch |
| 6,925,821 B2 | 8/2005 | Sienel |
| 6,927,503 B2 | 8/2005 | Enis et al. |
| 6,931,848 B2 | 8/2005 | Maceda et al. |
| 6,935,096 B2 | 8/2005 | Haiun |
| 6,938,415 B2 | 9/2005 | Last |
| 6,938,654 B2 | 9/2005 | Gershtein et al. |
| 6,946,017 B2 | 9/2005 | Leppin et al. |
| 6,948,328 B2 | 9/2005 | Kidwell |
| 6,952,058 B2 | 10/2005 | Mccoin |
| 6,959,546 B2 | 11/2005 | Corcoran |
| 6,963,802 B2 | 11/2005 | Enis |
| 6,964,165 B2 | 11/2005 | Uhl et al. |
| 6,964,176 B2 | 11/2005 | Kidwell |
| 6,974,307 B2 | 12/2005 | Antoune et al. |
| 7,000,389 B2 | 2/2006 | Lewellin |
| 7,007,474 B1 | 3/2006 | Ochs et al. |
| 7,017,690 B2 | 3/2006 | Burke |
| 7,028,934 B2 | 4/2006 | Burynski, Jr. |
| 7,040,083 B2 | 5/2006 | Horii et al. |
| 7,040,108 B1 | 5/2006 | Flammang |
| 7,040,859 B2 | 5/2006 | Kane |
| 7,043,920 B2 | 5/2006 | Viteri et al. |
| 7,047,744 B1 | 5/2006 | Robertson et al. |
| 7,055,325 B2 | 6/2006 | Wolken |
| 7,067,937 B2 | 6/2006 | Enish et al. |
| 7,075,189 B2 | 7/2006 | Heronemus |
| RE39,249 E | 8/2006 | Link, Jr. |
| 7,084,520 B2 | 8/2006 | Zambrano |
| 7,086,231 B2 | 8/2006 | Pinkerton |
| 7,093,450 B2 | 8/2006 | Jimenez Haertel et al. |
| 7,093,626 B2 | 8/2006 | Li et al. |
| 7,098,552 B2 | 8/2006 | Mccoin |
| 7,107,766 B2 | 9/2006 | Zacche' et al. |
| 7,107,767 B2 | 9/2006 | Frazer et al. |
| 7,116,006 B2 | 10/2006 | Mccoin |
| 7,124,576 B2 | 10/2006 | Cherney et al. |
| 7,124,586 B2 | 10/2006 | Negre et al. |
| 7,127,895 B2 | 10/2006 | Pinkerton et al. |
| 7,128,777 B2 | 10/2006 | Spencer |
| 7,134,279 B2 | 11/2006 | White |
| 7,155,912 B2 | 1/2007 | Enis et al. |
| 7,168,928 B1 | 1/2007 | West |
| 7,168,929 B2 | 1/2007 | Siegel et al. |
| 7,169,489 B2 | 1/2007 | Redmond |
| 7,177,751 B2 | 2/2007 | Froloff |
| 7,178,337 B2 | 2/2007 | Pflanz |
| 7,191,603 B2 | 3/2007 | Taube |
| 7,197,871 B2 | 4/2007 | Yoshino |
| 7,201,095 B2 | 4/2007 | Hughey |
| 7,218,009 B2 | 5/2007 | Hendrickson et al. |
| 7,219,779 B2 | 5/2007 | Bauer et al. |
| 7,225,762 B2 | 6/2007 | Mahlanen |
| 7,228,690 B2 | 6/2007 | Barker |
| 7,230,348 B2 | 6/2007 | Poole |
| 7,231,998 B1 | 6/2007 | Schechter |
| 7,240,812 B2 | 7/2007 | Kamikozuru |
| 7,249,617 B2 | 7/2007 | Musselman et al. |
| 7,254,944 B1 | 8/2007 | Goetzinger et al. |
| 7,273,122 B2 | 9/2007 | Rose |
| 7,281,371 B1 | 10/2007 | Heidenreich |
| 7,308,361 B2 | 12/2007 | Enis et al. |
| 7,317,261 B2 | 1/2008 | Rolt |
| 7,322,377 B2 | 1/2008 | Baltes |
| 7,325,401 B1 | 2/2008 | Kesseli et al. |
| 7,328,575 B2 | 2/2008 | Hedman |
| 7,329,099 B2 | 2/2008 | Hartman |
| 7,347,049 B2 | 3/2008 | Rajendran et al. |
| 7,353,786 B2 | 4/2008 | Scuderi et al. |
| 7,353,845 B2 | 4/2008 | Underwood et al. |
| 7,354,252 B2 | 4/2008 | Baatrup et al. |
| 7,364,410 B2 | 4/2008 | Lin |
| 7,392,871 B2 | 7/2008 | Severinsky et al. |
| 7,406,828 B1 | 8/2008 | Nakhamkin |
| 7,407,501 B2 | 8/2008 | Zvuloni |
| 7,415,835 B2 | 8/2008 | Cowans et al. |
| 7,415,995 B2 | 8/2008 | Plummer et al. |
| 7,417,331 B2 | 8/2008 | De La Torre et al. |
| 7,418,820 B2 | 9/2008 | Harvey et al. |
| 7,436,086 B2 | 10/2008 | Mcclintic |
| 7,441,399 B2 | 10/2008 | Utamura |
| 7,448,213 B2 | 11/2008 | Mitani |
| 7,453,164 B2 | 11/2008 | Borden et al. |
| 7,469,527 B2 | 12/2008 | Negre et al. |
| 7,471,010 B1 | 12/2008 | Fingersh |
| 7,481,337 B2 | 1/2009 | Luharuka et al. |
| 7,488,159 B2 | 2/2009 | Bhatt et al. |
| 7,527,483 B1 | 5/2009 | Glauber |
| 7,579,700 B1 | 8/2009 | Meller |

| | | | | | | |
|---|---|---|---|---|---|---|
| 7,603,970 | B2 | 10/2009 | Scuderi et al. | 2007/0182160 A1 | 8/2007 | Enis et al. |
| 7,607,503 | B1 | 10/2009 | Schechter | 2007/0205298 A1 | 9/2007 | Harrison et al. |
| 7,693,402 | B2 | 4/2010 | Hudson et al. | 2007/0234749 A1 | 10/2007 | Enis et al. |
| 7,802,426 | B2 | 9/2010 | Bollinger | 2007/0243066 A1 | 10/2007 | Baron |
| 7,827,787 | B2 | 11/2010 | Cherney et al. | 2007/0245735 A1 | 10/2007 | Ashikian |
| 7,832,207 | B2 | 11/2010 | McBride et al. | 2007/0258834 A1 | 11/2007 | Froloff et al. |
| 7,843,076 | B2 | 11/2010 | Gogoana et al. | 2008/0000436 A1 | 1/2008 | Goldman |
| 7,874,155 | B2 | 1/2011 | McBride et al. | 2008/0016868 A1 | 1/2008 | Ochs et al. |
| 7,900,444 | B1 | 3/2011 | McBride et al. | 2008/0047272 A1 | 2/2008 | Schoell |
| 7,958,731 | B2 | 6/2011 | McBride et al. | 2008/0050234 A1 | 2/2008 | Ingersoll et al. |
| 7,963,110 | B2 | 6/2011 | Bollinger et al. | 2008/0072870 A1 | 3/2008 | Chomyszak et al. |
| 8,037,678 | B2 | 10/2011 | McBride et al. | 2008/0087165 A1 | 4/2008 | Wright et al. |
| 8,046,990 | B2 | 11/2011 | Bollinger et al. | 2008/0104939 A1 | 5/2008 | Hoffmann et al. |
| 8,104,274 | B2 | 1/2012 | McBride et al. | 2008/0112807 A1 | 5/2008 | Uphues et al. |
| 8,109,085 | B2 | 2/2012 | McBride et al. | 2008/0127632 A1 | 6/2008 | Finkenrath et al. |
| 8,117,842 | B2 | 2/2012 | McBride et al. | 2008/0138265 A1 | 6/2008 | Lackner et al. |
| 8,122,718 | B2 | 2/2012 | McBride et al. | 2008/0155975 A1 | 7/2008 | Brinkman |
| 8,171,728 | B2 | 5/2012 | Bollinger et al. | 2008/0155976 A1 | 7/2008 | Smith et al. |
| 2001/0045093 | A1 | 11/2001 | Jacobson | 2008/0157528 A1 | 7/2008 | Wang et al. |
| 2003/0131599 | A1 | 7/2003 | Gerdes | 2008/0157537 A1 | 7/2008 | Richard |
| 2003/0145589 | A1 | 8/2003 | Tillyer | 2008/0164449 A1 | 7/2008 | Gray et al. |
| 2003/0177767 | A1 | 9/2003 | Keller-sornig et al. | 2008/0185194 A1 | 8/2008 | Leone |
| 2003/0180155 | A1 | 9/2003 | Coney et al. | 2008/0202120 A1 | 8/2008 | Karyambas |
| 2004/0050042 | A1 | 3/2004 | Frazer | 2008/0211230 A1 | 9/2008 | Gurin |
| 2004/0050049 | A1 | 3/2004 | Wendt et al. | 2008/0228323 A1 | 9/2008 | Laumer et al. |
| 2004/0146406 | A1 | 7/2004 | Last | 2008/0233029 A1 | 9/2008 | Fan et al. |
| 2004/0146408 | A1 | 7/2004 | Anderson | 2008/0238105 A1 | 10/2008 | Ortiz et al. |
| 2004/0148934 | A1 | 8/2004 | Pinkerton et al. | 2008/0238187 A1 | 10/2008 | Garnett et al. |
| 2004/0211182 | A1 | 10/2004 | Gould | 2008/0250788 A1 | 10/2008 | Nuel et al. |
| 2004/0244580 | A1 | 12/2004 | Coney et al. | 2008/0251302 A1 | 10/2008 | Lynn et al. |
| 2004/0261415 | A1 | 12/2004 | Negre et al. | 2008/0272597 A1 | 11/2008 | Althaus |
| 2005/0016165 | A1 | 1/2005 | Enis et al. | 2008/0272598 A1 | 11/2008 | Nakhamkin |
| 2005/0028529 | A1 | 2/2005 | Bartlett et al. | 2008/0272605 A1 | 11/2008 | Borden et al. |
| 2005/0047930 | A1 | 3/2005 | Schmid | 2008/0308168 A1 | 12/2008 | O'Brien, II et al. |
| 2005/0072154 | A1 | 4/2005 | Frutschi | 2008/0308270 A1 | 12/2008 | Wilson |
| 2005/0115234 | A1 | 6/2005 | Asano et al. | 2008/0315589 A1 | 12/2008 | Malmrup |
| 2005/0155347 | A1 | 7/2005 | Lewellin | 2009/0000290 A1 | 1/2009 | Brinkman |
| 2005/0166592 | A1 | 8/2005 | Larson et al. | 2009/0007558 A1 | 1/2009 | Hall et al. |
| 2005/0274334 | A1 | 12/2005 | Warren | 2009/0008173 A1 | 1/2009 | Hall et al. |
| 2005/0275225 | A1 | 12/2005 | Bertolotti | 2009/0010772 A1 | 1/2009 | Siemroth |
| 2005/0279086 | A1 | 12/2005 | Hoos | 2009/0020275 A1 | 1/2009 | Neher et al. |
| 2005/0279292 | A1 | 12/2005 | Hudson et al. | 2009/0021012 A1 | 1/2009 | Stull et al. |
| 2005/0279296 | A1 | 12/2005 | Coney et al. | 2009/0056331 A1 | 3/2009 | Zhao et al. |
| 2006/0055175 | A1 | 3/2006 | Grinblat | 2009/0071153 A1 | 3/2009 | Boyapati et al. |
| 2006/0059912 | A1 | 3/2006 | Romanelli et al. | 2009/0107784 A1 | 4/2009 | Gabriel et al. |
| 2006/0059936 | A1 | 3/2006 | Radke et al. | 2009/0145130 A1 | 6/2009 | Kaufman |
| 2006/0059937 | A1 | 3/2006 | Perkins et al. | 2009/0158740 A1 | 6/2009 | Littau et al. |
| 2006/0075749 | A1 | 4/2006 | Cherney et al. | 2009/0178409 A1 | 7/2009 | Shinnar |
| 2006/0090467 | A1 | 5/2006 | Crow | 2009/0200805 A1 | 8/2009 | Kim et al. |
| 2006/0090477 | A1 | 5/2006 | Rolff | 2009/0220364 A1 | 9/2009 | Rigal et al. |
| 2006/0107664 | A1 | 5/2006 | Hudson et al. | 2009/0229902 A1 | 9/2009 | Stansbury, III |
| 2006/0162543 | A1 | 7/2006 | Abe et al. | 2009/0249826 A1 | 10/2009 | Hugelman |
| 2006/0162910 | A1 | 7/2006 | Kelly et al. | 2009/0282822 A1 | 11/2009 | McBride et al. |
| 2006/0175337 | A1 | 8/2006 | Defosset | 2009/0282840 A1 | 11/2009 | Chen et al. |
| 2006/0201148 | A1 | 9/2006 | Zabtcioglu | 2009/0294096 A1 | 12/2009 | Mills et al. |
| 2006/0248886 | A1 | 11/2006 | Ma | 2009/0301089 A1 | 12/2009 | Bollinger |
| 2006/0248892 | A1 | 11/2006 | Ingersoll | 2009/0317267 A1 | 12/2009 | Gill et al. |
| 2006/0254281 | A1 | 11/2006 | Badeer et al. | 2009/0322090 A1 | 12/2009 | Wolf |
| 2006/0260311 | A1 | 11/2006 | Ingersoll | 2010/0018196 A1 | 1/2010 | Li et al. |
| 2006/0260312 | A1 | 11/2006 | Ingersoll | 2010/0077765 A1 | 4/2010 | Japikse |
| 2006/0262465 | A1 | 11/2006 | Wiederhold | 2010/0089063 A1 | 4/2010 | McBride et al. |
| 2006/0266034 | A1 | 11/2006 | Ingersoll | 2010/0133903 A1 | 6/2010 | Rufer |
| 2006/0266035 | A1 | 11/2006 | Ingersoll et al. | 2010/0139277 A1 | 6/2010 | McBride et al. |
| 2006/0266036 | A1 | 11/2006 | Ingersoll | 2010/0193270 A1 | 8/2010 | Deshaies et al. |
| 2006/0266037 | A1 | 11/2006 | Ingersoll | 2010/0199652 A1 | 8/2010 | Lemofouet et al. |
| 2006/0280993 | A1 | 12/2006 | Keefer et al. | 2010/0205960 A1 | 8/2010 | McBride et al. |
| 2006/0283967 | A1 | 12/2006 | Cho et al. | 2010/0229544 A1 | 9/2010 | Bollinger et al. |
| 2007/0006586 | A1 | 1/2007 | Hoffman et al. | 2010/0307156 A1 | 12/2010 | Bollinger |
| 2007/0022754 | A1 | 2/2007 | Perkins et al. | 2010/0326062 A1 | 12/2010 | Fong et al. |
| 2007/0022755 | A1 | 2/2007 | Pinkerton et al. | 2010/0326064 A1 | 12/2010 | Fong et al. |
| 2007/0062194 | A1 | 3/2007 | Ingersoll | 2010/0326066 A1 | 12/2010 | Fong et al. |
| 2007/0074533 | A1 | 4/2007 | Hugenroth et al. | 2010/0326068 A1 | 12/2010 | Fong et al. |
| 2007/0095069 | A1 | 5/2007 | Joshi et al. | 2010/0326069 A1 | 12/2010 | Fong et al. |
| 2007/0113803 | A1 | 5/2007 | Froloff et al. | 2010/0326075 A1 | 12/2010 | Fong et al. |
| 2007/0116572 | A1 | 5/2007 | Barbu et al. | 2010/0329891 A1 | 12/2010 | Fong et al. |
| 2007/0137595 | A1 | 6/2007 | Greenwell | 2010/0329903 A1 | 12/2010 | Fong et al. |
| 2007/0151528 | A1 | 7/2007 | Hedman | 2010/0329909 A1 | 12/2010 | Fong et al. |
| 2007/0158946 | A1 | 7/2007 | Annen et al. | 2011/0023488 A1 | 2/2011 | Fong et al. |
| 2007/0181199 | A1 | 8/2007 | Weber | 2011/0023977 A1 | 2/2011 | Fong et al. |

| Publication No. | Date | Inventor |
|---|---|---|
| 2011/0030359 A1 | 2/2011 | Fong et al. |
| 2011/0030552 A1 | 2/2011 | Fong et al. |
| 2011/0056193 A1 | 3/2011 | McBride et al. |
| 2011/0056368 A1 | 3/2011 | McBride et al. |
| 2011/0061741 A1 | 3/2011 | Ingersoll et al. |
| 2011/0061836 A1 | 3/2011 | Ingersoll et al. |
| 2011/0062166 A1 | 3/2011 | Ingersoll et al. |
| 2011/0106321 A1 | 5/2011 | Cherian et al. |
| 2011/0107755 A1 | 5/2011 | McBride et al. |
| 2011/0115223 A1 | 5/2011 | Stahlkopf et al. |
| 2011/0131966 A1 | 6/2011 | McBride et al. |
| 2011/0138797 A1 | 6/2011 | Bollinger et al. |
| 2011/0167813 A1 | 7/2011 | McBride et al. |
| 2011/0204064 A1 | 8/2011 | Crane et al. |
| 2011/0219760 A1 | 9/2011 | McBride et al. |
| 2011/0219763 A1 | 9/2011 | McBride et al. |
| 2011/0232281 A1 | 9/2011 | McBride et al. |
| 2011/0233934 A1 | 9/2011 | Crane et al. |
| 2011/0252777 A1 | 10/2011 | Bollinger et al. |
| 2011/0258996 A1 | 10/2011 | Ingersoll et al. |
| 2011/0258999 A1 | 10/2011 | Ingersoll et al. |
| 2011/0259001 A1 | 10/2011 | McBride et al. |
| 2011/0259442 A1 | 10/2011 | McBride et al. |
| 2011/0266810 A1 | 11/2011 | McBride et al. |
| 2011/0283690 A1 | 11/2011 | McBride et al. |
| 2011/0296821 A1 | 12/2011 | Bollinger et al. |
| 2011/0296822 A1 | 12/2011 | Bollinger et al. |
| 2011/0296823 A1 | 12/2011 | McBride et al. |
| 2011/0314800 A1 | 12/2011 | Fong et al. |
| 2011/0314804 A1 | 12/2011 | Fong et al. |
| 2012/0000557 A1 | 1/2012 | McBride et al. |
| 2012/0017580 A1 | 1/2012 | Fong et al. |
| 2012/0019009 A1 | 1/2012 | Fong et al. |
| 2012/0023919 A1 | 2/2012 | Fong et al. |
| 2012/0036851 A1 | 2/2012 | McBride et al. |
| 2012/0042772 A1 | 2/2012 | Fong et al. |
| 2012/0047884 A1 | 3/2012 | McBride et al. |
| 2012/0055147 A1 | 3/2012 | Fong et al. |
| 2012/0057996 A1 | 3/2012 | Fong et al. |
| 2012/0057998 A1 | 3/2012 | Ingersoll et al. |
| 2012/0067036 A1 | 3/2012 | Fong et al. |
| 2012/0073432 A1 | 3/2012 | Ingersoll et al. |
| 2012/0085086 A1 | 4/2012 | Bollinger et al. |
| 2012/0090314 A1 | 4/2012 | Fong et al. |

FOREIGN PATENT DOCUMENTS

| | | |
|---|---|---|
| BE | 1008885 | 8/1996 |
| CN | 1061262 | 5/1992 |
| CN | 1171490 | 1/1998 |
| CN | 1276308 | 12/2000 |
| CN | 1277323 | 12/2000 |
| CN | 1412443 | 4/2003 |
| CN | 1743665 | 3/2006 |
| CN | 2821162 | 9/2006 |
| CN | 2828319 | 10/2006 |
| CN | 2828368 | 10/2006 |
| CN | 1884822 | 12/2006 |
| CN | 1888328 | 1/2007 |
| CN | 1967091 | 5/2007 |
| CN | 101033731 | 9/2007 |
| CN | 101042115 | 9/2007 |
| CN | 101070822 | 11/2007 |
| CN | 101149002 | 3/2008 |
| CN | 101162073 | 4/2008 |
| CN | 201103518 | 8/2008 |
| CN | 201106527 | 8/2008 |
| CN | 101289963 | 10/2008 |
| CN | 201125855 | 10/2008 |
| CN | 101377190 | 4/2009 |
| CN | 101408213 | 4/2009 |
| CN | 101435451 | 5/2009 |
| DE | 25 38 870 | 4/1976 |
| DE | 19530253 | 11/1996 |
| DE | 19903907 | 8/2000 |
| DE | 19911534 | 9/2000 |
| DE | 10042020 | 5/2001 |
| DE | 20118183 | 3/2003 |
| DE | 20120330 | 4/2003 |
| DE | 10147940 | 5/2003 |
| DE | 10205733 | 8/2003 |
| DE | 10212480 | 10/2003 |
| DE | 20312293 | 12/2003 |
| DE | 10220499 | 4/2004 |
| DE | 10334637 | 2/2005 |
| DE | 10 2005 047622 | 4/2007 |
| EP | 0204748 | 3/1981 |
| EP | 0091801 | 10/1983 |
| EP | 0097002 | 12/1983 |
| EP | 0196690 | 10/1986 |
| EP | 0212692 | 3/1987 |
| EP | 0364106 | 4/1990 |
| EP | 0507395 | 10/1992 |
| EP | 0821162 | 1/1998 |
| EP | 0 857 877 | 8/1998 |
| EP | 1 388 442 | 2/2004 |
| EP | 1405662 | 4/2004 |
| EP | 1657452 | 11/2004 |
| EP | 1726350 | 11/2006 |
| EP | 1741899 | 1/2007 |
| EP | 1 780 058 | 5/2007 |
| EP | 1988294 | 11/2008 |
| EP | 2014896 | 1/2009 |
| EP | 2078857 | 7/2009 |
| FR | 2449805 | 9/1980 |
| FR | 2816993 | 5/2002 |
| FR | 2829805 | 3/2003 |
| GB | 722524 | 11/1951 |
| GB | 772703 | 4/1957 |
| GB | 1449076 | 9/1976 |
| GB | 1479940 | 7/1977 |
| GB | 2106992 | 4/1983 |
| GB | 2223810 | 4/1990 |
| GB | 2 300 673 | 11/1996 |
| GB | 2373546 | 9/2002 |
| GB | 2403356 | 12/2004 |
| JP | 57010778 | 1/1982 |
| JP | 57070970 | 5/1982 |
| JP | 57120058 | 7/1982 |
| JP | 58183880 | 10/1982 |
| JP | 58150079 | 9/1983 |
| JP | 58192976 | 11/1983 |
| JP | 60206985 | 10/1985 |
| JP | 62101900 | 5/1987 |
| JP | 63227973 | 9/1988 |
| JP | 2075674 | 3/1990 |
| JP | 2247469 | 10/1990 |
| JP | 3009090 | 1/1991 |
| JP | 3281984 | 12/1991 |
| JP | 4121424 | 4/1992 |
| JP | 6185450 | 7/1994 |
| JP | 8145488 | 6/1996 |
| JP | 9166079 | 6/1997 |
| JP | 10313547 | 11/1998 |
| JP | 2000-346093 | 6/1999 |
| JP | 11351125 | 12/1999 |
| JP | 2000166128 | 6/2000 |
| JP | 2000346093 | 12/2000 |
| JP | 2002127902 | 5/2002 |
| JP | 2003083230 | 3/2003 |
| JP | 2005023918 | 1/2005 |
| JP | 2005036769 | 2/2005 |
| JP | 2005068963 | 3/2005 |
| JP | 2006220252 | 8/2006 |
| JP | 2007001872 | 1/2007 |
| JP | 2007145251 | 6/2007 |
| JP | 2007211730 | 8/2007 |
| JP | 2008038658 | 2/2008 |
| KR | 840000180 | 2/1984 |
| KR | 2004004637 | 1/2004 |
| RU | 2101562 | 1/1998 |
| RU | 2169857 | 6/2001 |
| RU | 2213255 | 9/2003 |
| SU | 800438 | 1/1981 |
| UA | 69030 | 8/2004 |
| WO | WO-82/00319 | 2/1982 |
| WO | WO-8802818 | 4/1988 |
| WO | WO-99/41498 | 8/1990 |
| WO | WO-92/22741 | 12/1992 |

| | | |
|---|---|---|
| WO | WO-93/06367 | 4/1993 |
| WO | WO-93/11363 | 6/1993 |
| WO | WO-93/24754 | 12/1993 |
| WO | WO 9412785 | 6/1994 |
| WO | WO-95/25381 | 9/1995 |
| WO | WO-96/01942 | 1/1996 |
| WO | WO-96/22456 | 7/1996 |
| WO | WO-96/34213 | 10/1996 |
| WO | WO-97/01029 | 1/1997 |
| WO | WO-97/17546 | 5/1997 |
| WO | WO-98/02818 | 1/1998 |
| WO | WO-98/17492 | 4/1998 |
| WO | WO-00/01945 | 1/2000 |
| WO | WO-00/37800 | 6/2000 |
| WO | WO-00/65212 | 11/2000 |
| WO | WO-00/68578 | 11/2000 |
| WO | WO-01/75308 | 10/2001 |
| WO | WO 0175290 | 10/2001 |
| WO | WO-02/25083 | 3/2002 |
| WO | WO-02/46621 | 6/2002 |
| WO | WO-02/103200 | 12/2002 |
| WO | WO-03/021107 | 3/2003 |
| WO | WO-03/021702 | 3/2003 |
| WO | WO-03/078812 | 9/2003 |
| WO | WO-03/081011 | 10/2003 |
| WO | WO-2004/034391 | 5/2004 |
| WO | WO-2004/059155 | 7/2004 |
| WO | WO-2004/072452 | 8/2004 |
| WO | WO-2004/074679 | 9/2004 |
| WO | WO-2004/109172 | 12/2004 |
| WO | WO-2005/044424 | 5/2005 |
| WO | WO-2005/062969 | 7/2005 |
| WO | WO-2005/067373 | 7/2005 |
| WO | WO-2005/079461 | 9/2005 |
| WO | WO-2005/088131 | 9/2005 |
| WO | WO-2005/095155 | 10/2005 |
| WO | WO-2006/029633 | 3/2006 |
| WO | WO-2006/058085 | 6/2006 |
| WO | WO-2006/124006 | 11/2006 |
| WO | WO-2007/002094 | 1/2007 |
| WO | WO-2007/003954 | 1/2007 |
| WO | WO-2007/012143 | 2/2007 |
| WO | WO-2007/035997 | 4/2007 |
| WO | WO-2007/051034 | 5/2007 |
| WO | WO-2007/066117 | 6/2007 |
| WO | WO-2007/086792 | 8/2007 |
| WO | WO-2007/089872 | 8/2007 |
| WO | WO-2007/096656 | 8/2007 |
| WO | WO-2007/111839 | 10/2007 |
| WO | WO-2007/136765 | 11/2007 |
| WO | WO-2007/140914 | 12/2007 |
| WO | WO-2008/003950 | 1/2008 |
| WO | WO-2008/014769 | 2/2008 |
| WO | WO-2008023901 | 2/2008 |
| WO | WO-2008/027259 | 3/2008 |
| WO | WO-2008/028881 | 3/2008 |
| WO | WO-2008/039725 | 4/2008 |
| WO | WO-2008/045468 | 4/2008 |
| WO | WO-2008/051427 | 5/2008 |
| WO | WO-2008/074075 | 6/2008 |
| WO | WO-2008/084507 | 7/2008 |
| WO | WO-2008/091373 | 7/2008 |
| WO | WO 2008102292 | 8/2008 |
| WO | WO-2008/106967 | 9/2008 |
| WO | WO-2008/108870 | 9/2008 |
| WO | WO-2008/109006 | 9/2008 |
| WO | WO-2008/110018 | 9/2008 |
| WO | WO-2008/115479 | 9/2008 |
| WO | WO-2008/121378 | 10/2008 |
| WO | WO-2008139267 | 11/2008 |
| WO | WO-2008/152432 | 12/2008 |
| WO | WO-2008/153591 | 12/2008 |
| WO | WO-2008/157327 | 12/2008 |
| WO | WO-2009/034421 | 3/2009 |
| WO | WO-2009/034548 | 3/2009 |
| WO | WO-2009/038973 | 3/2009 |
| WO | WO-2009/044139 | 4/2009 |
| WO | WO-2009/045110 | 4/2009 |
| WO | WO-2009045468 | 4/2009 |
| WO | WO-2009/114205 | 9/2009 |
| WO | WO-2009/126784 | 10/2009 |
| WO | WO-2010/006319 | 1/2010 |
| WO | WO-2010/009053 | 1/2010 |
| WO | WO-2010/040890 | 4/2010 |
| WO | WO-2010/105155 | 9/2010 |
| WO | WO-2010/135658 | 11/2010 |
| WO | WO-2011/008321 | 1/2011 |
| WO | WO-2011/008325 | 1/2011 |
| WO | WO-2011/008500 | 1/2011 |
| WO | WO-2011/079267 | 6/2011 |
| WO | WO-2011/079271 | 6/2011 |

OTHER PUBLICATIONS

Lemofouet, "Investigation and Optimisation of Hybrid Electricity Storage Systems Based on Compressed Air and Supercapacitors," (Oct. 20, 2006), 250 pages.

Cyphelly et al., "Usage of Compressed Air Storage Systems," BFE-Program "Electricity," Final Report, May 2004, 14 pages.

Lemofouet et al., "A Hybrid Energy Storage System Based on Compressed Air and Supercapacitors with Maximum Efficiency Point Tracking (MEPT)," IEEE Transactions on Industrial Electron, vol. 53, No. 4, (Aug. 2006) pp. 1105-1115.

International Search Report and Written Opinion issued Sep. 15, 2009 for International Application No. PCT/US2009/040027, 8 pages.

International Search Report and Written Opinion issued Aug. 30, 2010 for International Application No. PCT/US2010/029795, 9 pages.

International Search Report and Written Opinion issued Dec. 3, 2009 for International Application No. PCT/US2009/046725, 9 pages.

International Search Report and Written Opinion issued Jan. 4, 2011 for International Application No. PCT/US2010/055279, 13 pages.

International Search Report and Written Opinion mailed May 25, 2011 for International Application No. PCT/US2010/027138, 12 pages.

Rufer et al., "Energetic Performance of a Hybrid Energy Storage System Based on Compressed Air and Super Capacitors," Power Electronics, Electrical Drives, Automation and Motion, (May 1, 2006), pp. 469-474.

Lemofouet et al. "Hybrid Energy Storage Systems based on Compressed Air and Supercapacitors with Maximum Efficiency Point Tracking," Industrial Electronics Laboratory (LEI), (2005), pp. 1-10.

Lemofouet et al. "Hybrid Energy Storage Systems based on Compressed Air and Supercapacitors with Maximum Efficiency Point Tracking," The International Power Electronics Conference, (2005), pp. 461-468.

International Preliminary Report on Patentability mailed Oct. 13, 2011 for International Application No. PCT/US2010/029795 (9 pages).

Stephenson et al., "Computer Modelling of Isothermal Compression in the Reciprocating Compressor of a Complete Isoengine," 9th International Conference on Liquid Atomization and Spray Systems (Jul. 13-17, 2003).

Coney et al., "Development of a Reciprocating Compressor Using Water Injection to Achieve Quasi-Isothermal Compression," Purdue University International Compressor Engineering Conference (2002).

Linnemann et al., "The Isoengine—A Novel High Efficiency Engine with Optional Compressed Air Energy Storage (CAES)," International Joint Power Generation Conference (Jun. 16-19, 2003).

Linnemann et al., "The Isoengine: Realisation of a High-Efficiency Power Cycle Based on Isothermal Compression," Int. J. Energy Tech. and Policy, vol. 3, Nos. 1-2, pp. 66-84 (2005).

HIGH-EFFICIENCY ENERGY-CONVERSION BASED ON FLUID EXPANSION AND COMPRESSION

RELATED APPLICATIONS

This application claims the benefit of and priority to U.S. Provisional Patent Application No. 61/378,108, filed Aug. 30, 2010, U.S. Provisional Patent Application No. 61/421,964, filed Dec. 10, 2010, U.S. Provisional Patent Application No. 61/433,016, filed Jan. 14, 2011, U.S. Provisional Patent Application No. 61/486,550, filed May 16, 2011, and U.S. Provisional Patent Application No. 61/513,215, filed Jul. 29, 2011. This application is also a continuation-in-part of U.S. patent application Ser. No. 12/639,703, filed Dec. 16, 2009, which (i) is a continuation-in-part of U.S. patent application Ser. No. 12/421,057, filed Apr. 9, 2009, which claims the benefit of and priority to U.S. Provisional Patent Application No. 61/148,691, filed Jan. 30, 2009, and U.S. Provisional Patent Application No. 61/043,630, filed Apr. 9, 2008; (ii) is a continuation-in-part of U.S. patent application Ser. No. 12/481,235, filed Jun. 9, 2009, which claims the benefit of and priority to U.S. Provisional Patent Application No. 61/059,964, filed Jun. 9, 2008; and (iii) claims the benefit of and priority to U.S. Provisional Patent Application Nos. 61/166,448, filed on Apr. 3, 2009; 61/184,166, filed on Jun. 4, 2009; 61/223,564, filed on Jul. 7, 2009; 61/227,222, filed on Jul. 21, 2009; and 61/251,965, filed on Oct. 15, 2009. This application is also a continuation-in-part of U.S. patent application Ser. No. 12/794,237, filed on Jun. 4, 2010, which claims the benefit of and priority to U.S. Provisional Patent Application Ser. Nos. 61/184,191, filed on Jun. 4, 2009; 61/222,286, filed on Jul. 1, 2009; 61/242,526, filed on Sep. 15, 2009; and 61/256,484, filed on Oct. 30, 2009. This application is also a continuation-in-part of U.S. patent application Ser. No. 12/879,595, filed on Sep. 10, 2010, which claims the benefit of and priority to U.S. Provisional Patent Application No. 61/241,568, filed Sep. 11, 2009; U.S. Provisional Patent Application No. 61/251,965, filed Oct. 15, 2009; U.S. Provisional Patent Application No. 61/318,060, filed Mar. 26, 2010; and U.S. Provisional Patent Application No. 61/326,453, filed Apr. 21, 2010. The entire disclosure of each of these applications is hereby incorporated herein by reference.

STATEMENT REGARDING FEDERALLY SPONSORED RESEARCH

This invention was made with government support under IIP-0923633 awarded by the NSF and DE-OE0000231 awarded by the DOE. The government has certain rights in the invention.

FIELD OF THE INVENTION

In various embodiments, the present invention relates to pneumatics, hydraulics, internal-combustion engines, power generation, and energy storage, and more particularly, to systems and methods using internal-combustion, pneumatic, pneumatic/hydraulic, and/or hydraulic cylinders for, e.g., energy storage and recovery.

BACKGROUND

Storing energy in the form of compressed gas has a long history and components tend to be well tested and reliable, and have long lifetimes. The general principle of compressed-gas or compressed-air energy storage (CAES) is that generated energy (e.g., electric energy) is used to compress gas (e.g., air), thus converting the original energy to pressure potential energy; this potential energy is later recovered in a useful form (e.g., converted back to electricity) via gas expansion coupled to an appropriate mechanism. Advantages of compressed-gas energy storage include low specific-energy costs, long lifetime, low maintenance, reasonable energy density, and good reliability.

If a body of gas is at the same temperature as its environment, and expansion occurs slowly relative to the rate of heat exchange between the gas and its environment, then the gas will remain at approximately constant temperature as it expands. This process is termed "isothermal" expansion. Isothermal expansion of a quantity of high-pressure gas stored at a given temperature recovers approximately three times more work than would "adiabatic expansion," that is, expansion where no heat is exchanged between the gas and its environment—e.g., because the expansion happens rapidly or in an insulated chamber. Gas may also be compressed isothermally or adiabatically.

An ideally isothermal energy-storage cycle of compression, storage, and expansion would have 100% thermodynamic efficiency. An ideally adiabatic energy-storage cycle would also have 100% thermodynamic efficiency, but there are many practical disadvantages to the adiabatic approach. These include the production of higher temperature and pressure extremes within the system, heat loss during the storage period, and inability to exploit environmental (e.g., cogenerative) heat sources and sinks during expansion and compression, respectively. In an isothermal system, the cost of adding a heat-exchange system is traded against resolving the difficulties of the adiabatic approach. In either case, mechanical energy from expanding gas must usually be converted to electrical energy before use.

An efficient and novel design for storing energy in the form of compressed gas utilizing near isothermal gas compression and expansion has been shown and described in U.S. Pat. No. 7,832,207, filed Apr. 9, 2009 (the '207 patent) and U.S. Pat. No. 7,874,155, filed Feb. 25, 2010 (the '155 patent), the disclosures of which are hereby incorporated herein by reference in their entireties. The '207 and '155 patents disclose systems and techniques for expanding gas isothermally in staged cylinders and intensifiers over a large pressure range in order to generate electrical energy when required. Mechanical energy from the expanding gas may be used to drive a hydraulic pump/motor subsystem that produces electricity. Systems and techniques for hydraulic-pneumatic pressure intensification that may be employed in systems and methods such as those disclosed in the '207 and '155 patents are shown and described in U.S. patent application Ser. No. 12/879,595, filed Sep. 10, 2010 (the '595 application), the disclosure of which is hereby incorporated herein by reference in its entirety.

In the systems disclosed in the '207 and '155 patents, reciprocal mechanical motion is produced during recovery of energy from storage by expansion of gas in the cylinders. This reciprocal motion may be converted to electricity by a variety of means, for example as disclosed in the '595 application as well as in U.S. patent application Ser. No. 12/938,853, filed Nov. 3, 2010 (the '853 application), the disclosure of which is hereby incorporated herein by reference in its entirety. The ability of such systems to either store energy (i.e., use energy to compress gas into a storage reservoir) or produce energy (i.e., expand gas from a storage reservoir to release energy) will be apparent to any person reasonably familiar with the principles of electrical and pneumatic machines.

Similarly, the most common form of internal combustion engine, found in automotive, aviation, marine, generation, and other applications, typically contains multiple cylinders in which expanding gases drive pistons. These pistons are linked to a common crankshaft by mechanisms that require precise synchronization among cylinders: in some cases, loss of synchronization (e.g., by failure of a timing belt in an automotive engine) can destroy the mechanism. To transfer power from the crankshaft to a mechanical load, it is often necessary to interpose a gearbox, infinitely variable transmission, or other device to convert the crankshaft's working range of rotational speeds to another more suitable range. The spatial arrangement of cylinders around the crankshaft tends to be strongly constrained by the need to balance forces, minimize vibration, and manufacture identical parts for the sake of economy. Moreover, such an engine typically burns fuel near peak efficiency over a relatively small range of cyclic frequencies, so that some states of operation (e.g., acceleration) are low-efficiency, high-pollution.

One alternative to mechanical coupling of piston-type cylinders to a shaft (e.g., by a linkage composed of rods, cranks, and other rigid parts) is hydraulic coupling. In hydraulic coupling, the work performed by expanding gases within a piston-type cylinder is not transmitted to a load as mechanical force acting through the rigid parts of a mechanical linkage, but as pressure in a hydraulic fluid. This fluid may drive a hydraulic motor whose output is torque applied to a rotating shaft analogous to a crankshaft. Hydraulic devices offer several advantages in such a role, including, for example, adjustable and efficient operability over a range of flow rates, reversibility, arbitrary spatial orientation, arbitrary spatial location (within limits).

However, energy conversion or storage systems that feature hydraulic motor/pumps may suffer from parasitic energy losses entailed by valve actuation and throttling or by the driving of hydraulic motor/pumps over non-optimal fluid pressure ranges (i.e., input pressure for motors or for pump/motors operated as motors, output pressure for pumps or for pump/motors operated as pumps). Reduction or elimination of such losses would increase the overall efficiency of such energy conversion or storage systems. For example, overall efficiency may be increased by limiting the hydraulic pressure range delivered to a hydraulic motor, even for broad ranges of pressures experienced in the system during internal combustion or the expansion and/or compression of compressed gas.

SUMMARY

Embodiments of the invention increase the efficiency with which energy is exchanged between (a) a quantity of gas being expanded or compressed in a pneumatic or pneumatic/hydraulic cylinder, (b) a hydraulic motor, pump, or motor/pump, and, in some embodiments, (c) a kinetic-mechanical device (e.g., a crankshaft). Such exchanges of energy between pneumatic, hydraulic, and kinetic-mechanical devices may occur within an energy conversion or storage system that compresses gas to store energy and expands gas to release energy, or, in some embodiments, that employs expanding gas liberated by combustion. Improving the efficiency of the energy exchanges will, in general, increase the efficiency of the overall system.

Embodiments of the invention encompass a number of systems and techniques for increasing the efficiency with which energy is exchanged between compressed gas, a hydraulic machine (motor, pump, or motor/pump), and/or a kinetic-mechanical device, e.g., a crankshaft, a driveshaft, or an elevated mass. For example, various embodiments of the invention increase the overall efficiency of assorted types of drive systems by limiting the hydraulic pressure range delivered to a hydraulic motor. Such systems may, for example, link a gas piston-type cylinder (e.g., compressed-air, internal-combustion cylinder) to a rotating shaft by a hydraulic cylinder and hydraulic motor. The hydraulic cylinder may be coupled to a hydraulic regenerative loop and unloading valve, or the hydraulic cylinder itself may have a discretely variable piston area (for example, the hydraulic cylinder may include or consist essentially of a digital hydraulic assembly as described in International Publication No. WO 2010/040890, filed Apr. 2, 2009 (the '890 application), the entire disclosure of which is incorporated by reference herein), to enable reduction of the pressure range over which the hydraulic cylinder operates (i.e., the ratio of highest to lowest fluid pressures developed at the output of the hydraulic cylinder) relative to the pressure range over which the gas cylinder operates (i.e., the ratio of highest to lowest gas pressures developed within the expansion chamber of the gas cylinder). Reducing the output pressure range of the hydraulic cylinder is advantageous because a hydraulic motor generally operates most efficiently over a limited range of fluid pressures. Confining the pressure range of the fluid driving the hydraulic motor to this range, or as nearly as possible to this range, increases the efficiency with which the motor is driven. Likewise, increasing pressure reduces required flow rates for a given power level (as fluid power is related to pressure multiplied by flow rate).

Furthermore, in various embodiments, two cylinder assemblies are operated in tandem, linked through a single hydraulic motor that exerts torque upon the shaft in a single sense regardless of the direction of fluid flow. The two cylinder assemblies may be operated 180° out-of-phase so that during each stroke, fluid flows from one (active) hydraulic cylinder, through the hydraulic motor, and into the other (inactive) hydraulic cylinder. The two cylinder assemblies may exchange fluid through the motor/pump valvelessly, i.e., the cylinder assemblies may be configured for continuous fluid communication without selectable interruption. As utilized herein, the term "valvelessly" encompasses continuous conduits between the cylinder assemblies and the motor/pump, as well as conduits featuring mechanisms that do not substantially impede fluid flow (e.g., valves configured to be continuously open or even broken valves). Additionally, two or more paired cylinder assemblies may be operated in tandem, their hydraulic motors acting upon a common shaft. By operating two or more paired cylinder assemblies at a phase difference (e.g., 90° out-of-phase), fluctuations in torque may be reduced at the common output shaft of the multiple (e.g., throughshaft) hydraulic motors. Each such tandem-operated cylinder assembly may feature a hydraulic cylinder having a discretely variable effective piston area (e.g., a cylinder having a hydraulic regenerative loop and unloading valve or a digital hydraulic assembly), as mentioned above, to reduce the pressure range of the fluid utilized to operate the hydraulic motors.

In certain aspects, embodiments of the invention enable efficient conversion between mechanical work and the elastic potential energy of compressed air, and vice versa, via an energy-conversion system that typically includes two or more pneumatic cylinders driven by expansion of compressed air, two or more hydraulic cylinders (each driven by one pneumatic cylinder), and one or more hydraulic motors driven by the fluid outputs of the two or more hydraulic cylinders. Such a system requires no hydraulic valves and so minimizes the parasitic energy losses entailed by valve actuation and throttling. Reducing valving and piping also increases system reliability and likely system lifetime.

During expansion of gas from storage in certain systems such as those disclosed in the '207 and '155 patents, the pressure of a quantity of gas within one chamber of a pneumatic or pneumatic-hydraulic cylinder exerts a force upon a piston and attached rod slidably disposed within the cylinder. The force exerted by the gas upon the piston and rod causes the piston and rod to move. Embodiments of the invention relate to a modified pneumatic or hydraulic intensifier assembly. The assembly typically includes a first cylinder assembly, a second cylinder assembly, and a coupling mechanism. The first cylinder assembly may include a first tubular body having a distal end and a proximal end; two end caps, where one end cap is coupled to the distal end of the first tubular body and the second end cap is coupled to the proximal end of the first tubular body; a first piston slidably disposed within the first tubular body; and a first piston rod extending from the first piston through the proximal end cap. The second cylinder assembly may include a second tubular body having a distal end and a proximal end; two end caps, where one end cap is coupled to the distal end of the second tubular body and the second end cap is coupled to the proximal end of the second tubular body; a second piston slidably disposed within the second tubular body; and a second piston rod extending from the second piston through the proximal end cap. The coupling mechanism couples the first piston rod and the second piston rod so that the first piston and the second piston move in unison.

Additional embodiments of the invention relate to a pneumatic-hydraulic intensifier assembly that typically includes a first cylinder assembly and a second cylinder assembly. The first cylinder assembly may include a first tubular body having a distal end and a proximal end; two end caps, where one end cap is coupled to the distal end of the first tubular body and the second end cap is coupled to the proximal end of the first tubular body; and a first piston having a defined surface area slidably disposed within the first tubular body. The second cylinder assembly may include a second tubular body having a distal end and a proximal end; two end caps, where one end cap is coupled to the distal end of the second tubular body and the second end cap is coupled to the proximal end of the second tubular body; and a second piston slidably disposed within the second tubular body. The assembly may also include a piston rod coupled to and extending from the first piston through the proximal end cap of the first cylinder assembly, through the proximal end cap of the second cylinder assembly, and coupled to the second piston.

In various embodiments, the first cylinder assembly includes or consists essentially of a pneumatic cylinder and the second cylinder assembly includes or consists essentially of a hydraulic cylinder. In such embodiments, a piston divides the interior of the pneumatic cylinder into two chambers. The gas in the proximal chamber of the pneumatic cylinder may be in free fluid communication with the atmosphere and therefore is at atmospheric pressure at all times. (In other embodiments, the proximal chamber may be active and the pneumatic cylinder double-acting.) The net force exerted on the pneumatic piston by the gas in the distal chamber and the gas in proximal chamber of the pneumatic cylinder is $F_1$ and acts from the distal chamber toward the proximal chamber. The force $F_1$ may be transmitted from the pneumatic piston to the hydraulic piston through the piston rod connecting the pneumatic piston to the hydraulic piston. In other embodiments, the force $F_1$ is transmitted from the pneumatic piston to the hydraulic piston through a first piston rod and a second piston rod connected by a coupling mechanism so that the first piston rod and second piston rod move in unison.

Within the hydraulic cylinder, the proximal chamber may contain hydraulic fluid that exerts force $F_2$ on the hydraulic piston that acts in the same sense as the force $F_1$ acting on the pneumatic piston. (In various embodiments, this fluid is used to force the piston down during a retract stroke, is used for power transmission for a double-acting pneumatic cylinder, and/or is vented to atmosphere. In other embodiments, the cylinder is a ram-style hydraulic cylinder with no proximal chamber, or the proximal chamber is air filled.) $F_2$ acts on the rod or rods connecting the pneumatic piston to the hydraulic piston in the same sense as the force $F_1$ in the distal chamber of the pneumatic cylinder (herein also termed the "expansion chamber" of the pneumatic cylinder).

The distal chamber of the hydraulic cylinder also contains fluid that exerts force $F_3$ on the hydraulic piston. The force $F_3$ acts in opposition to forces $F_1$ and $F_2$. Assuming other forces (e.g., friction) are negligible, $F_3=F_1+F_2$. The fluid in the distal chamber of the hydraulic cylinder is directed through ports and piping to a hydraulic motor that is driven by the fluid. The hydraulic motor may in turn drive a generator that produces electricity.

As described in the '207 and '155 patents, by dividing the air expansion into multiple stages, the pressure range in the distal chamber of the hydraulic cylinder, which is communicated to the hydraulic motor, may be reduced. For M appropriately sized pneumatic cylinders (pneumatic air stages) for a given expansion, the original pneumatic operating pressure range $R_P=P_{start}/P_{end}$ of a single stroke may be reduced to $R_P^{1/M}$.

Further embodiments of the invention increase the overall efficiency of various types of drive systems by limiting the hydraulic pressure range delivered to a hydraulic motor. Such systems may, for example, link a gas piston-type cylinder (e.g., a compressed-air, internal-combustion or pneumatic cylinder) to a rotating shaft by a hydraulic cylinder and hydraulic motor. The hydraulic cylinder is coupled to a hydraulic regenerative loop and unloading valve to enable reduction of the pressure range over which the hydraulic cylinder operates relative to the pressure range over which the gas cylinder operates. Reducing the output pressure range of the hydraulic cylinder is advantageous because a hydraulic motor operates most efficiently over a limited range of fluid pressures. Confining the pressure range of the fluid driving the hydraulic motor to this range, or as nearly as possible to this range, increases the efficiency with which the motor is driven. Likewise, increasing pressure reduces required flow rates for a given power level (as fluid power is related to pressure multiplied by flow rate).

Further embodiments of the invention include a pair of gas cylinders linked to a rotating shaft through two hydraulic cylinders, each of which may be coupled to a regenerative loop and unloading valve as described above; hydraulic fluid passes from one hydraulic cylinder to the other and back again through a hydraulic motor that exerts torque upon the shaft in a single sense regardless of the direction of fluid flow. Still other embodiments of the invention provide for the linkage to a common shaft of two or more pairs of gas cylinders through hydraulic cylinders that may be coupled to hydraulic regenerative loops and unloading valves.

A quantity of fluid within one chamber of a cylinder—for example, fluid combusting or expanding within one chamber of a gas cylinder—exerts a force upon a piston and attached rod slidably disposed within the cylinder. From basic physics, the net force F exerted on a piston having normal area A by an impinging quantity of gas at pressure P is given by F=PA.

Herein, the phrase "normal area" (of a piston) denotes the area of a projection of the piston's surface onto a plane normal to the piston's direction of motion.

Various embodiments of the invention relate to a modified hydraulic intensifier assembly. The assembly generally includes a first cylinder assembly, a second cylinder assembly, and a coupling mechanism. The first cylinder assembly may include (i) a first tubular body having a distal end and a proximal end, (ii) two end caps, one coupled to the distal end and the second coupled to the proximal end, (iii) a first piston slidably disposed within the first tubular body, and (iv) a first piston rod extending from the first piston through the proximal end cap. The second cylinder assembly may include (i) a second tubular body having a distal end and a proximal end, (ii) two end caps, one coupled to the distal end and the second coupled to the proximal end, (iii) a second piston slidably disposed within the second tubular body, and (iv) a second piston rod extending from the second piston through the proximal end cap. The coupling mechanism may couple the first piston rod and the second piston rod such that the first piston and the second piston move in unison.

Additional embodiments of the invention relate to a gas-and-hydraulic intensifier assembly. The assembly generally includes a first cylinder assembly and a second cylinder assembly. The first cylinder assembly may include or consist essentially of (i) a first tubular body having a distal end and a proximal end, (ii) two end caps, one coupled to the distal end and the second coupled to the proximal end, and (iii) a first piston having a defined surface area slidably disposed within the first tubular body. The second cylinder assembly may include or consist essentially of (i) a second tubular body having a distal end and a proximal end, (ii) two end caps, one coupled to the distal end and the second coupled to the proximal end, and (iii) a second piston slidably disposed within the second tubular body. The assembly also may include a piston rod coupled to and extending from the first piston through the proximal end cap of the first cylinder assembly, through the proximal end cap of the second cylinder assembly, and coupled to the second piston.

In various embodiments, the first cylinder assembly is a gas cylinder and the second cylinder assembly is a hydraulic cylinder. Herein, the term "gas cylinder" refers to a cylinder in whose distal chamber a pressurized gas, alone or mixed with liquids, is present, whether from a compression process, storage vessel, or from fluid combustion (such as due to internal combustion); the pressurized fluid exerts an increased force upon the piston that acts toward the proximal end of the piston. The piston of the gas cylinder has normal area $A_1$ and divides the interior of the gas cylinder into two chambers. The gas in the proximal chamber of the gas cylinder is typically in free fluid communication with the atmosphere and is therefore at atmospheric pressure at all times. The gas in the distal chamber of the gas cylinder is at pressure $P_1$ (expressed in units of psig, pounds per square inch gauge). The net force exerted on the piston by the gas in the distal chamber and the gas in proximal chamber of the gas cylinder is $F_1 = P_1 A_1$ and acts from the distal chamber toward the proximal chamber. The force $F_1 = P_1 A_1$ is transmitted from the internal-combustion piston to the piston of the hydraulic cylinder through the piston rod connecting the piston in the gas cylinder to the piston in the hydraulic cylinder. In other embodiments, the force $F_1 = P_1 A_1$ is transmitted from the piston in the gas cylinder to the piston in the hydraulic cylinder through a first piston rod and a second piston rod connected by a coupling mechanism such that the first piston rod and second piston rod move in unison.

Within the hydraulic cylinder, the proximal chamber contains hydraulic fluid that exerts force on the piston of the hydraulic cylinder that acts in the same sense as the force $F_1$ acting on the piston of the gas cylinder. In various embodiments, the rod entering the proximal chamber of the hydraulic cylinder through the proximal end cap is flush-mounted on the piston, i.e., the rod terminates in a planar face normal to the rod's axis and the planar face is mounted flush with the surface of the piston. The effective normal area $A_2$ presented by the piston of the hydraulic cylinder to the interior of the proximal chamber is the interior cross-sectional area of the hydraulic cylinder $A_c$ less the cross-sectional area of the rod $A_R$ (i.e., $A_2 = A_C - A_R$). The pressure of the fluid in the proximal chamber is $P_2$ and the force exerted on the piston of the hydraulic cylinder by the fluid in the proximal chamber is $F_2 = P_2 A_2$. $F_2$ acts on the rod or rods connecting the piston of the gas cylinder to the piston of the hydraulic cylinder in the same sense as the force $F_1$ in the distal chamber of the gas cylinder (herein also termed the "expansion chamber" of the gas cylinder).

The distal chamber of the hydraulic cylinder also contains fluid that exerts force on the piston of the hydraulic cylinder. The distal chamber contains no rod and the normal area $A_3$ presented by the piston of the hydraulic cylinder to the distal chamber is equal to the interior cross-sectional area of the cylinder (i.e., $A_3 = A_C$). The pressure of the fluid in the distal chamber is $P_3$ and the force exerted by the fluid in the distal chamber on the piston of the hydraulic cylinder is $F_3 = P_3 A_3$. The force $F_3$ acts in opposition to forces $F_1$ and $F_2$. Assuming other forces (e.g., friction) are negligible, $F_3 = F_1 + F_2$. The equation $F_3 = F_1 + F_2$ may also be written $P_3 A_3 = P_1 A_1 + P_2 A_2$.

The fluid in the distal chamber of the hydraulic cylinder is typically directed through ports and piping to a hydraulic motor that is driven by the fluid. The hydraulic motor may in turn drive a generator that produces electricity.

Furthermore, in various embodiments a regenerative loop and unloading valve and tank are associated with the hydraulic cylinder. The proximal chamber of the hydraulic cylinder, which contains fluid at pressure $P_2$ as described above, is connected through a port and piping with the input of a valve that may be set to direct its output to either (a) a tank containing hydraulic fluid at low (e.g., atmospheric) pressure or (b) the piping at the output of the second chamber of the hydraulic cylinder, which contains fluid at pressure $P_3$ as described above. Valve setting (a) is herein termed the "unloading" setting of the valve associated with the hydraulic cylinder. With the valve in the unloading setting, the pressure $P_2$ in the proximal chamber of the hydraulic cylinder is approximately equal to the low pressure in the tank. Valve setting (b) is herein termed the "regenerative" setting of the valve associated with the hydraulic cylinder. With the valve in the regenerative setting, the pressure $P_2$ in the proximal chamber of the hydraulic cylinder is approximately equal to $P_3$, the pressure in the distal chamber of the hydraulic cylinder.

In an initial condition, a quantity of gas (or gas and liquid intermixed) is brought to some initial pressure $P_{1:start}$ (e.g., pressurized gas is admitted through a valve or a fluid is combusted rapidly in the expansion chamber (distal chamber) of the gas cylinder, causing the pressure within that chamber to rise to $P_{1:start}$ over an interval of time short enough to ignore for the purposes of this analysis). At this pressure, the fluid exerts a force of $F_{1:start} = P_{1:start} A_1$ on the piston of the gas cylinder. In this state of operation, the valve associated with the hydraulic cylinder is set to its unloading setting. The proximal chamber of the hydraulic cylinder, which contains fluid at pressure $P_2$ as described above, is thus in fluid communication through the valve to the tank of low-pressure fluid and is at low pressure. As the fluid in the combustion chamber of the gas cylinder expands, the force $F_1$ that it exerts is communicated to the piston of the hydraulic cylinder by the rod or rods described above. As the piston of the hydraulic cylinder moves toward the distal end of the hydraulic cylinder, enlarging the proximal chamber of the hydraulic cylinder, fluid moves at low pressure from the low-pressure tank into the proximal chamber of the hydraulic cylinder. Throughout this expansion, $F_2$, the force exerted by the low-pressure fluid in the proximal chamber on the hydraulic cylinder's piston, is negligible (i.e., $F_2 \sim 0$). Since $F_3 = F_1 + F_2$, while the valve is in unloading position, $F_3 = F_1 + 0 = F_1$. Therefore, $P_3 A_3 = P_1 A_1$, where $P_3$ is the pressure in the distal chamber of the hydraulic cylinder and at the output of the hydraulic cylinder. It follows that $P_3 = P_1 A_1 / A_3$, and in particular that $P_{3:start} = P_{1:start} A_1 / A_3$.

The fluid in the expansion chamber of the gas cylinder will eventually expand to some low (endpoint) pressure $P_{1:end}$. If the hydraulic valve is kept in its unloading position, the relationships demonstrated above show that $P_{3:end} = P_{1:end} A_1 / A_3$. The ratio of start and end pressures in the expansion chamber of the gas cylinder is $P_{1:start}/P_{1:end}$ and the ratio of start and end pressures at the output of the hydraulic cylinder (i.e., in the distal chamber of the hydraulic cylinder and in the piping connected thereto) is $P_3:start/P_{3:end} = (P_{1:start} A_1 / A_3)/(P_{1:end} A_1/A_3) = P_{1:start}/P_{1:end}$. That is, the range of pressures developed at the output of the hydraulic cylinder, expressed as a ratio of start and end pressures, is equal to the range of pressures within the expansion chamber of the gas cylinder. If this range of pressures $P_{3:start}/P_{3:end} = P_{1:start}/P_{1:end}$ is larger than the range of pressures over which the hydraulic motor operates efficiently, energy will be lost due to inefficient hydraulic motor operation.

However, the assembly described above may also be operated as follows. A quantity of gas is brought to some initial pressure $P_{1:start}$ (e.g., pressurized gas is admitted through a valve or a fluid is combusted rapidly in the expansion chamber (distal chamber) of the gas cylinder, causing the pressure within that chamber to rise to $P_{1:start}$ over an interval of time short enough to ignore for the purposes of this analysis). This pressurized gas exerts an initial force on the piston of $F_{1:start} = P_{1:start} A_1$. The hydraulic valve is in its unloading position and the starting hydraulic output pressure $P_3$:start is equal to $P_{1:start} A_1/A_3$. The fluid in the expansion chamber of the gas cylinder expands and decreases in pressure. When the pressure of the fluid has decreased to some intermediate pressure $P_{1:inter}$, the hydraulic valve is switched to regenerative position, causing the pressures in the two chambers of the hydraulic cylinder to be effectively equal ($P_{2:inter} = P_{3:inter}$).

Setting the valve in the regenerative position changes the effective area presented by the piston of the hydraulic cylinder to the distal (output) chamber of the hydraulic cylinder as follows. As stated above, $P_3 A_3 = P_1 A_1 + P_2 A_2$. Since $P_2 = P_3$ (when the valve is in regenerative position), $P_3 A_3 = P_1 A_1 + P_3 A_2$. Rearrangement yields $P_3 = P_1 A_1/(A_3 - A_2)$, which may be compared to the relationship between $P_3$ and $P_1$ that would be obtained at the same fluid pressure with the valve in unloading position, i.e., $P_3 = P_1 A_1/A_3$. $P_3$ is greater with the valve in the regenerative position than with the valve in the unloading position by the factor $(P_1 A_1/(A_3 - A_2))/(P_1 A_1/A_3) = A_3/(A_3 - A_2)$.

For example, if the cross-sectional area of the hydraulic cylinder is $A_C = 10$ in$^2$ and the cross-sectional area of the rod in the first chamber of the hydraulic cylinder is $A_R = 2.5$ in$^2$, then by $A_2 = A_3 - A_R$ it is known that $A_2 = 10$ in$^2 - 2.5$ in$^2 = 7.5$ in$^2$. Also, $A_3 = A_C$. The factor $A_3/(A_3 - A_2)$ is then given by 10 in$^2/(10$ in$^2 - 7.5$ in$^2) = 4$. That is, for these exemplary dimensions, the output pressure of the hydraulic cylinder is increased by a factor of four when the valve is switched from unload position to regenerative position.

If pressurized fluid is expanded in the expansion chamber of the gas cylinder from a high starting pressure $P_{1:start}$ to a low final pressure $P_{1:end}$, with the hydraulic valve maintained in unloading position from the time the fluid is at $P_1$:start to the time the fluid is at intermediate pressure $P_{1:inter}$ and thenceforward in regenerative position until the time when the gas is at $P_{1:end}$, then the output pressure range of the hydraulic cylinder is decreased in comparison to that produced by an identical pressurized fluid expansion in the same assembly where the hydraulic valve is maintained in unloading position at all times.

For an appropriately chosen ratio of hydraulic cylinder piston and rod areas, the hydraulic pressure range achieved using the regenerative unload hydraulic cylinder may be the square root of the hydraulic pressure range achieved without the regenerative unload hydraulic cylinder. For example, a 16:1 gaseous cylinder pressure range ($P_{1:start}/P_{1:end} = 16$), may be transformed to a 4:1 hydraulic pressure range by changing the effective hydraulic piston area by a factor of 4:1 ($A_3/(A_3 - A_2) = 4$) at the appropriate gaseous pressure, $P_{1:inter} = P_{1:start}/4$. The proof of this assertion is as follows.

Let a given output hydraulic pressure range $HR_1$ from high pressure $HP_{max}$ to low pressure $HP_{min}$, namely $HR_1 = HP_{max}/HP_{min} = P_{1:start}/P_{1:end}$, be subdivided into two pressure ranges of equal magnitude $HR_2$. The first range is from $HP_{max}$ down to some intermediate pressure $HP_I$ and the second is from $HP_I$ down to $HP_{min}$. Thus, $HR_2 = HP_{max}/HP_I = HP_I/HP_{min}$. From this identity of ratios, $HP_I = (HP_{max}/HP_{min})^{1/2}$. Substituting for $HP_I$ in $HR_2 = HP_{max}/HP_I$, we obtain $HR_2 = HP_{max}/HP_{max}/HP_{min})^{1/2} = (HP_{max} HP_{min})^{1/2} = HR_1^{1/2}$.

Reducing the range of pressures developed at the output of the hydraulic cylinder to correspond more closely to the optimal input pressure range of the hydraulic motor will increase the efficiency with which the hydraulic motor is operated and will therefore increase the overall efficiency with which an assembly in accordance with embodiments of the present invention converts the energy (e.g., pressure potential energy in pressurized gas expansion or chemical potential energy in an pre-combusted fluid) introduced into the expansion chamber of the gas cylinder to mechanical work at the output of the hydraulic motor.

In additional various embodiments, two cylinder assemblies resembling those described above may be operated in tandem, linked through a single hydraulic motor that exerts torque upon the shaft in a single sense regardless of the direction of fluid flow. The two cylinder assemblies are operated 180° out of phase so that during each stroke, fluid flows from one (active) hydraulic cylinder, through the hydraulic motor, and into the other (inactive) hydraulic cylinder. In additional various embodiments, two or more such paired cylinder assemblies may be operated in tandem, their hydraulic motors acting upon a common shaft. By operating two or more paired cylinder assemblies at a phase difference (e.g., 90° out-of-phase), fluctuations in torque may be reduced at the common output shaft of the multiple (e.g., throughshaft) hydraulic motors.

Embodiments of the invention increase the efficiency of energy-conversion systems by employing a hydraulic cylinder having a discretely variable effective piston area (e.g., a digital hydraulic assembly, as described, for example, in the '890 application), to enable reduction of the pressure range over which the hydraulic cylinder operates relative to the pressure range over which the pneumatic cylinder operates. As mentioned previously, reducing the output pressure range of the hydraulic cylinder is advantageous because a hydraulic motor generally operates most efficiently over a limited range of fluid pressures. Confining the pressure range of the fluid driving the hydraulic motor to (or as nearly as possible to) this range increases the efficiency with which the motor is driven. By increasing hydraulic motor efficiency, the invention increases the overall efficiency of the energy-conversion system.

As mentioned above, during expansion of gas from storage in certain systems such as those disclosed in the '207 and '155 patents, the pressure of a quantity of gas within one chamber of a pneumatic or pneumatic-hydraulic cylinder exerts a force upon a piston and attached rod slidably disposed within the cylinder. The force exerted by the gas upon the piston and rod causes the piston and rod to move. The net force F exerted on a piston having normal area A by an impinging quantity of gas at pressure P is given by F=PA.

Embodiments of the invention relate to a modified pneumatic or hydraulic intensifier assembly that typically includes a first cylinder assembly, a second cylinder assembly, and a coupling mechanism. The first cylinder assembly may include a first tubular body having a distal end and a proximal end; two end caps, where one end cap is coupled to the distal end of the first tubular body and the second end cap is coupled to the proximal end of the first tubular body; a first piston slidably disposed within the first tubular body; and a first piston rod extending from the first piston through the proximal end cap. The second cylinder assembly may include a digital actuator or digital hydraulic assembly as described in the '890 application, where "digital actuator" and "digital hydraulic assembly" refer to a hydraulic cylinder assembly having multiple, selectable effective piston areas coded in a binary or other way, which areas may be connected to a pressurized body of fluid by a variety of coupling combinations. The digital hydraulic assembly may include a first tubular body having a distal end and a proximal end; two end caps, where one end cap is coupled to the distal end of the first tubular body and the second end cap is coupled to the proximal end of the first tubular body; a fixed rod or cylinder member positioned along the axis of the first tubular body and connected at its ends to the end caps at the distal and proximal ends of the first tubular body, the interior of which fixed rod is modified to enable the conveyance along its length of fluid through two or more channels; an annular (ring-shaped) piston slidably disposed within the first tubular body and concentric on the fixed rod; a second tubular body that is concentric on the fixed rod and whose proximal end is connected to the distal surface of the annular piston, and of which a portion is slidably disposed within the first tubular body through an annular opening in the first tubular body's distal end cap; a third end cap that is coupled to the distal end of the second tubular body, producing a tubular chamber that is bounded distally by the distal end cap of the second tubular body and proximally by a portion of the distal end cap of the first tubular body; and a second piston rod extending from the distal end cap of the second tubular body. The coupling mechanism couples the first piston rod and the second piston rod so that the first piston and the second piston move in unison.

In various embodiments, the first cylinder assembly is a pneumatic cylinder and the second cylinder assembly is a digital hydraulic assembly. In such embodiments, the piston of the pneumatic cylinder has a normal area $A_1$ and divides the interior of the pneumatic cylinder into two chambers. The gas in the proximal chamber of the pneumatic cylinder is in free fluid communication with the atmosphere and therefore is at atmospheric pressure at all times. The gas in the distal chamber of the pneumatic cylinder is at pressure $P_1$ (expressed in units of psig, pounds per square inch gauge). The net force exerted on the pneumatic piston by the gas in the distal chamber and the gas in proximal chamber of the pneumatic cylinder is $F_1=P_1A_1$ and acts from the distal chamber toward the proximal chamber. The force $F_1=P_1A_1$ may be transmitted from the pneumatic piston to the digital hydraulic assembly through the piston rod connecting the pneumatic piston to the digital hydraulic assembly. In other embodiments, the force $F_1=P_1A_1$ is transmitted from the pneumatic piston to the digital hydraulic assembly through a first piston rod and a second piston rod connected by a coupling mechanism so that the first piston rod and second piston rod move in unison.

The digital hydraulic assembly may include four discrete chambers A, B, C, and D and valving arrangements for optionally and individually placing each of these four chambers into fluid communication with either a body of fluid at relatively high pressure (e.g., a fluid-filled pipe communicating with a hydraulic motor) or a body of fluid at relatively low pressure (e.g., a tank). Different combinations of the four chambers A, B, C, and D may be placed into fluid communication with the either the high-pressure fluid or the low-pressure fluid in such a way as to vary the effective piston area of the digital actuator. Each pattern of chamber connection (herein termed a "connection pattern") entails a different effective piston area. For example, if 0 denotes low pressure, 1 denotes high pressure, and the equals sign "=" is used to denote connection of a given chamber to a given pressure, then the connection pattern A=0, B=1, C=1, D=0 produces an effective piston area that differs from the connection pattern A=1, B=0, C=0, D=0. As described in the '890 application, the ability to selectively and individually place each of the four chambers A, B, C, D in communication with either a low pressure or a high pressure entails 16 distinct possible connection patterns. These 16 connection patterns may correspond to up to 16 non-redundant (unique) possible effective piston areas for the digital hydraulic assembly.

For any given connection pattern, if force is applied to the digital hydraulic assembly by the second piston rod, the pressure of the high-pressure fluid within selected chambers of the digital hydraulic assembly will be proportional to the effective piston area of the digital actuator. That is, for a given applied force, a smaller effective piston area produces a higher pressure than a smaller effective area. The fluid in the high-pressure chambers of the hydraulic cylinder is directed through ports and piping to a hydraulic motor that is driven by the fluid. The hydraulic motor may in turn drive a generator that produces electricity.

In one initial condition, pressurized gas enters the expansion chamber (distal chamber) of the pneumatic cylinder at some start pressure $P_{1:start}$. At this pressure, the gas exerts a force of $F_{1:start}=P_{1:start}A_1$ on the pneumatic piston. The force $F_1$ that the gas exerts on the pneumatic piston is communicated to the digital hydraulic assembly by the rod or rods described above. In this initial condition, the pressure at the hydraulic fluid output of the digital hydraulic assembly is $P_{2:start}$. As the gas in the expansion chamber of the pneumatic cylinder expands, the rods of the pneumatic cylinder and the digital hydraulic assembly move in unison in the proximal direction; the pressure of the gas in the expansion chamber of the pneumatic cylinder decreases; and the force $F_1$ that the gas in the expansion chamber of the pneumatic cylinder exerts decreases. The gas in the expansion chamber of the pneumatic cylinder will eventually expand to some low (endpoint) pressure $P_{1:end}$.

The gas in the expansion chamber of the pneumatic cylinder decreases in pressure as it expands. If the digital hydraulic assembly is operated so as to maintain a constant effective area, then the range of pressures developed at the hydraulic fluid output of the digital actuator, expressed as a ratio of start pressure ($P_{2:start}$) to end ($P_{2:end}$) pressures is equal to the range of gas pressures within the expansion chamber of the pneumatic cylinder: $P_{2:start}/P_{2:end} = P_{1:start}/P_{1:end}$. If this range of pressures larger than the range of pressures over which the hydraulic motor operates efficiently, energy may be lost due to inefficient motor operation.

However, the system described above may also be operated as described in the following embodiment. In an initial operating condition, a quantity of pressurized gas is introduced into the expansion chamber of the pneumatic cylinder at some start pressure $P_{1:start}$ and exerts an initial force on the piston of $F_{1:start} = P_{1:start} A_1$. The hydraulic output pressure of the digital hydraulic assembly in this initial operating condition will be $P_{2:start}$, as in the previously described embodiment.

As the gas in the expansion chamber of the pneumatic cylinder expands, the rods of the pneumatic cylinder and the digital hydraulic assembly move in unison in the proximal direction; the pressure of the gas in the expansion chamber of the pneumatic cylinder decreases; and the force $F_1$ that the gas in the expansion chamber of the pneumatic cylinder exerts decreases. The gas in the expansion chamber of the pneumatic cylinder will eventually expand to some low (endpoint) pressure $P_{1:end}$. In this embodiment, $P_{1:start}$ and $P_{1:end}$ are identical to $P_{1:start}$ and $P_{1:end}$ in the previously described embodiment.

At N intermediate gas pressures $P_{1:n}$ (where n: 1→N, N≦16, $P_{1:start} \geq P_{1:1}$, and $P_{1:N} \geq P_{1:end}$), the four chambers of the digital hydraulic assembly are reconnected to high and low pressures such that the effective area of the digital hydraulic assembly increases through N discrete values while the force $F_1$ exerted by the gas in the expansion chamber of the pneumatic cylinder decreases. The final output pressure of the digital hydraulic assembly in this embodiment, $P'_{2:end}$, will be larger than the final output pressure of the digital hydraulic assembly in the previously described embodiment, $P_{2:end}$. It follows that the ratio of initial and final hydraulic output pressures for this embodiment is lower than in the previous embodiment: $P_{2:start}/P'_{2:end} \leq P_{2:start}/P_{2:end}$, where $P_{2:start}/P_{2:end} = P_{1:start}/P_{1:end}$. That is, the output pressure range of the digital hydraulic assembly is smaller than that produced by an identical gas expansion in the same system where the digital hydraulic assembly is maintained at a single effective piston area. If the effective piston area of the digital hydraulic assembly is operated so as to keep the range of output fluid pressures of the digital hydraulic assembly as small as possible throughout gas expansion, the hydraulic motor will be driven over a minimal range of fluid pressures. If this range is chosen judiciously (e.g., is centered on the optimum driving pressure for the hydraulic motor), operation over a minimal range of fluid pressures will be more efficient than operation over a wider range of fluid pressures.

As mentioned above, as reviewed in the '207 and '155 patents, by dividing the air expansion into multiple stages, the hydraulic pressure range may be further reduced. For M appropriately sized pneumatic cylinders (pneumatic air stages) for a given expansion, the original pneumatic operating pressure range $R_1 = P_{1:start}/P_{1:end}$ of a single stroke may be reduced to $R_1^{1/M}$. Since for a given hydraulic cylinder arrangement the output hydraulic pressure range is directly proportional to the pneumatic operating pressure range for each stroke, simultaneously combining M pneumatic cylinders with one or more digital hydraulic assemblies may realize a pressure range reduction to the 1/(2×M) power.

Yet other embodiments of the invention improve the efficiency of energy storage and recovery systems by temporarily and internally storing energy as potential energy of position of an elevated (i.e., raised) mass. The force used to elevate the mass need not be constant, but once it has been elevated, the mass exerts a constant downward force upon its supports, which may include rods connected to the pistons of one or more pneumatic or hydraulic cylinders.

Embodiments of the invention enable increased efficiency during both expansion of gas from storage and compression of gas into storage, as follows. During expansion of gas from storage in certain systems such as those disclosed in the '207 and '155 patents (or during combustion of fluid), the pressure of a quantity of gas within a hydraulic cylinder exerts a force upon a piston and attached rod slidably disposed within the cylinder. If the cylinder is vertically oriented, the rod attached to the piston transmits this force upward to a mass (e.g., of concrete or steel or other suitable rigid material). This transmitted force will vary (i.e., decrease) as the quantity of gas expands; however, if this transmitted force is at all times greater than the weight of the mass, the mass will be accelerated upwards. The work done by the transmitted force acting through the vertical distance traveled by the mass will be converted to both kinetic energy and gravitational potential energy. At some point the quantity of gas in the pneumatic cylinder will cease to exert force sufficient to accelerate the mass upwards and the velocity of the mass will diminish under the influence of gravity. When the mass reaches zero upward velocity, all the pneumatic energy from the expansion not lost to friction will have been converted to gravitational potential energy of position. At the point of zero velocity, a hydraulic cylinder may be engaged to prevent the mass from moving downward in a near freefall against the now-reduced pneumatic cylinder pressures.

When the mass is allowed to fall, its potential energy of position is transferred to a hydraulic subsystem. When the elevated mass is stationary or moving vertically upward or downward at any constant velocity, it exerts a constant force equal to its own weight on its supports. If the constant force exerted by the elevated mass is applied to the rod of a hydraulic cylinder, and the pistons and rods of the cylinder are free to move, and the piston of the hydraulic cylinder acts upon a fluid-filled chamber, the fluid within that chamber will be raised to a constant pressure. If the fluid within the chamber is conducted to the input of hydraulic pump/motor, the hydraulic pump/motor may operate at constant rotational speed and power output for the duration of the downward stroke of the hydraulic cylinder. The constant speed and power at which the hydraulic pump/motor is operated in such a system may be selected to achieve the highest possible efficiency. Although the power provided by the expanding gas in the pneumatic cylinder is time-varying, the power provided to the hydraulic cylinder is typically time-constant.

During compression of gas for storage by the system just described, the hydraulic pump/motor, operated at optimal speed and power, forces hydraulic fluid at constant pressure into the lower chamber of the hydraulic cylinder, exerting an upward force upon the piston and rod of the cylinder and thus on the elevated mass with which the rod communicates. If this upward force is greater than the weight of the elevated mass, the mass will accelerate upward. The work done by the transmitted force acting through the vertical distance traveled by the mass will be, in effect, stored within the mass as gravitational potential energy of position at the end of stroke when the mass returns to zero velocity.

At some point the hydraulic cylinder will have completed its stroke and will not elevate the mass any farther. The mass may then be allowed to fall, and if connected to gas-filled pneumatic cylinders will transfer its gravitational potential energy of position to the pneumatic subsystem. The force of its weight, applied to the rod of a pneumatic cylinder, will compress a quantity of gas in the lower chamber of the pneumatic cylinder, which may be conducted to a storage vessel. By appropriately sizing the mass and the pneumatic cylinders, the mass will reach end of stroke at the time it returns to zero velocity.

Embodiments of the invention include at least four techniques for transferring energy between cylinders containing pressurized liquids and pressurized gases by storing energy temporarily and intermediately as the potential energy of position of a raised mass or masses. First, in a system employing at least one pneumatic cylinder for the expansion or compression of gas, and employing at least one hydraulic cylinder for the exertion of force by or upon a constant-speed hydraulic pump-motor, energy may be transferred between the pneumatic and hydraulic subsystems in either direction by first transforming it into the potential energy of position of a single elevated mass.

Second, in a system employing at least two pneumatic cylinders for the expansion or compression of gas, and employing at least two hydraulic cylinders for the exertion of hydraulic force by or upon one or more constant-speed hydraulic pump-motors, energy may be transferred between the pneumatic and hydraulic subsystems in either direction by first transforming it into the potential energy of position of two elevated masses. While one of the two elevated masses is being raised by the one or more pneumatic or hydraulic cylinders, the other elevated mass is descending, transferring its potential energy of position to one or more pneumatic or hydraulic cylinders. With this arrangement, there is no prolonged interval during which the one or more hydraulic pump/motors are not supplied with hydraulic fluid at constant pressure: the hydraulic pump/motors run continuously. In a single-mass system, in contrast, the hydraulic pump/motor may typically be driven by potential energy of position only while the single elevated mass is descending.

Third, in a system such as those described immediately above in accordance with the first two techniques, force may be communicated between each elevated mass and one or more pneumatic cylinders by means of a linkage, cable, chain, belt, or other mechanism that provides a varying gear ratio, such as the use of a cable over nautilus gear (i.e., gear of non-uniform radius) acting as a pulley. The effective gear ratio of the nautilus gear changes with angular displacement. Coupling the varying force exerted by a pneumatic cylinder in which gas is expanding to an elevated mass by means of an appropriate variable moment arm gear may decrease the range power variation transmitted from the expanding gas to the mass.

Fourth, In a system employing at least one pneumatic-hydraulic cylinder for the expansion or compression of gas, and employing at least one hydraulic cylinder for the exertion of force by or upon a constant-speed hydraulic pump-motor, energy may be transferred from each pneumatic-hydraulic cylinder to one or more vertically-aligned hydraulic cylinders coupled mechanically to the elevated mass. That is, the force exerted by the expanding gas may be transmitted hydraulically to the elevated mass. If two or more hydraulic cylinders are used to transmit force to the elevated mass, then the system may be operated so as to reduce the range over which power is communicated from the expanding gas to the elevated mass. That is, one or more of the hydraulic cylinders used to transmit force to the elevated mass may be isolated by valves from the pneumatic-hydraulic cylinder in which the gas is being expanded in order to lower the power (i.e., the rate at which energy is transmitted from the expanding gas to the elevated mass). Reducing the power range has the advantage of improved heat transfer. This method may also be employed using two or more elevated masses with associated cylinder assemblies, operating alternately as described above.

Gas undergoing expansion tends to cool, while gas undergoing compression tends to heat. To maximize efficiency (i.e., the fraction of elastic potential energy in the compressed gas that is converted to work, or vice versa), gas expansion and compression should be as near isothermal (i.e., constant-temperature) as possible. Several techniques of approximating isothermal expansion and compression may be employed in accordance with embodiments of the invention.

First, as described in U.S. Pat. No. 7,802,426, filed Jun. 9, 2009 (the '426 patent), the disclosure of which is hereby incorporated by reference herein in its entirety, gas undergoing either compression or expansion may be directed, continuously or in installments, through a heat-exchange subsystem external to the cylinder. The heat-exchange subsystem either rejects heat to the environment (to cool gas undergoing compression) or absorbs heat from the environment (to warm gas undergoing expansion). An isothermal process may be approximated via judicious selection of this heat-exchange rate.

Additionally, as described in the '155 patent, droplets of a liquid (e.g., water) may be sprayed into a chamber of the cylinder in which gas is presently undergoing compression (or expansion) in order to transfer heat to or from the gas. As the liquid droplets exchange heat with the gas around them, the temperature of the gas is raised or lowered; the temperature of the droplets is also raised or lowered. The liquid is evacuated from the cylinder through a suitable mechanism. The heat-exchange spray droplets may be introduced through a spray head (in, e.g., a vertical cylinder), through a spray rod arranged coaxially with the cylinder piston (in, e.g., a horizontal cylinder), or by any other mechanism that permits formation of a liquid spay within the cylinder. Droplets may be used to either warm gas undergoing expansion or to cool gas undergoing compression. Again, an isothermal process may be approximated via judicious selection of this heat-exchange rate.

Embodiments of the present invention are typically utilized in energy storage and generation systems utilizing compressed gas. In a compressed-gas energy storage system, gas is stored at high pressure (e.g., approximately 3,000 psi). This gas may be expanded into a cylinder having a first compartment (or "chamber") and a second compartment separated by a piston slidably disposed within the cylinder (or by another boundary mechanism). A shaft may be coupled to the piston and extend through the first compartment and/or the second compartment of the cylinder and beyond an end cap of the cylinder, and a transmission mechanism may be coupled to the shaft for converting a reciprocal motion of the shaft into a rotary motion, as described in the '595 and '853 applications. Moreover, a motor/generator may be coupled to the transmission mechanism. Alternatively or additionally, the shaft of the cylinders may be coupled to one or more linear generators, as described in the '853 application.

As also described in the '853 application, the range of forces produced by expanding a given quantity of gas in a given time may be reduced through the addition of multiple, series-connected cylinder stages. That is, as gas from a high-pressure reservoir is expanded in one chamber of a first, high-pressure cylinder, gas from the other chamber of the first cylinder is directed to the expansion chamber of a second, lower-pressure cylinder. Gas from the lower-pressure chamber of this second cylinder may either be vented to the environment or directed to the expansion chamber of a third cylinder operating at still lower pressure; the third cylinder may be similarly connected to a fourth cylinder; and so on.

The principle may be extended to more than two cylinders to suit particular applications. For example, a narrower output force range for a given range of reservoir pressures is achieved by having a first, high-pressure cylinder operating between, for example, approximately 3,000 psig and approximately 300 psig and a second, larger-volume, lower-pressure cylinder operating between, for example, approximately 300 psig and approximately 30 psig. When two expansion cylinders are used, the range of pressure within either cylinder (and thus the range of force produced by either cylinder) is reduced as the square root relative to the range of pressure (or force) experienced with a single expansion cylinder, e.g., from approximately 100:1 to approximately 10:1 (as set forth in the '853 application). Furthermore, as set forth in the '595 application, N appropriately sized cylinders can reduce an original operating pressure range R to $R^{1/N}$. Any group of N cylinders staged in this manner, where $N \geq 2$, is herein termed a cylinder group.

All of the approaches described above for converting potential energy in compressed gas into mechanical and electrical energy may, if appropriately designed, be operated in reverse to store electrical energy as potential energy in a compressed gas. Since the accuracy of this statement will be apparent to any person reasonably familiar with the principles of electrical machines, power electronics, pneumatics, and the principles of thermodynamics, the operation of these mechanisms to both store energy and recover it from storage will not be described for each embodiment. Such operation is, however, contemplated and within the scope of the invention and may be straightforwardly realized without undue experimentation.

The systems described herein, and/or other embodiments employing liquid-spray heat exchange or external gas heat exchange, may draw or deliver thermal energy via their heat-exchange mechanisms to external systems (not shown) for purposes of cogeneration, as described in U.S. Pat. No. 7,958,731, filed Jan. 20, 2010 (the '731 patent), the entire disclosure of which is incorporated by reference herein.

The compressed-air energy storage and recovery systems described herein are preferably "open-air" systems, i.e., systems that take in air from the ambient atmosphere for compression and vent air back to the ambient after expansion, rather than systems that compress and expand a captured volume of gas in a sealed container (i.e., "closed-air" systems). Thus, the systems described herein generally feature one or more cylinder assemblies for the storage and recovery of energy via compression and expansion of gas. The systems also include (i) a reservoir for storage of compressed gas after compression and supply of compressed gas for expansion thereof, and (ii) a vent for exhausting expanded gas to atmosphere after expansion and supply of gas for compression. The storage reservoir may include or consist essentially of, e.g., one or more one or more pressure vessels (i.e., containers for compressed gas that may have rigid exteriors or may be inflatable, and that may be formed of various suitable materials such as metal or plastic) or caverns (i.e., naturally occurring or artificially created cavities that are typically located underground). Open-air systems typically provide superior energy density relative to closed-air systems.

Furthermore, the systems described herein may be advantageously utilized to harness and recover sources of renewable energy, e.g., wind and solar energy. For example, energy stored during compression of the gas may originate from an intermittent renewable energy source of, e.g., wind or solar energy, and energy may be recovered via expansion of the gas when the intermittent renewable energy source is nonfunctional (i.e., either not producing harnessable energy or producing energy at lower-than-nominal levels). As such, the systems described herein may be connected to, e.g., solar panels or wind turbines, in order to store the renewable energy generated by such systems.

In one aspect, embodiments of the invention feature a system for energy storage and recovery including or consisting essentially of a first cylinder assembly communicating fluid pressure varying over a first pressure range, a second cylinder assembly for receiving a varying force derived from the fluid pressure from the first cylinder assembly, and a motor/pump. The second cylinder assembly communicates fluid pressure varying over a second pressure range smaller than the first pressure range. The motor/pump is in fluid communication with the second cylinder assembly and receives therefrom fluid pressure varying over the second pressure range.

Embodiments of the invention incorporate one or more of the following in any of a variety of combinations. The first cylinder assembly may be configured to communicate fluid pressure varying unidirectionally over the first pressure range during a single stroke (e.g., of compression or expansion). The second cylinder assembly may be configured to communicate fluid pressure oscillating over the second pressure range during the single stroke. The first cylinder assembly may include or consist essentially of a cylinder including or consisting essentially of two separated compartments and a piston separating the compartments. A source of fluid for introduction into the first compartment of the first cylinder assembly may be selectively fluidly coupled to the first compartment of the first cylinder assembly. The fluid source may include or consist essentially of, e.g., at least a portion of an internal-combustion engine or a compressed-gas reservoir. The second compartment of the first cylinder assembly may be in fluid communication with the ambient atmosphere. A vent may be selectively fluidly coupled to the first compartment of the first cylinder assembly. The first cylinder assembly may include or consist essentially of an internal-combustion cylinder (i.e., a cylinder for the combustion of one or more fluids, with the concomitant expansion of gas, therein) or a pneumatic cylinder. The second cylinder assembly may include or consist essentially of a hydraulic cylinder.

The second cylinder assembly may have a discretely variable effective piston area. The second cylinder assembly may include or consist essentially of a digital hydraulic assembly. The first cylinder assembly may include or consist essentially of a pneumatic cylinder including or consisting essentially of two separated compartments and a piston separating the compartments, and the second cylinder assembly may include a piston assembly mechanically coupled to the piston of the first cylinder assembly. The piston of the first cylinder assembly and the piston assembly of the second cylinder assembly may be configured for movement in unison in the same direction. A mechanism for reducing the varying force derived from the fluid pressure from the first cylinder assembly to the second pressure range may be associated with the second cylinder assembly. The second cylinder assembly may include or consist essentially of a cylinder including or consisting essentially of first and second separated compartments and a piston separating the compartments, and the mechanism may include or consist essentially of a conduit for selectively fluidly connecting the first compartment of the second cylinder assembly either to the second compartment of the second cylinder assembly or to a volume of hydraulic fluid at a pressure lower than a minimum pressure of the second pressure range (e.g., approximately atmospheric pressure). When the first and second compartments of the second cylinder assembly are fluidly connected, fluid may travel (i) from the second compartment of the second cylinder assembly to the motor/pump and the first compartment of the second cylinder assembly, or (ii) from the motor/pump to both the first and second compartments of the second cylinder assembly.

The first and second cylinder assemblies may each include a piston therein, and the pistons may be mechanically coupled (e.g., by at least one piston rod extending between the pistons). The pistons of the first and second cylinder assemblies may be configured for movement in unison in the same direction. The output of the motor/pump may be coupled to an electric motor/generator. The motor/pump may have an optimal operating pressure range (i) smaller than the first pressure range and (ii) at least partially overlapping the second pressure range. The system may include, connected to the motor/pump and configured to drive the motor/pump in alternation with the first and second cylinder assemblies, an apparatus including or consisting essentially of a third cylinder assembly communicating fluid pressure varying over a third pressure range and a fourth cylinder assembly for receiving varying force derived from the fluid pressure from the third cylinder assembly. The fourth cylinder assembly may communicate fluid pressure varying over a fourth pressure range smaller than the third pressure range. The third cylinder assembly may be configured to communicate fluid pressure varying unidirectionally over the third pressure range during a single stroke. The fourth cylinder assembly may be configured to communicate fluid pressure oscillating over the fourth pressure range during the single stroke. The motor/pump may have an optimal operating pressure range (i) smaller than the third pressure range and (ii) at least partially overlapping the fourth pressure range. The second cylinder assembly and the fourth cylinder assembly may be configured to exchange fluid through the motor/pump. The motor/pump may include or consist essentially of a variable-displacement over-center closed-loop hydraulic motor. The first and third cylinder assemblies may each include or consist essentially of two separated compartments, and a compartment of the first cylinder assembly may be in selective fluid communication with a compartment of the third cylinder assembly. A cross-sectional area of the third cylinder assembly may be greater than a cross-sectional area of the first cylinder assembly. The fourth cylinder assembly may have a discretely variable effective piston area. The fourth cylinder assembly may include or consist essentially of a digital hydraulic assembly. A mechanism for reducing the varying force derived from the fluid pressure from the third cylinder assembly to the fourth pressure range may be associated with the fourth cylinder assembly. The fourth cylinder assembly may include or consist essentially of a cylinder including or consisting essentially of first and second separated compartments and a piston separating the compartments, and the mechanism may include or consist essentially of a conduit for selectively fluidly connecting the first compartment of the fourth cylinder assembly either to the second compartment of the fourth cylinder assembly or to a volume of hydraulic fluid at a pressure lower than a minimum pressure of the fourth pressure range (e.g., approximately atmospheric pressure). When the first and second compartments of the fourth cylinder assembly are fluidly connected, fluid may travel (i) from the second compartment of the fourth cylinder assembly to the motor/pump and the first compartment of the fourth cylinder assembly, or (ii) from the motor/pump to both the first and second compartments of the fourth cylinder assembly.

The first cylinder assembly may communicate fluid pressure via compression and/or expansion of gas, and the system may include a heat-exchange subsystem for exchanging heat with the gas during the compression and/or expansion. The heat-exchange subsystem may maintain the gas at a substantially constant temperature during the compression and/or expansion. The heat-exchange subsystem may include a mechanism for introducing heat-exchange fluid into the first cylinder assembly, e.g., a spray mechanism such as a spray head and/or a spray rod. The heat-exchange subsystem may include a heat exchanger, external to the first cylinder assembly, for thermally conditioning gas from the first cylinder assembly and/or heat-exchange fluid circulated between the first cylinder assembly and the heat exchanger. An intermittent renewable energy source (e.g., of wind or solar energy) may be connected to the first cylinder assembly. Energy stored during compression of gas may originate from the intermittent renewable energy source, and energy may be recovered via expansion of gas when the intermittent renewable energy source is nonfunctional.

In another aspect, embodiments of the invention feature a method for energy recovery including or consisting essentially of expanding a gas to produce a pressure smoothly decreasing over a first pressure range, producing, from pressures within the first pressure range and in reaction to the gas expansion, a hydraulic pressure varying over a second pressure range smaller than the first pressure range, and driving a motor via only the hydraulic pressure varying over the second pressure range.

Embodiments of the invention incorporate one or more of the following in any of a variety of combinations. The hydraulic pressure produced in reaction to the gas expansion may oscillate over the second pressure range. Electricity may be generated with the driven motor. The motor may have an optimal operating pressure range (i) smaller than the first pressure range and (ii) at least partially overlapping the second pressure range. Gas may be expanded within a first cylinder assembly, and the hydraulic pressure varying over the second pressure range may be produced within a second cylinder assembly mechanically coupled to the first cylinder assembly. The first cylinder assembly may include or consist essentially of a cylinder including or consisting essentially of two separated compartments and a piston disposed within the first cylinder assembly separating the compartments. The second cylinder assembly may include or consist essentially of a cylinder having a discretely variable effective piston area, e.g., a digital hydraulic assembly.

The second cylinder assembly may include or consist essentially of first and second separated compartments, and during the gas expansion, the second compartment of the second cylinder assembly may be selectively fluidly connected to, in turn, (a) a volume of hydraulic fluid at a pressure lower than a minimum pressure of the second pressure range (e.g., approximately atmospheric pressure) and (b) the first compartment of the second cylinder assembly, thereby reducing the hydraulic pressure range to the second pressure range. The second cylinder may include or consist essentially of a plurality of separate compartments, at least one of the compartments being deactivated during the gas expansion to reduce the hydraulic pressure range to the second pressure range. Deactivating the at least one compartment may include or consist essentially of disconnecting the at least one compartment from the motor and connecting the at least one compartment to a volume of hydraulic fluid having a pressure lower than a minimum pressure of the second pressure range (e.g., approximately atmospheric pressure). Gas may be expanded within a third cylinder assembly mechanically coupled to a fourth cylinder assembly. The expansion in the third cylinder assembly may translate fluid from the fourth cylinder assembly to drive the motor in alternation with the expansion in the first cylinder assembly.

The gas may be received from a fluid source prior to the expansion. The fluid source may include or consist essentially of a compressed-gas reservoir or at least a portion of an internal-combustion engine. The expanded gas may be vented to atmosphere after expansion. Gas may be expanded to supply energy when an intermittent source of renewable energy is nonfunctional. The gas may be thermally conditioned during expansion. The thermal conditioning may include or consist essentially of maintaining the gas at a substantially constant temperature during the expansion. Expanding the gas may include or consist essentially of combusting a fluid within a first cylinder assembly, and the hydraulic pressure varying over the second pressure range may be produced within a second cylinder assembly mechanically coupled to the first cylinder assembly. The first cylinder assembly may include or consist essentially of an internal-combustion cylinder and the second cylinder assembly may include or consist essentially of a cylinder having a discretely variable effective piston area, e.g., a digital hydraulic assembly.

In yet another aspect, embodiments of the invention feature a method for energy recovery including or consisting essentially of expanding a gas within a first cylinder assembly mechanically coupled to a second cylinder assembly, thereby producing a pressure smoothly decreasing over a first pressure range. The expansion translates a fluid from the second cylinder assembly to drive a motor/pump over a second pressure range smaller than the first pressure range.

Embodiments of the invention incorporate one or more of the following in any of a variety of combinations. The pressure of the translating fluid may oscillate over the second pressure range. The second cylinder assembly may have a discretely variable effective piston area. The second cylinder assembly may include or consist essentially of a digital hydraulic assembly. The second cylinder assembly may include or consist essentially of two separated compartments, and, during the gas expansion, the second compartment of the second cylinder assembly may be selectively fluidly connected to, in turn, (a) a volume of hydraulic fluid at a pressure lower than a minimum pressure of the second pressure range and (b) the first compartment of the second cylinder assembly, thereby reducing a pressure range of the translating fluid to the second pressure range.

The second cylinder assembly may include or consist essentially of a plurality of separate compartments, and at least one of the compartments may be deactivated during the gas expansion to reduce the pressure range of the translating fluid to the second pressure range. Deactivating the at least one compartment may include or consist essentially of disconnecting the at least one compartment from the motor/pump and connecting the at least one compartment to a volume of hydraulic fluid having a pressure lower than a minimum pressure of the second pressure range (e.g., approximately atmospheric pressure).

The motor/pump may be driven over only the second pressure range. Electricity may be generated with the driven motor/pump. The motor/pump may have an optimal operating pressure range (i) smaller than the first pressure range and (ii) at least partially overlapping the second pressure range. The gas may be received from a fluid source (e.g., a compressed-gas reservoir or at least a portion of an internal-combustion engine) prior to the expansion. The expanded gas may be vented to atmosphere after expansion. Gas may be expanded to supply energy when an intermittent source of renewable energy is nonfunctional. The gas may be thermally conditioned during expansion. The thermal conditioning may include or consist essentially of maintaining the gas at a substantially constant temperature during the expansion. Gas may be expanded within a third cylinder assembly mechanically coupled to a fourth cylinder assembly, the expansion in the third cylinder assembly translating fluid from the fourth cylinder assembly to drive the motor/pump in alternation with the expansion in the first cylinder assembly.

In another aspect, embodiments of the invention feature a system for energy transmission in connection with a plurality of motor/pumps. The system includes or consists essentially of a plurality of cylinder-assembly pairs, each cylinder-assembly pari including or consisting essentially of first and second cylinder assemblies fluidly connected to and alternately driving an associated motor/pump, and a drive shaft mechanically coupled to each of the motor/pumps. The first and/or second cylinder assemblies of at least one of the cylinder-assembly pairs is configured to receive a varying force derived from fluid pressure over a first pressure range and transmit fluid pressure to its associated motor/pump over a second pressure range smaller than the first pressure range.

Embodiments of the invention incorporate one or more of the following in any of a variety of combinations. The first and/or second cylinder assembly may include or consist essentially of a digital hydraulic assembly. The first and/or second cylinder assembly may have a discretely variable effective piston area. The first and/or second cylinder assembly may be configured to (i) receive the varying force derived from fluid pressure varying unidirectionally over the first pressure range during a single stroke and (ii) transmit fluid pressure that oscillates over the second pressure range during the single stroke. The at least one of the first or second cylinder assemblies may include or consist essentially of first and second separated compartments, the first compartment being selectively fluidly connectable to, in turn, (a) a volume of hydraulic fluid at a pressure lower than a minimum pressure of the second pressure range and (b) the second compartment, to thereby decrease the range over which the fluid pressure is transmitted to the second pressure range. The at least one of the first or second cylinder assemblies may include or consist essentially of a plurality of compartments, at least one of the compartments being selectively deactivatable to thereby decrease the range over which the fluid pressure is transmitted to the second pressure range. The motor/pump associated with said at least one cylinder-assembly pair may have an optimal operating pressure range (i) smaller than the first pressure range and (ii) at least partially overlapping the second pressure range. The first and second cylinder assemblies of at least one of the cylinder-assembly pairs may be configured to exchange fluid through the motor/pump with which they are associated. The at least one of the first or second cylinder assemblies may include a mechanism for decreasing the range over which the fluid pressure is transmitted to the second pressure range. The at least one of the first or second cylinder assemblies may include or consist essentially of first and second separated compartments, and the mechanism may include or consist essentially of a conduit for selectively fluidly connecting the first compartment either to the second compartment or to a volume of hydraulic fluid at a pressure lower than a minimum pressure of the second pressure range (e.g., approximately atmospheric pressure).

The system may include an electric motor coupled to the drive shaft. The plurality of cylinder-assembly pairs may drive their respective motor/pumps at arbitrary phases with respect to each other. At least two of the cylinder assembly pairs may drive their respective motor/pumps out-of-phase relative to each other (e.g., at a non-180° phase difference relative to each other). The system may be free of a mechanism to regulate relative timing of operation of the plurality of cylinder-assembly pairs.

In a further aspect, embodiments of the invention feature, in a system including a first cylinder assembly mechanically coupled to a second cylinder assembly configured for translation of a hydraulic fluid between the second cylinder assembly and a hydraulic system, an apparatus for improving energy transmission including or consisting essentially of a mechanism for reducing an output pressure range of the hydraulic fluid translating to the hydraulic system. The second cylinder assembly may include or consist essentially of first and second separated compartments, and the output-pressure-range-reducing mechanism may include or consist essentially of a conduit for selectively fluidly connecting the first compartment of the second cylinder assembly either to the second compartment of the second cylinder assembly or to a volume of hydraulic fluid at a pressure lower than a minimum pressure of the second pressure range.

In yet a further aspect, embodiments of the invention feature a system for energy transmission in connection with a plurality of motor/pumps that includes or consists essentially of a plurality of cylinder-assembly pairs, each cylinder-assembly pair comprising or consisting essentially of first and second cylinder assemblies fluidly connected to and alternately driving an associated motor/pump, and a drive shaft mechanically coupled to each of the motor/pumps. At least two of the cylinder-assembly pairs drive their respective motor/pumps out-of-phase relative to each other, thereby reducing fluctuations in torque on the drive shaft.

Embodiments of the invention incorporate one or more of the following in any of a variety of combinations. The plurality of cylinder assembly pairs may include or consist essentially of at least three cylinder-assembly pairs, and each of the cylinder-assembly pairs may drive its respective motor/pump out-of-phase relative to the others. The system may be free of a mechanism to regulate relative timing of operation of the plurality of cylinder-assembly pairs. An electric motor may be coupled to the drive shaft. The first and second cylinder assemblies of at least one (or even each) of the cylinder-assembly pairs may be configured to valvelessly exchange fluid through the motor/pump with which they are associated.

At least one of the first or second cylinder assemblies of at least one of the cylinder-assembly pairs may be configured to receive a varying force derived from fluid pressure over a first pressure range and transmit fluid pressure to its associated motor/pump over a second pressure range smaller than the first pressure range. The at least one of the first or second cylinder assemblies may be configured to (i) receive the varying force derived from fluid pressure varying unidirectionally over the first pressure range during a single stroke and (ii) transmit fluid pressure that oscillates over the second pressure range during the single stroke. The at least one of the first or second cylinder assemblies may include or consist essentially of a digital hydraulic assembly. The at least one of the first or second cylinder assemblies may have a discretely variable effective piston area. The at least one of the first or second cylinder assemblies may include or consist essentially of first and second separate compartments, the first compartment being selectively fluidly connectable to, in turn, (a) a volume of hydraulic fluid at a pressure lower than a minimum pressure of the second pressure range and (b) the second compartment, to thereby decrease a range over which the fluid pressure is transmitted to the second pressure range. The motor/pump associated with said at least one cylinder-assembly pair may have an optimal operating pressure range (i) smaller than the first pressure range and (ii) at least partially overlapping the second pressure range. The at least one of the first or second cylinder assemblies may include a mechanism for decreasing the range over which the fluid pressure is transmitted to the second pressure range. The at least one of the first or second cylinder assemblies may include or consist essentially of two separated compartments, and the mechanism may include or consist essentially of a conduit for selectively fluidly connecting the first compartment either to the second compartment or to a volume of hydraulic fluid at a pressure lower than a minimum pressure of the second pressure range.

In an aspect, embodiments of the invention feature a method for energy recovery from compressed gas including or consisting essentially of expanding a gas to recover energy, converting energy obtained from the gas expansion into gravitational potential energy, and converting the gravitational potential energy into hydraulic power.

Embodiments of the invention incorporate one or more of the following in any of a variety of combinations. Heat may be exchanged with the gas during expansion. The exchanging heat with the gas may maintain the gas at a substantially constant temperature during expansion. The gas may be expanded within a cylinder containing a piston slidably disposed therein, and movement of the piston may raise a mass to convert the energy obtained from the gas expansion into the gravitational potential energy. Converting the gravitational potential energy into hydraulic power may include or consist essentially of, after the expansion, movement of the mass against a piston of a second cylinder, thereby forcing hydraulic fluid out of the second cylinder. The expansion may exert a time-variable pressure against the piston, and the movement of the piston may raise the mass at a substantially constant rate. The piston may be coupled to the mass via a mechanism having a variable gear ratio (e.g., a nautilus gear). The converting of energy obtained from the gas expansion into gravitational potential energy and the converting of gravitational potential energy into hydraulic power are performed in a plurality of out-of-phase stages to supply hydraulic power at a substantially constant rate. The gas expansion may result from combustion of fluid.

In another aspect, embodiments of the invention feature a method for energy storage including or consisting essentially of converting hydraulic power into gravitational potential energy and utilizing the gravitational potential energy to compress a gas. Heat may be exchanged with the gas during compression. The exchanging heat with the gas may include or consist essentially of maintaining the gas at a substantially constant temperature during compression. Converting the hydraulic power may include or consist essentially of pumping a hydraulic fluid into a cylinder containing a piston slidably disposed therein, movement of the piston raising a mass to convert the hydraulic power into the gravitational potential energy. Utilizing the gravitational potential energy to compress the gas may include or consist essentially of movement of the mass against a piston of a second cylinder containing the gas.

In yet another aspect, embodiments of the invention feature an energy storage and recovery system including or consisting essentially of a first cylinder assembly, a second cylinder assembly, and a mass for (i) converting energy from the first and/or second cylinder assembly into gravitational potential energy and/or (ii) supplying gravitational potential energy to the first and/or second cylinder assemblies. The first cylinder assembly may include or consist essentially of two chambers and a piston, slidably disposed within the first cylinder assembly, separating the chambers. The second cylinder assembly may include or consist essentially of two chambers and a piston, slidably disposed within the second cylinder assembly, separating the chambers. The mass is coupled to the pistons of the first and second cylinder assemblies.

Embodiments of the invention incorporate one or more of the following in any of a variety of combinations. A heat-transfer subsystem for thermally conditioning gas may be in fluid communication with at least one of the chambers of the first and/or second cylinder assemblies. The heat-transfer subsystem may include a mechanism (e.g., a spray head and/or a spray rod) for introducing heat-transfer fluid into the at least one chamber. The mass may be coupled to the piston of the first cylinder assembly by a mechanism having a variable gear ratio (e.g., a nautilus gear). The first cylinder assembly may include or consist essentially of a pneumatic cylinder assembly. The second cylinder assembly may include or consist essentially of a hydraulic cylinder assembly. A pump/motor (e.g., a hydraulic pump/motor) may be fluidly connected to the second cylinder assembly. The system may include a third cylinder assembly, a fourth cylinder assembly, and a mass for (i) converting energy from the third and/or fourth cylinder assembly into gravitational potential energy and/or (ii) supplying gravitational potential energy to the third and/or fourth cylinder assembly. The third cylinder assembly may include or consist essentially of two chambers and a piston, slidably disposed within the third cylinder assembly, separating the chambers. The fourth cylinder assembly may include or consist essentially of two chambers and a piston, slidably disposed within the fourth cylinder assembly, separating the chambers. The second mass may be coupled to the pistons of the third and fourth cylinder assemblies. The fourth cylinder assembly may be fluidly connected to the pump/motor. A valve mechanism may alternately connect the second cylinder assembly and the fourth cylinder assembly to the pump/motor in order to supply a substantially constant flow of hydraulic fluid to the pump/motor.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations. Note that as used herein, the terms "pipe," "piping" and the like shall refer to one or more conduits that are rated to carry gas or liquid between two points. Thus, the singular term should be taken to include a plurality of parallel conduits where appropriate. Herein, the terms "liquid" and "water" interchangeably connote any mostly or substantially incompressible liquid, the terms "gas" and "air" are used interchangeably, and the term "fluid" may refer to a liquid or a gas unless otherwise indicated. As used herein unless otherwise indicated, the term "substantially" means ±10%, and, in some embodiments, ±5%. A "valve" is any mechanism or component for controlling fluid communication between fluid paths or reservoirs, or for selectively permitting control or venting. The term "cylinder" refers to a chamber, of uniform but not necessarily circular cross-section, which may contain a slidably disposed piston or other mechanism that separates the fluid on one side of the chamber from that on the other, preventing fluid movement from one side of the chamber to the other while allowing the transfer of force/pressure from one side of the chamber to the next or to a mechanism outside the chamber. A "cylinder assembly" may be a simple cylinder or include multiple cylinders, and may or may not have additional associated components (such as mechanical linkages among the cylinders). The shaft of a cylinder may be coupled hydraulically or mechanically to a mechanical load (e.g., a hydraulic motor/pump or a crankshaft) that is in turn coupled to an electrical load (e.g., rotary or linear electric motor/generator attached to power electronics and/or directly to the grid or other loads), as described in the '595 and '853 applications. Herein, the term "gas cylinder" refers to a cylinder having a chamber in which a pressurized gas, alone or mixed with liquids, is present, whether from a compression process, storage vessel, or from fluid combustion (such as due to internal combustion); the pressurized fluid exerts an increased force upon the piston that acts toward the proximal end of the piston. (Thus, as utilized herein, a pneumatic cylinder is a type of gas cylinder.) The term "combustion" and its cognates refer to any rapid exothermic chemical reaction in a fluid or mixture of fluids that causes the fluid or mixture of fluids to expand. As used herein, "thermal conditioning" of a heat-exchange fluid does not include any modification of the temperature of the heat-exchange fluid resulting from interaction with gas with which the heat-exchange fluid is exchanging thermal energy; rather, such thermal conditioning generally refers to the modification of the temperature of the heat-exchange fluid by other means (e.g., an external heat exchanger). Unless otherwise indicated, motor/pumps described herein are not required to be configured to function both as a motor and a pump if they are utilized during system operation only as a motor or a pump but not both. As utilized herein unless otherwise indicated, a "pressure range" refers to a ratio of two pressures (e.g., a final pressure and an initial pressure), rather than the absolute difference between the two pressures.

BRIEF DESCRIPTION OF THE DRAWINGS

In the drawings, like reference characters generally refer to the same parts throughout the different views. Cylinders, rods, and other components are depicted in cross section in a manner that will be intelligible to all persons familiar with the art of pneumatic and hydraulic cylinders. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
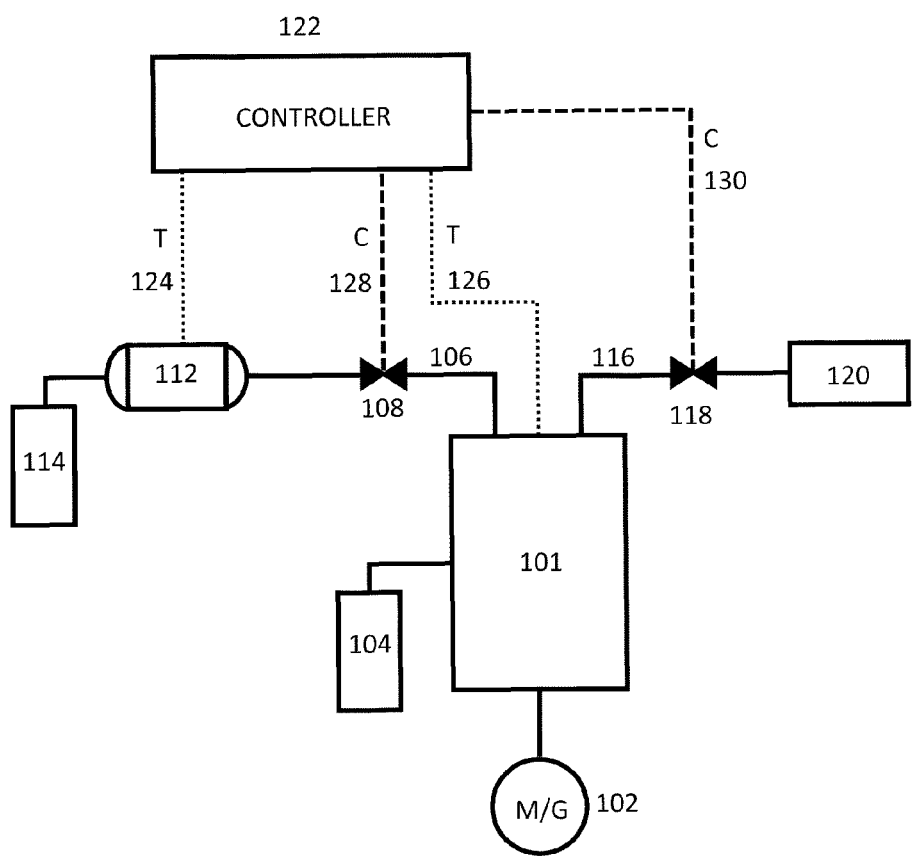
FIG. 1 is a schematic drawing of a compressed-gas energy storage system in accordance with various embodiments of the invention.

FIG. 1 depicts an illustrative system 100 that may be part of a larger system, not otherwise depicted, for the storage and release of energy. Subsequent figures will clarify the application of embodiments of the invention to such a system. The system 100 depicted in FIG. 1 features an assembly 101 for compressing and expanding gas. Expansion/compression assembly 101 may include or consist essentially of either one or more individual devices for expanding or compressing gas (e.g., turbines or cylinder assemblies that each may house a moveable boundary mechanism) or a staged series of such devices, as well as ancillary devices (e.g., valves) not depicted explicitly in FIG. 1.

An electric motor/generator 102 (e.g., a rotary or linear electric machine) is in physical communication (e.g., via hydraulic pump, piston shaft, or mechanical crankshaft) with the expansion/compression assembly 101. The motor/generator 102 may be electrically connected to a source and/or sink of electric energy not explicitly depicted in FIG. 1 (e.g., an electrical distribution grid or a source of renewable energy such as one or more wind turbines or solar cells).

The expansion/compression assembly 101 may be in fluid communication with a heat-transfer subsystem 104 that alters the temperature and/or pressure of a fluid (i.e., gas, liquid, or gas-liquid mixture) extracted from expansion/compression assembly 101 and, after alteration of the fluid's temperature and/or pressure, returns at least a portion of it to expansion/compression assembly 101. Heat-transfer subsystem 104 may include pumps, valves, and other devices (not depicted explicitly in FIG. 1) ancillary to its heat-transfer function and to the transfer of fluid to and from expansion/compression assembly 101. Operated appropriately, the heat-transfer subsystem 104 enables substantially isothermal compression and/or expansion of gas inside expansion/compression assembly 101.

Connected to the expansion/compression assembly 101 is a pipe 106 with a control valve 108 that controls a flow of fluid (e.g., gas) between assembly 101 and a storage reservoir 112 (e.g., one or more pressure vessels and/or caverns). The storage reservoir 112 may be in fluid communication with a heat-transfer subsystem 114 that alters the temperature and/or pressure of fluid removed from storage reservoir 112 and, after alteration of the fluid's temperature and/or pressure, returns it to storage reservoir 112. A second pipe 116 with a control valve 118 may be in fluid communication with the expansion/compression assembly 101 and with a vent 120 that communicates with a body of gas at relatively low pressure (e.g., the ambient atmosphere).

A control system 122 receives information inputs from any of expansion/compression assembly 101, storage reservoir 112, and other components of system 100 and sources external to system 100. These information inputs may include or consist essentially of pressure, temperature, and/or other telemetered measurements of properties of components of system 101. Such information inputs, here generically denoted by the letter "T," are transmitted to control system 122 either wirelessly or through wires. Such transmission is denoted in FIG. 1 by dotted lines 124, 126.

The control system 122 may selectively control valves 108 and 118 to enable substantially isothermal compression and/or expansion of a gas in assembly 101. Control signals, here generically denoted by the letter "C," are transmitted to valves 108 and 118 either wirelessly or through wires. Such transmission is denoted in FIG. 1 by dashed lines 128, 130. The control system 122 may also control the operation of the heat-transfer assemblies 104, 114 and of other components not explicitly depicted in FIG. 1. The transmission of control and telemetry signals for these purposes is not explicitly depicted in FIG. 1.

The control system 122 may be any acceptable control device with a human-machine interface. For example, the control system 122 may include a computer (for example a PC-type) that executes a stored control application in the form of a computer-readable software medium. More generally, control system 122 may be realized as software, hardware, or some combination thereof. For example, control system 122 may be implemented on one or more computers, such as a PC having a CPU board containing one or more processors such as the Pentium, Core, Atom, or Celeron family of processors manufactured by Intel Corporation of Santa Clara, Calif., the 680×0 and POWER PC family of processors manufactured by Motorola Corporation of Schaumburg, Ill., and/or the ATHLON line of processors manufactured by Advanced Micro Devices, Inc., of Sunnyvale, Calif. The processor may also include a main memory unit for storing programs and/or data relating to the methods described above. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), programmable logic devices (PLD), or read-only memory devices (ROM). In some embodiments, the programs may be provided using external RAM and/or ROM such as optical disks, magnetic disks, or other storage devices.

For embodiments in which the functions of controller 122 are provided by software, the program may be written in any one of a number of high-level languages such as FORTRAN, PASCAL, JAVA, C, C++, C#, LISP, PERL, BASIC or any suitable programming language. Additionally, the software can be implemented in an assembly language and/or machine language directed to the microprocessor resident on a target device.

As described above, the control system 122 may receive telemetry from sensors monitoring various aspects of the operation of system 100, and may provide signals to control valve actuators, valves, motors, and other electromechanical/electronic devices. Control system 122 may communicate with such sensors and/or other components of system 100 (and other embodiments described herein) via wired or wireless communication. An appropriate interface may be used to convert data from sensors into a form readable by the control system 122 (such as RS-232 or network-based interconnects). Likewise, the interface converts the computer's control signals into a form usable by valves and other actuators to perform an operation. The provision of such interfaces, as well as suitable control programming, is clear to those of ordinary skill in the art and may be provided without undue experimentation.

System 100 may be operated so as to compress gas admitted through the vent 120 and store the gas thus compressed in reservoir 112. For example, in an initial state of operation, valve 108 is closed and valve 118 is open, admitting a quantity of gas into expansion/compression assembly 101. When a desired quantity of gas has been admitted into assembly 101, valve 118 may be closed. The motor/generator 102, employing energy supplied by a source not explicitly depicted in FIG. 1 (e.g., the electrical grid), then provides mechanical power to expansion/compression assembly 101, enabling the gas within assembly 101 to be compressed.

During compression of the gas within assembly 101, fluid (i.e., gas, liquid, or a gas-liquid mixture) may be circulated between assembly 101 and heat-exchange assembly 104. Heat-exchange assembly 104 may be operated in such a manner as to enable substantially isothermal compression of the gas within assembly 101. During or after compression of the gas within assembly 101, valve 108 may be opened to enable high-pressure fluid (e.g., compressed gas or a mixture of liquid and compressed gas) to flow to reservoir 112. Heat-exchange assembly 114 may be operated at any time in such a manner as alter the temperature and/or pressure of the fluid within reservoir 112.

That system 100 may also be operated so as to expand compressed gas from reservoir 112 in expansion/compression assembly 101 in such a manner as to deliver energy to the motor/generator 102 will be apparent to all persons familiar with the operation of pneumatic, hydraulic, and electric machines.

Figure 2:
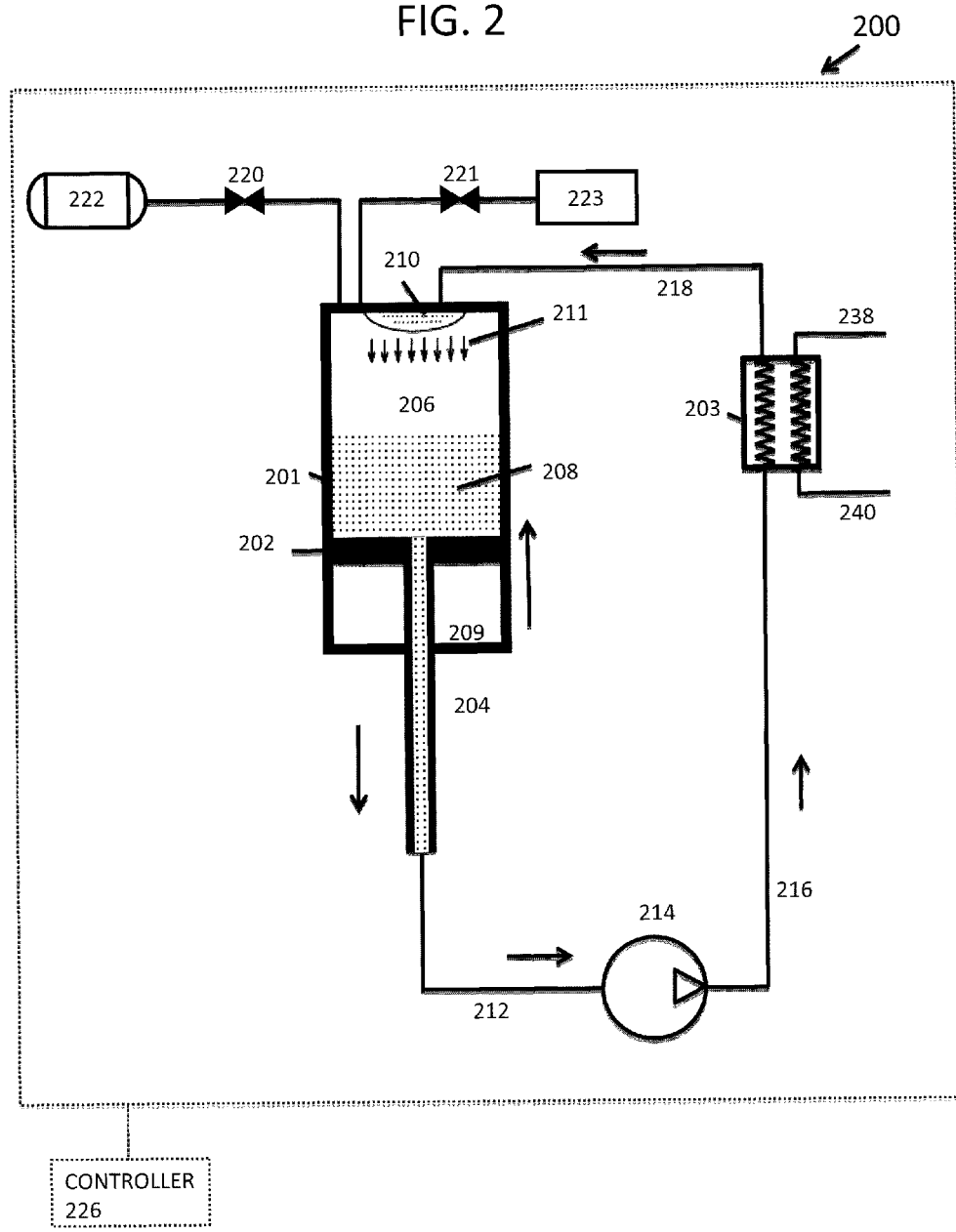
FIG. 2 is a schematic drawing of various components of a compressed-gas energy storage system in accordance with various embodiments of the invention.

FIG. 2 depicts an illustrative system 200 that features a cylinder assembly 201 (i.e., an embodiment of assembly 101 in FIG. 1) in communication with a reservoir 222 (112 in FIG. 1) and a vent to atmosphere 223 (120 in FIG. 1). In the illustrative system 200 shown in FIG. 2, the cylinder assembly 201 contains a piston 202 slidably disposed therein with a center-drilled rod 204 defining a fluid passageway extending from the piston 202. In some embodiments the piston 202 is replaced by a different boundary mechanism dividing cylinder assembly 201 into multiple chambers, or piston 202 is absent entirely, and cylinder assembly 201 is a "liquid piston." The cylinder assembly 201 may be divided into, e.g., two pneumatic chambers or one pneumatic chamber and one hydraulic chamber. The rod 204 is also attached to, e.g., a mechanical load (e.g., a crankshaft or a hydraulic system) that is not depicted. The cylinder assembly 201 is in liquid communication with a heat-transfer subsystem (104 in FIG. 1) that includes or consists essentially of a circulation pump 214, a spray mechanism 210, and a heat exchanger 203 to enable substantially isothermal compression/expansion of air. Spray mechanism 210 may include or consist essentially of one or more spray heads (e.g., disposed at one end of cylinder assembly 201) and/or spray rods (e.g., extending along at least a portion of the central axis of cylinder assembly 201). System 200 further includes a first control valve 220 (108 in FIG. 1) in communication with a storage reservoir 222 and cylinder assembly 201, and a second control valve 221 (118 in FIG. 1) in communication with a vent 223 and cylinder assembly 201. A control system 226 (122 in FIG. 1) may control operation of, e.g., valves 222 and 221 based on various system inputs (e.g., pressure, temperature, piston position, and/or fluid state) from cylinder assembly 201 and/or storage reservoir 222.

In an initial state, the cylinder assembly 201 may contain a gas 206 (e.g., air introduced to the cylinder assembly 201 via valve 221 and vent 223) and a heat-transfer fluid 208 (which may include or consist essentially of, e.g., water or another suitable liquid). When the gas 206 enters the cylinder assembly 201, piston 202 is operated to compress the gas 206 to an elevated pressure (e.g., 3,000 psi). The heat-transfer fluid 208 flows through the center-drilled rod 204 and through a pipe 212 to the pump 214 (any fluid 209 on the other side of the piston 202 may flow through other valves and pipes that are not shown). The pump 214 may raise the pressure of the heat-exchange fluid 208 to a pressure (e.g., up to approximately 3,015 psig) somewhat higher than the pressure within the cylinder assembly 201, as described in U.S. patent application Ser. No. 13/009,409, filed Jan. 19, 2011 (the '409 application), the entire disclosure of which is incorporated by reference herein. The heat-transfer fluid 208 is then sent through a pipe 216 to the heat exchanger 203, where its temperature is altered, and then through a pipe 218 to the spray mechanism 210 disposed within the cylinder assembly 201. Heat-transfer spray 211 from spray mechanism 210 is admitted into cylinder assembly 201 to enable substantially isothermal compression of gas 206. In some embodiments, the heat exchanger 203 is configured to condition heat-transfer fluid 208 at low pressure (e.g., a pressure lower than the maximum pressure of a compression or expansion stroke in cylinder assembly 201), and heat-transfer fluid 208 is thermally conditioned between strokes or only during portions of strokes, as detailed in U.S. patent application Ser. No. 13/211, 440, filed Aug. 17, 2011 (the '440 application), the entire disclosure of which is incorporated by reference herein.

At or near the end of the compression stroke, control system 226 opens valve 220 to admit the compressed gas 206 to the storage reservoir 222. Almost instantaneously, valve 220 is closed and piston 202 may begin a pre-compression stroke to compress the remaining dead volume of air inside the cylinder assembly 201. At the end of the pre-compression stroke, valve 220 is operated to admit pressurized gas from storage vessel 222 to begin the expansion stage in cylinder assembly 201. Operation of valves 220 and 221 may be controlled by various inputs to control system 226, such as piston position in cylinder assembly 201, pressure in storage vessel 222, pressure in cylinder assembly 201, and/or temperature in cylinder assembly 201.

The amount of work required to perform the pre-compression stroke is recovered during the expansion stage in the cylinder assembly 201. By reducing the dead volume in cylinder assembly 201 prior to expansion, the amount of gas flow from pressure storage vessel 222 to fill cylinder assembly 201 is less due to the smaller volume between the piston 202 and the top of the cylinder assembly 201. Furthermore, if the dead volume of air is compressed to a pressure substantially equal to the pressure of the gas 206 stored in storage reservoir 222 then there is little or no coupling loss when the gas is introduced into cylinder assembly 201 during an expansion stage. Therefore, the amount of work required to perform the pre-compression stroke is recovered in the form of compressed air that was not needed to fill the dead volume during expansion, thereby improving overall system efficiency.

As mentioned above, the control system 226 may enforce substantially isothermal operation, i.e., expansion and/or compression of gas in cylinder assembly 201, via control over, e.g., the introduction of gas into and the exhausting of gas out of cylinder assembly 201, the rates of compression and/or expansion, and/or the operation of the heat-exchange subsystem in response to sensed conditions. For example, control system 226 may be responsive to one or more sensors disposed in or on cylinder assembly 201 for measuring the temperature of the gas and/or the heat-exchange fluid within cylinder assembly 201, responding to deviations in temperature by issuing control signals that operate one or more of the system components noted above to compensate, in real time, for the sensed temperature deviations. For example, in response to a temperature increase within cylinder assembly 201, control system 226 may issue commands to increase the flow rate of spray 211 of heat-exchange fluid 208.

Furthermore, embodiments of the invention may be applied to systems in which cylinder assembly 201 (or a chamber thereof) is in fluid communication with a pneumatic chamber of a second cylinder. That second cylinder, in turn, may communicate similarly with a third cylinder, and so forth. Any number of cylinders may be linked in this way. These cylinders may be connected in parallel or in a series configuration, where the compression and expansion is done in multiple stages.

The fluid circuit of heat exchanger 203 may be filled with water, a coolant mixture, and/or any acceptable heat-exchange medium. In alternative embodiments, a gas, such as air or refrigerant, is used as the heat-exchange medium. In general, the fluid is routed by conduits to a large reservoir of such fluid in a closed or open loop. One example of an open loop is a well or body of water from which ambient water is drawn and the exhaust water is delivered to a different location, for example, downstream in a river. In a closed-loop embodiment, a cooling tower may cycle the water through the air for return to the heat exchanger. Likewise, water may pass through a submerged or buried coil of continuous piping where a counter heat-exchange occurs to return the fluid flow to ambient temperature before it returns to the heat exchanger for another cycle.

In various embodiments, the heat-exchange fluid is conditioned (i.e., pre-heated and/or pre-chilled) or used for heating or cooling needs by connecting the fluid inlet 238 and fluid outlet 240 of the external heat exchange side of the heat exchanger 203 to an installation (not shown) such as a heat-engine power plant, an industrial process with waste heat, a heat pump, and/or a building needing space heating or cooling, as described in U.S. Pat. No. 7,958,731, filed Jan. 20, 2010 (the '731 patent), the entire disclosure of which is incorporated by reference herein. The installation may be a large water reservoir that acts as a constant-temperature thermal fluid source for use with the system. Alternatively, the water reservoir may be thermally linked to waste heat from an industrial process or the like, as described above, via another heat exchanger contained within the installation. This allows the heat-exchange fluid to acquire or expel heat from/to the linked process, depending on configuration, for later use as a heating/cooling medium in the energy storage/conversion system.

Figure 3:
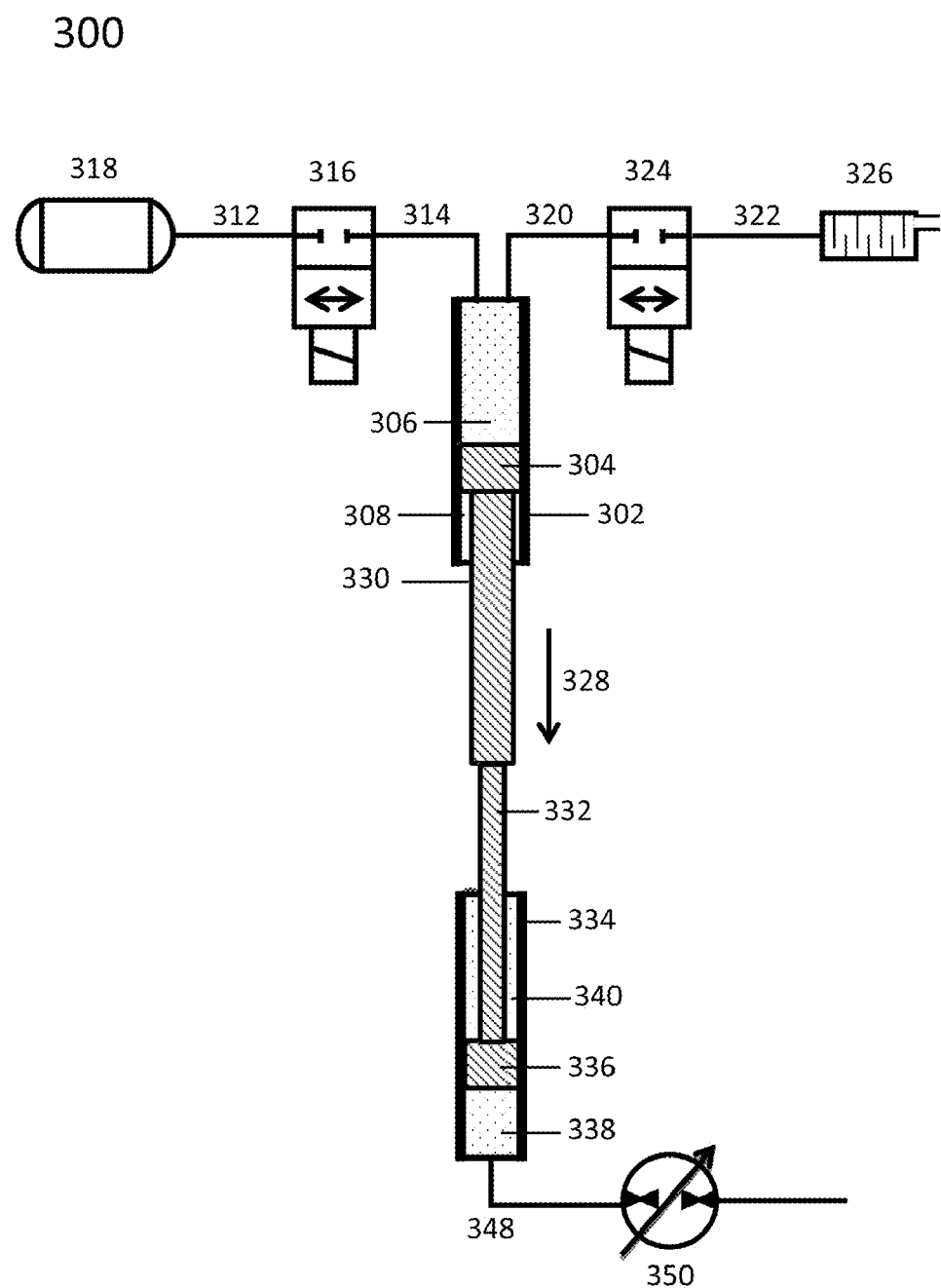
FIG. 3 is a schematic drawing of the major components of a pneumatic-hydraulic system that uses compressed air to drive a hydraulic motor in accordance with various embodiments of the invention.

FIG. 3 is a schematic of the major components of an illustrative system 300 that employs a pneumatic-hydraulic intensifier to convert the potential energy of compressed gas into mechanical work performed by a hydraulic motor. The system 300 as shown in FIG. 3 includes a pneumatic cylinder 302 containing a slidably disposed piston 304 that divides the interior of the cylinder 302 into a distal chamber 306 and a proximal chamber 308. A port or ports (not shown) with associated pipes 312, 314 and a bidirectional valve 316 allows for gas from a high-pressure storage reservoir 318 to be admitted to chamber 306 as desired. A port or ports (not shown) with associated pipes 320, 322 and a bidirectional valve 324 allows for gas from the chamber 306 to be exhausted through a vent 326 to the ambient atmosphere (or to a chamber or another cylinder) as desired. A port or ports (not shown) allows the interior of the chamber 308 to communicate freely at all times with the ambient atmosphere.

The distal end of a rod 330 is coupled to the piston 304. The proximal end of the rod 330 is coupled to the proximal end of a second rod 332. The second rod 332 enters a hydraulic cylinder 334 containing a slidably disposed piston 336 that divides the interior of the cylinder 334 into a distal chamber 338 and a proximal chamber 340. In other embodiments, not shown, a single rod (the cross-sectional area of which may change over its length and/or be different at either end) may be used to connect pistons 304 and 336, and/or the two cylinders 302 and 334 may be brought into close proximity (or even into contact) in a tandem arrangement. Piping 348 is directed to the input of a hydraulic motor 350 that may drive an electric generator (not shown).

Either or both of the bidirectional valves 316 and 324 may be replaced by two one-directional valves in parallel, such as an actuated one-directional valve for expansion and a non-actuated check valve for compression, or by some other mechanism. The cylinders 302 and 334 are portrayed as vertically oriented in FIG. 3 but are arbitrarily oriented in other embodiments. Rods 330, 332 generally move in unison, as do the pistons 304, 336 coupled to the rods 330, 332. Fluid exiting chamber 338 of the hydraulic cylinder 334 through piping 348 drives the hydraulic motor 350 and any loads (not shown) to which the mechanical output of the hydraulic motor 350 is attached in various embodiments.

Figure 4:
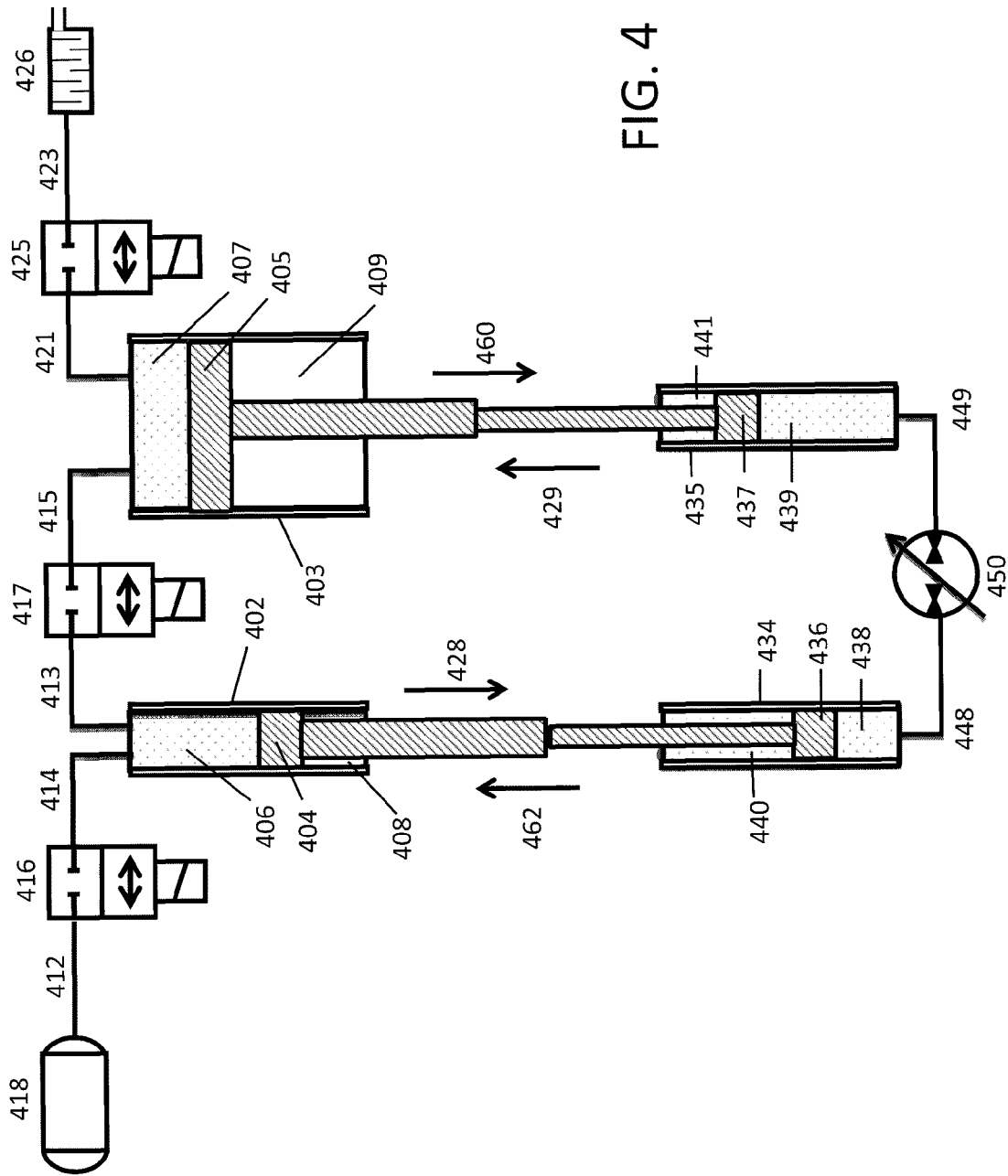
FIG. 4 is a schematic drawing of a system including two pneumatic-hydraulic systems similar to that depicted in FIG. 3, coupled to each other in accordance with various embodiments of the invention.

FIG. 4 is a schematic of the major components of an illustrative system 400 that employs two pneumatic-hydraulic intensifiers to convert the potential energy of compressed gas to mechanical work performed by a hydraulic motor according to various other embodiments of the invention. System 400 includes a high-pressure pneumatic cylinder 402 containing a mobile piston 404 that divides the interior of the cylinder 402 into two chambers 406 and 408. A port or ports (not shown) with associated pipes 412, 414 and a valve 416 allows for fluid to be admitted to or withdrawn from chamber 406 as desired. Gas is stored at high pressure in a reservoir 418 and may be admitted to chamber 406 through the bidirectional valve 416, piping 412, 414, and an appropriate port (not shown). In this illustrative system, gas in chamber 408 is in communication with the ambient atmosphere through an appropriate port (not shown) and piping (not shown).

System 400 also includes a second pneumatic cylinder 403, which may have similar or even identical dimensions (and correspond to similar or even identical pressures of operation) as cylinder 402, or may be a low-pressure cylinder (having different, e.g., larger, dimensions and a different, e.g., lower, pressure of operation) as shown in FIG. 4. The cylinder 403 contains a mobile piston 405 that divides the interior of the cylinder 403 into two chambers 407 and 409. A port or ports (not shown) with associated pipes 421, 423 and a bidirectional valve 425 allows fluid to be exhausted from chamber 407 through vent 426 as desired. Gas may be passed from chamber 406 of cylinder 402 to chamber 407 of cylinder 403 through piping 413, a bidirectional valve 417, and piping 415. Valve 417 may include or consist essentially of two valves, one each associated with chambers 406 and 407, with a pressurized volume between the valves. Gas in chamber 409 is typically in communication with the ambient atmosphere through an appropriate port (not shown) and piping (not shown). As shown in FIG. 4, the surface area presented by piston 404 to chamber 406 of the high-pressure cylinder 402 may be smaller than the surface area presented by piston 405 to chamber 407 of the low-pressure pneumatic cylinder 403.

The pneumatic cylinders 402, 403 are associated with hydraulic cylinders 434, 435 that may be interconnected thereto in accordance with the description of the corresponding components of system 300 (i.e., cylinders 302 and 334) in FIG. 3. In FIG. 4, the fluid outputs of hydraulic cylinders 434, 435 are connected through piping 448, 449 to the input/output ports of a motor 450 (e.g., a hydraulic motor such as a variable-displacement over-center closed-loop hydraulic motor) that may drive an electric generator (not shown). In various embodiments, chambers 440 and 441 may be vented to atmosphere (not shown), may be connected together via piping (not shown) to aid in cylinder retraction, or may be connected to an additional hydraulic pump/motor (not shown). The connection between hydraulic cylinders 434, 435 and motor 450 may be valveless.

In other embodiments, any or all of the bidirectional valves 416, 417, and 425 are replaced by two one-directional valves in parallel, such as an actuated one-directional valve for expansion and a non-actuated check valve for compression, or by some other mechanism. The cylinders 402, 403, 434, and 435 are portrayed as vertically oriented in FIG. 4 but are arbitrarily oriented in other embodiments.

In an initial state of operation, piston 404 is near the distal (upper) end of cylinder 402, piston 436 is near the upper (proximal) end of cylinder 434, piston 405 is near the proximal (lower) end of cylinder 405, and piston 437 is near the distal (lower) end of cylinder 435. During air expansion, valve 416 is opened and a quantity of high-pressure gas from reservoir 418 is admitted into chamber 406. The gas in chamber 406 expands, performing work on piston 404. At some later point during the expansion of the gas in chamber 406, valve 416 is closed.

While expanding gas in chamber 406 is moving piston 404 so as to enlarge chamber 406, piston 405 in cylinder 403 moves to shrink chamber 407. During this motion, valve 417 is closed, valve 425 is open, and gas is exhausted at low pressure (e.g., atmospheric pressure) from chamber 407 through piping 421, valve 425, piping 423, and vent 426. Pistons 405 and 437 move in unison in the direction indicated by arrow 429. Pressurized fluid from chamber 438 of cylinder 434 passes through piping 448, motor 450, and piping 449 to chamber 439 of hydraulic cylinder 435. During gas expansion in the high-pressure cylinder 402, the low-pressure cylinder 403 and its associated hydraulic cylinder 435 are, in effect, performing an unpowered withdrawal or exhaust stroke, and minimal work is being performed upon or by them.

When the piston 404 has reached its limit of motion, the pressure of the gas in chamber 406 has decreased from its original high value (e.g., approximately 2,500 psig) to a final lower, mid value (e.g., approximately 250 psig, herein termed a "mid-pressure"). In the illustrative embodiment shown here, near or at the end of the hydraulic cylinder stroke, the displacement of motor 450 is brought to near zero to brake and stop motion of the pistons 436, 404, 437 and 405. The displacement of motor 450 is then brought over-center to start motion in the opposite direction. The direction of rotation of motor 450 is kept constant in this manner, even as the cylinders reciprocate, as is familiar to those skilled in the art of hydraulic machinery. Similar functionality may be achieved by open-loop hydraulic motors and fixed-displacement motors through the selective use of valves, configurations that are explicitly within the scope of various embodiments of the invention.

When chamber 407 is at approximately minimum volume and low pressure, valve 425 is closed and venting of chamber 407 ceases. Valve 417 is then opened, allowing mid-pressure gas to exit chamber 406 through pipe 413. When fluid communication has been established between chambers 406 and 407 by opening valve 417, piston 404 in cylinder 402 may be moved so as to reduce the volume of chamber 406 while gas at mid-pressure moves to chamber 407 and there expands, performing work on piston 405, which moves in the direction indicated by arrow 460. Pistons 405 and 437 move in unison in the direction indicated by arrow 460. Pressurized fluid from chamber 439 of cylinder 435 passes through piping 449, motor 450, and piping 448 to chamber 438 of hydraulic cylinder 434. When piston 405 has reached its limit of motion, the gas in chamber 407 is at low (i.e., lower than mid-pressure) pressure (e.g., approximately atmospheric pressure). During gas expansion in the low-pressure cylinder 403, the high-pressure cylinder 402 and its associated hydraulic cylinder 434 are, in effect, performing a withdrawal stroke, and minimal work is being performed upon or by them.

When piston 405 has reached its limit of motion, the first state of operation described above for system 400 may be restored and the foregoing states of operation repeated. Hydraulic fluid passes back and forth between the cylinders 434 and 435 through the motor 450, and the potential energy of compressed air (or other gas) in the reservoir 418 is converted into mechanical work delivered to any load to which the mechanical output of the motor 450 is connected.

In FIG. 4, two pairs of cylinders (402, 434 and 403, 435) are used to extract work from gas expanding from high pressure to low (e.g., approximately atmospheric) pressure. In other embodiments, three or more pairs of cylinders are employed. In some embodiments, two similar or identical cylinder assemblies (e.g., those similar to that depicted in FIG. 3) are combined with a single hydraulic motor so that the fluid outputs of both hydraulic cylinders are directed to the hydraulic motor. Such embodiments may be operated so that hydraulic fluid is reciprocally exchanged by the two hydraulic cylinders through the hydraulic motor in the same manner that hydraulic fluid is passed through the motor 450 in FIG. 4.

Figure 5:
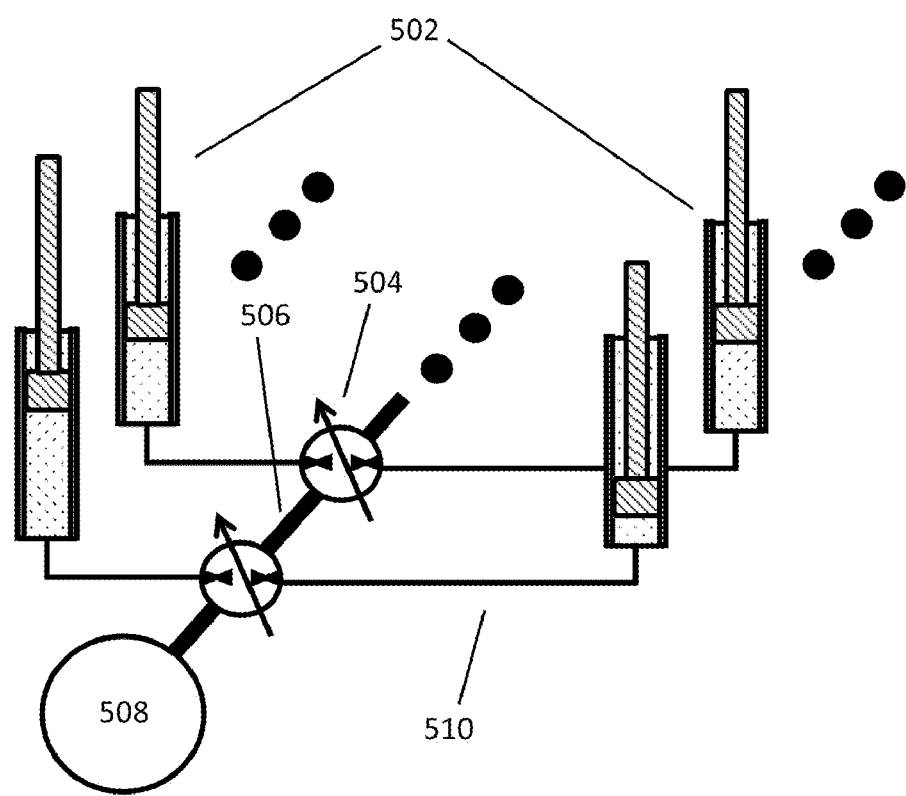
FIG. 5 is a schematic drawing of a system including two or more paired assemblies similar to that depicted in FIG. 4, their hydraulic motors acting on a common shaft.

FIG. 5 is a schematic of the major components of an illustrative system 500 that employs two or more paired-cylinder assemblies similar to that depicted in FIG. 4 to convert potential energy from pressurized gas to mechanical work performed by a motor according to various embodiments of the invention. In FIG. 5, the gas cylinders of each pair 502 are not depicted; only the hydraulic cylinders are depicted and only one pair is explicitly labeled. Each pair of cylinder assemblies 502 drives an over-center hydraulic motor 504. Motor 504 is herein termed "over-center" because it produces torque in the same sense (e.g., by changing displacement over center) regardless of whether fluid is passing through it from the first cylinder of the pair attached to motor 504 to the second cylinder of the pair, or in the opposite direction. Similar functionality may be achieved by open-loop hydraulic motors and fixed-displacement motors through the selective use of valves. Only one hydraulic motor 504 is explicitly labeled. All (i.e., two or more) hydraulic motors 504 preferably drive a common shaft 506. The shaft 506 in turn may drive a load such as an electric motor 508. Potential additional cylinder pairs and motors are indicated by ellipses.

The two or more cylinder-pair assemblies 502 in FIG. 5 may be operated in any phase with respect to each other, i.e., the relative timing of their movements may be set by the operator and is not determined by the mechanism of system 500 itself. System 500 therefore does not require mechanisms to regulate relative cylinder timing precisely and generally is not damaged by variations in relative cylinder timing.

The two or more cylinder-pair assemblies 502 are depicted in FIG. 5 as vertically oriented and symmetrically located, but the cylinder-pair assemblies and the cylinders they include may be arbitrarily oriented and arbitrarily located as long as the assemblies 502 are not so distant from the hydraulic motors 504 that frictional losses in the piping 510 become prohibitive. Thus, geometric constraints (e.g., symmetry, proximity) that typically apply in strict form to the design of engines employing multiple gas cylinders and a common crankshaft may be significantly loosened in the design of a system such as system 500. For example in a standard marine diesel engine, spacing between all cylinders may be approximately two cylinder bore diameters (e.g. for a marine diesel engine with cylinders with 16-inch bore, all cylinder may be spaced at 32 inches between centers). In a two-stage compressor/expander, two different bore sizes may be used (e.g. 12 inches and 42 inches), one for higher pressures (e.g., 250 to 3000 psig) and one for lower pressures (e.g., 0 to 250 psig); to fit these bore sizes on a evenly spaced crankshaft would require sizing based on the larger bore cylinder (e.g., 42 inches). In another example, for packaging reasons, multiple rows of cylinders may be preferred to a single inline installation such as required in an inline engine. Two rows could be achieved with a V-type engine, but ideal cylinder orientation may be vertical which may not be achievable with a V-type engine.

Figure 6A:
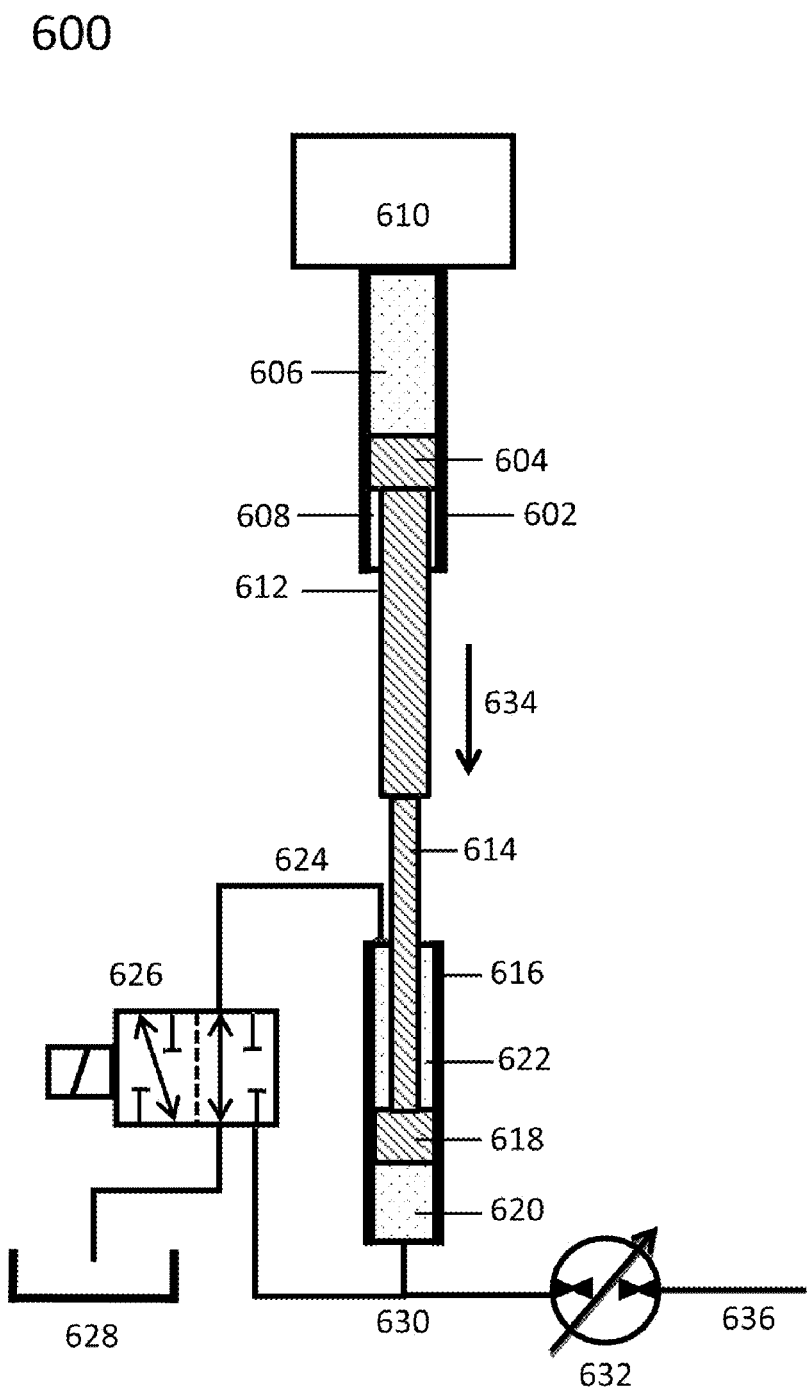
FIG. 6A is a schematic drawing of the major components of an assembly that uses pressurized fluid in a cylinder to drive a hydraulic motor in accordance with various embodiments of the invention.

FIG. 6A shows the major components of an illustrative system 600 that employs a gas cylinder, a hydraulic cylinder, and other components to convert potential energy from pressurized gas or mixed fluid (e.g., from stored pressurized gas, and/or from the chemical potential energy of combustible fluid) to mechanical work performed by a hydraulic motor. The system 600 as shown in FIG. 6A includes a gas cylinder 602 containing a slidably disposed piston 604 that divides the interior of the cylinder 602 into a distal chamber 606 and a proximal chamber 608. A port or ports with associated valves and other components enables the admission of fluid (e.g., pressurized gas, combustible fluid, or mixture of fluids) into chamber 606 and the exhaustion of expanded products from chamber 606. For an exemplary embodiment in which the gas cylinder is a internal-combustion cylinder, this arrangement of ports, valves, and other components is that of a internal-combustion engine, whose necessity and function will be apparent to any person familiar with the art of internal combustion engines, and is represented in FIG. 6A by block 610. A port or ports (not shown) allows the interior of the chamber 608 to communicate freely at all times with the ambient atmosphere.

The distal end of a rod 612 is coupled to the piston 604. The proximal end of the rod 612 is coupled to the proximal end of a second rod 614. In an embodiment, the second rod 614 enters a hydraulic cylinder 616 containing a slidably disposed piston 618 that divides the interior of the cylinder 616 into a distal chamber 620 and a proximal chamber 622. In other embodiments, not shown, a single rod (the cross-sectional area of which may change over its length and/or be different at either end) may be used to connect pistons 604 and 618, and/or the two cylinders 602 and 616 may be brought into close proximity (or even into contact) in a tandem arrangement. A port or ports (not shown) allows fluid in the chamber 622 to pass through piping 624 to a two-position three-way bidirectional valve 626. The valve 626 may be set to direct its output either to a tank 628 containing fluid at low pressure or to piping 630 that is connected to chamber 620 of the cylinder 616 by a port or ports (not shown). (As utilized herein, a "tank" refers to a body of fluid, generally at low (e.g., atmospheric) pressure.) Piping 630 is also directed to the input of a hydraulic motor 632 that drives a shaft that may in turn may drive an electric generator or other load (not shown).

In other embodiments, the two-position three-way bidirectional valve 626 may be replaced by two two-position two-way valves, or by some other mechanism. The cylinders 602 and 616 are portrayed as vertically oriented in FIG. 6A, but this is for illustrative convenience only; their orientations may be arbitrary and dictated by design considerations.

The area of piston 604 presented to chamber 606 of the gas cylinder 602 is $A_1$. The area of piston 618 presented to chamber 620 of the hydraulic cylinder 616 is $A_3$. The effective area of piston 618 presented to chamber 622 of the hydraulic cylinder 616 is $A_2$. $A_2$ is smaller than $A_3$ because rod 614 is connected to the piston 618 and present in chamber 622. The fluid pressure in chamber 606 is $P_1$, the fluid pressure in chamber 622 is $P_2$, and the fluid pressure in chamber 620 is $P_3$. The pressures $P_1$, $P_2$, and $P_3$ may vary with time. Rods 612, 614 move in unison, as do the pistons 604, 618 coupled to the rods 612, 614.

When valve 626 is set to direct its fluid output to the tank 628, the valve 626 is in the "unloading" position. When valve 626 is set to direct its fluid output to piping 630 and thence to chamber 620 of the hydraulic cylinder 616 and to the over-center hydraulic motor 632, the valve 626 is in the "regenerative" position. When the valve 626 is in regenerative position, the chambers 620 and 622 are in fluid communication and their contents may be presumed to be at effectively the same pressure.

In an initial state of operation, valve 626 is in the unloading position, piston 604 is near the distal end of cylinder 602, and piston 618 is near the proximal end of cylinder 616. The pressure of the fluid in chamber 606 is herein denoted $P_1$, as mentioned above. The pressure of the fluid in chamber 606 is raised to a high pressure $P_{1:start}$ (e.g., through the opening of valves to a source of pressurized gas, and/or by rapid combustion of a combustible fluid within the chamber). The fluid in chamber 606 exerts a force $F_1 = P_1 A_1$ on piston 604 that causes piston 604 to move in the direction indicated by arrow 634 and the gas in chamber 606 expands eventually reaching an ending pressure $P_{1:end}$ at the end of the downward stroke. When the gas in chamber 606 is at pressure the gas in chamber 606 exerts a force of $F_{1:start} = P_{1:start} A_1$ on piston 604, rods 612 and 614, and piston 618. The force $F_1 = P_1 A_1$ is transmitted by the rods 612, 614 to the piston of the hydraulic cylinder 618 and thus to the fluid in chamber 620. The fluid in chamber 622 exerts a force of $F_2 = P_2 A_2$ on piston 618 in the direction indicated by arrow 634. The force $F_3$ exerted by piston 618 on the fluid in chamber 620 is approximately the sum of forces $F_1$ and $F_2$ (assuming gravitational and frictional forces are negligible). Force $F_3$ produces a pressure of $P_3$ in chamber 620 according to $P_3 = F_3 / A_3$.

Fluid exiting chamber 620 of the hydraulic cylinder 616 through piping 630 drives the hydraulic motor 632 and any shafts or loads (not shown) to which the mechanical output of the hydraulic motor 632 may be attached in various embodiments.

As the fluid in chamber 606 expands from a high initial pressure of $P_{1:start}$, its pressure decreases. During this initial phase of an expansion, the pressure $P_2$ within chamber 622 of the hydraulic cylinder is effectively equal to the low pressure of the tank 628; the pressure in chamber 620, in piping 630, and at the input of the hydraulic motor 632 is $P_3 = A_3$, where $P_1$ is a decreasing function of time. At some pressure $P_{1:inter}$, less than $P_{1:start}$ but greater than $P_{1:end}$, the valve 626 is switched from its unloading state to its regenerative state. As detailed above, changing the valve 626 from its unloading state to its regenerative state decreases the effective area $A_3$ presented by piston 618 to the fluid in chamber 620, increasing the pressure of the fluid in chamber 620 by a factor of $A_3/(A_3-A_2)$, from $P_{3:inter} = P_{1:inter} A_1/A_3$ to $P_{3:inter}' = P_{1:inter} A_1/(A_3-A_2)$. The pressure of the fluid in chamber 622, which is in fluid communication with chamber 620 when valve 626 is in unloading position, is at approximately the same pressure, $P_{2:inter}' = P_{3:inter}' = P_{1:inter}' = _1/(A_3-A_2)$. The fluid at the input of the hydraulic pump 632 is also at approximately the same pressure, $P_{1:inter} A_1/(A_3-A_2)$.

As the fluid in chamber 606 continues to expand, its pressure declines from $P_{1:inter}$ toward some low, final pressure $P_{1:end}$. Valve 626 remains in regenerative position and the fluid in chambers 622, 620 and at the input of the hydraulic motor 632 continues to be at the same pressure, $P_2 = P_3 = P_1 A_1/(A_3-A_2)$. The final pressure of the fluid in chambers 622, 620 and at the input of the hydraulic motor 632 is $P_{2:end} = P_{3:end=P1:end} A_1/(A_3-A_2)$. This $P_3$:end is larger by a factor of $A_3/(A_3-A_2)$ than that attained without engagement of the regenerative circuit (i.e., pipe 624, valve 626, pipe 630). The output pressure range of the hydraulic cylinder 616 (described as a ratio of the initial and the final pressures) when the regenerative circuit is employed as described herein is therefore smaller by a factor of $A_1/(A_3-A_2)$ than the output pressure range of the hydraulic cylinder 616 if the valve 626 were kept in unloading position throughout the expansion of the fluid in chamber 606. As described above, the hydraulic pressure ratio may be reduced to the square root of the overall gas cylinder pressure ratio. For appropriate operation of the system 600 and appropriately chosen $P_{1:start}$, $P_{1:end}$, $A_1$, $A_2$, and $A_3$, the pressure of the fluid supplied to the hydraulic motor 632 may therefore range over an interval that is more favorable to efficient operation of the motor 632.

Figure 6B:
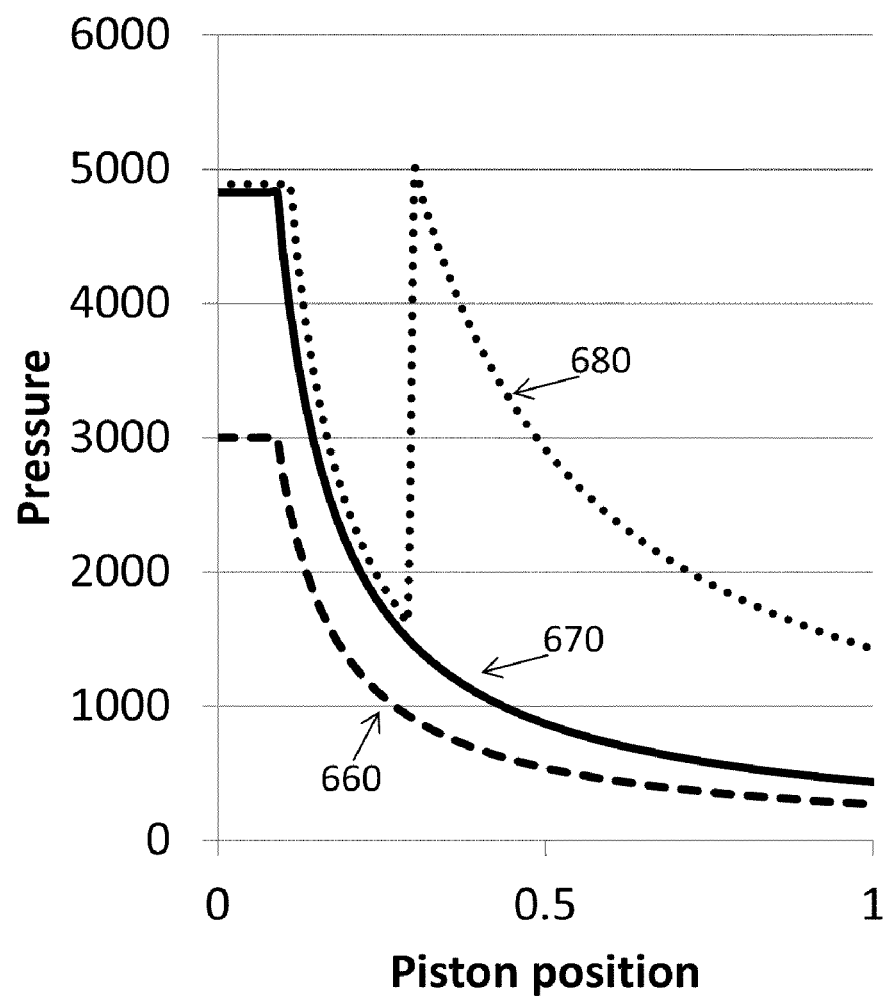
FIG. 6B illustrates exemplary pressure profiles for the system illustrated in FIG. 6A.

FIG. 6B illustrates an exemplary pressure profile for the system 600 illustrated in FIG. 6A. Curve 660 illustrates an exemplary pressure evolution within chamber 606 that begins at a $P_{1:start}$ of approximately 3000 psi and ends at $P_{1:end}$ of approximately 270 psi, corresponding to a pressure range (here an expansion ratio) of approximately eleven to one (11:1). For a hydraulic cylinder with a single area ratio of, e.g., 1.65:1.00 (i.e., a hydraulic cylinder without a variable effective piston area such as cylinder 334 of FIG. 3), the hydraulic cylinder pressure would vary as depicted by curve 670 between approximately 5000 psi and 435 psi, i.e., with approximately the same eleven-to-one pressure range of the pneumatic pressure. In contrast, the pressure evolution within cylinder 616 corresponding to the pneumatic pressure profile 660 is depicted in FIG. 6B as curve 680. In this exemplary embodiment, curve 680 is based on a dual-area ratio where the piston area ratio between pistons 618 and 604 is approximately 1.65:1.00, and the effective area ratio when valve 626 connects chambers 620 and 622 is approximately 5.20:1.00. At a piston position of 0.3 as indicated in FIG. 6B, valve 626 of FIG. 6A is actuated to connect chambers 620 and 622, changing the effective area ratio (i.e., changing the effective piston area within cylinder 616) and boosting the pressure from $P_{3:inter} = 1400$ psi to $P_{3:inter}' = 5000$ psi. Thus, the pressure in pipe 630 at the inlet of hydraulic motor 632 may vary only between the initial pressure of 5000 psi and final pressure of $P_{3:end} = 1400$ psi as shown in curve 680, for a reduced pressure range of approximately 3.5:1.0 or nearly the square root of the pneumatic pressure range of eleven to one.

Thus, as shown in FIG. 6B, embodiments of the present invention communicate pneumatic pressure varying over a particular pressure range. Generally this fluid pressure increases or decreases smoothly over the pressure range in a single direction (i.e., unidirectionally) during a single stroke (e.g., of compression or expansion). Without the use of hydraulic cylinders having variable effective piston areas, the hydraulic pressure resulting from the pneumatic pressure also evolves smoothly and unidirectionally over the same pressure range (as exemplified by curve 670). In contrast, embodiments of the invention narrow the hydraulic pressure range such that the hydraulic pressure oscillates within the narrower range during the single stroke (each "oscillation" consisting of a cycle of increasing and decreasing (or decreasing and increasing) pressure). In various embodiments, at least one of the increase or decrease in pressure during an oscillation is abrupt. For example, during the expansion represented by FIG. 6B, the hydraulic pressure initially smoothly decreases, abruptly jumps (i.e., in stepwise fashion) when the effective piston area of the hydraulic cylinder changes, and then smoothly decreases again. As shown in FIG. 10B, multiple changes in effective piston area during a single stroke result in multiple oscillations of the hydraulic pressure within its narrowed range, one increase or decrease in the pressure profile per effective area change. (As also shown in FIG. 10B, the use of increasing numbers of different effective piston areas also tends to increasingly narrow the resulting hydraulic pressure range.)

Figure 7:
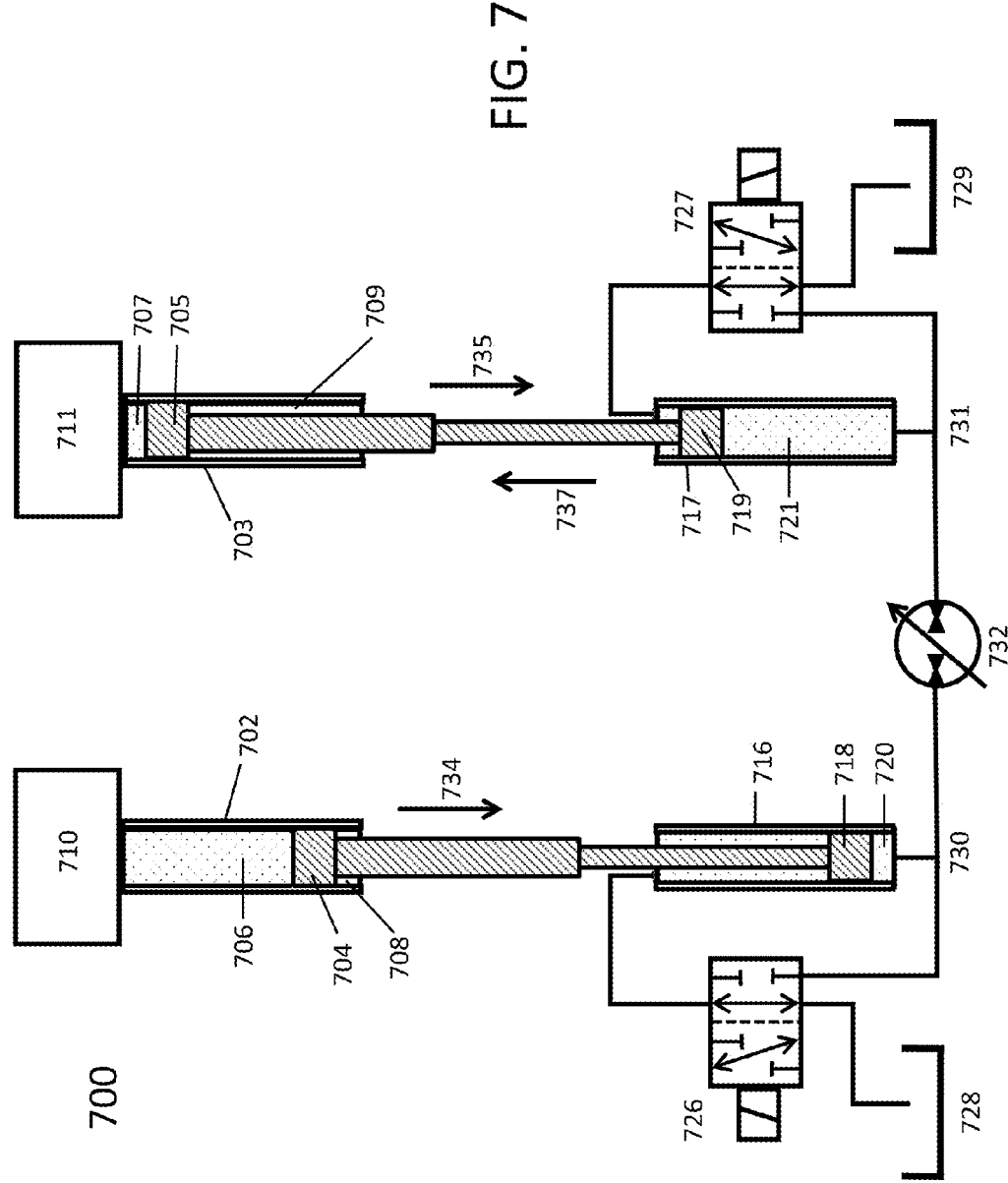
FIG. 7 is a schematic drawing of a system featuring two assemblies similar to that depicted in FIG. 6A, coupled to each other in accordance with alternative embodiments of the invention.

FIG. 7 is a schematic of the major components of an illustrative system 700 that employs two assemblies similar to that depicted in FIG. 6A to convert potential energy from pressurized gas or mixed fluid (e.g., from stored pressurized gas, and/or from the chemical potential energy of combustible fluid) to mechanical work performed by a hydraulic motor according to another embodiment of the invention.

System 700 may include a gas cylinder 702 containing a mobile piston 704 that divides the interior of the cylinder 702 into two chambers 706 and 708. A port or ports with associated valves and other components enables the admission of fluid (e.g., pressurized gas, combustible fluid, or mixture of fluids) into chamber 706 and the exhaustion of expanded products from chamber 706. For an exemplary embodiment in which the gas cylinder is an internal-combustion cylinder, this arrangement of ports, valves, and other components is that of a internal-combustion engine, whose necessity and function will be apparent to any person familiar with the art of internal combustion engines, and is represented in FIG. 7 by block 710. In this illustrative system, gas in chamber 708 is in communication with the ambient atmosphere through an appropriate port (not shown) and piping (not shown).

System 700 also includes a second gas cylinder 703 that may be effectively identical to cylinder 702, as well as a mobile piston 705 that divides the interior of the cylinder 703 into two chambers 707 and 709. A port or ports with associated valves and other components (e.g., an internal-combustion engine) is represented in FIG. 7 by block 711 and may be effectively identical to that represented in FIG. 6A by block 610. Gas in chamber 709 is in communication with the ambient atmosphere through an appropriate port (not shown) and piping (not shown). In an embodiment, mechanisms 710, 711 may be portions of the same larger mechanism, e.g., an internal-combustion engine.

The gas cylinders 702, 703 are associated with hydraulic cylinders 716, 717 and associated two-position three-way bidirectional valves 726, 727 that are interconnected in accordance with the description of the corresponding components of system 600 in FIG. 6A. The terms "unloading position" and "regenerative position" are defined for valves 726 and 727 in FIG. 7 as defined above for valve 626 in FIG. 6A. In FIG. 7, the fluid outputs of hydraulic cylinders 716, 717 are connected through piping 730, 731 to the input/output ports of a hydraulic motor 732 that may drive an electric generator or other load (not shown).

In other embodiments, either or both of the two-position three-way bidirectional valves 726, 727 may be replaced by two two-position two-way valves, or by some other mechanism. The cylinders 702, 703, 716, and 717 are portrayed as vertically oriented in FIG. 7, but this is for illustrative convenience only; their orientations may be arbitrary and dictated by design considerations.

In an initial state of operation, hydraulic valve 726 is in the unloading position, piston 704 is near the distal (upper) end of cylinder 702, piston 718 is near the distal (upper) end of cylinder 716, valve 727 is in unloading position, piston 705 is near the proximal (lower) end of cylinder 703, and piston 719 is near the distal (lower) end of cylinder 717. The pressure of the fluid in chamber 706 may be denoted $P_1$. The pressure of the fluid in chamber 706 is raised to a high pressure $P_{1:start}$ (e.g., through the opening of valves to a source of pressurized gas, and/or by rapid combustion of a combustible fluid within the chamber). The fluid in chamber 706 expands, performing work on piston 704. At some later point during the expansion of the fluid in chamber 706, valve 726 is switched from unloading position to regenerative position as described for expansion of pressurized fluid in chamber 606 in the illustrative system depicted in FIG. 6A. Consequently, the range of fluid pressures supplied by the hydraulic cylinder 716 to the hydraulic motor 732 is reduced as described for the illustrative system in FIG. 6A.

While expanding gas in chamber 706 is moving piston 704 so as to enlarge chamber 706, piston 705 in cylinder 703 is moved so as to shrink chamber 707. During this motion, fluid is exhausted at low pressure (e.g., near atmospheric pressure) from chamber 707 by the mechanism 711. Pistons 705 and 719 move in unison in the direction indicated by arrow 737. Pressurized fluid from chamber 720 of cylinder 716 passes through piping 730, hydraulic motor 732, and piping 731 to chamber 721 of hydraulic cylinder 717. During fluid expansion in the expansion chamber of the first gas cylinder 702, the second gas cylinder 703 and its associated hydraulic cylinder 717 are, in effect, performing an unpowered withdrawal or exhaust stroke, and minimal work is being performed by them or upon them.

When the piston 704 has reached its limit of motion in the direction indicated by arrow 734, piston 705 has reached its limit of motion in the direction indicated by arrow 737, and chamber 707 is at approximately minimum volume and low pressure. When this state is reached, venting of chamber 707 is typically terminated by mechanism 711. The pressure of the fluid in chamber 707 is then raised to a high pressure $P_{1:start}$ (e.g., through the opening of valves to a source of pressurized gas, and/or by rapid combustion of a combustible fluid within the chamber) by the mechanism 711 and valve 726 is switched to unloading setting. The fluid in chamber 707 expands as described above for the pressurized fluid in chamber 706 of the first gas cylinder 702, performing work on piston 705, which moves in the direction indicated by arrow 735. (Piston 719 moves in unison with piston 705 in the direction indicated by arrow 735.) Pressurized fluid from chamber 721 of cylinder 717 passes through piping 731, hydraulic motor 732, and piping 730 to chamber 720 of hydraulic cylinder 716.

At some later point during the expansion of the fluid in chamber 707, valve 727 is switched from unloading position to regenerative position as described for gas expansion in the illustrative system depicted in FIG. 6A. Consequently, the range of fluid pressures supplied by the hydraulic cylinder 717 to the hydraulic motor 732 is reduced as described for the illustrative system in FIG. 6A. During fluid expansion in the expansion chamber of gas cylinder 703, the first gaseous cylinder 702 and its associated hydraulic cylinder 716 are, in effect, performing an unpowered withdrawal or exhaust stroke, and minimal work is being performed by them or upon them.

When piston 705 has reached its limit of motion, the first state of operation described above for the system in FIG. 7 may be restored and the foregoing series of states of operation repeated. In the illustrative embodiment shown here, near or at the end of the hydraulic cylinder stroke, the displacement of hydraulic motor 732 is brought to near zero to brake and stop motion of the pistons 718, 704, 719 and 705. The displacement of hydraulic motor 732 may then be brought over-center to start motion in the opposite direction. The direction of rotation of hydraulic motor 732 is kept constant in this manner, even as the cylinders reciprocate, as is familiar to those skilled in hydraulic machinery. Similar functionality may be achieved by open-loop hydraulic motors and fixed-displacement motors through the selective use of valves.

Hydraulic fluid passes back and forth between the cylinders 716 and 717 through the hydraulic motor 732; the potential energy of the pressurized fluid introduced by mechanisms 710 and 711 into chambers 706 and 707 is converted to mechanical work delivered to any load connected to the mechanical output of the hydraulic motor 732.

Hydraulic cylinder pairs such as that shown in FIG. 7 may be employed in a system similar to that depicted in FIG. 5, which employs two or more paired-cylinder assemblies to convert potential energy from pressurized gas to mechanical work performed by a hydraulic motor according to various embodiments of the invention.

Figure 8:
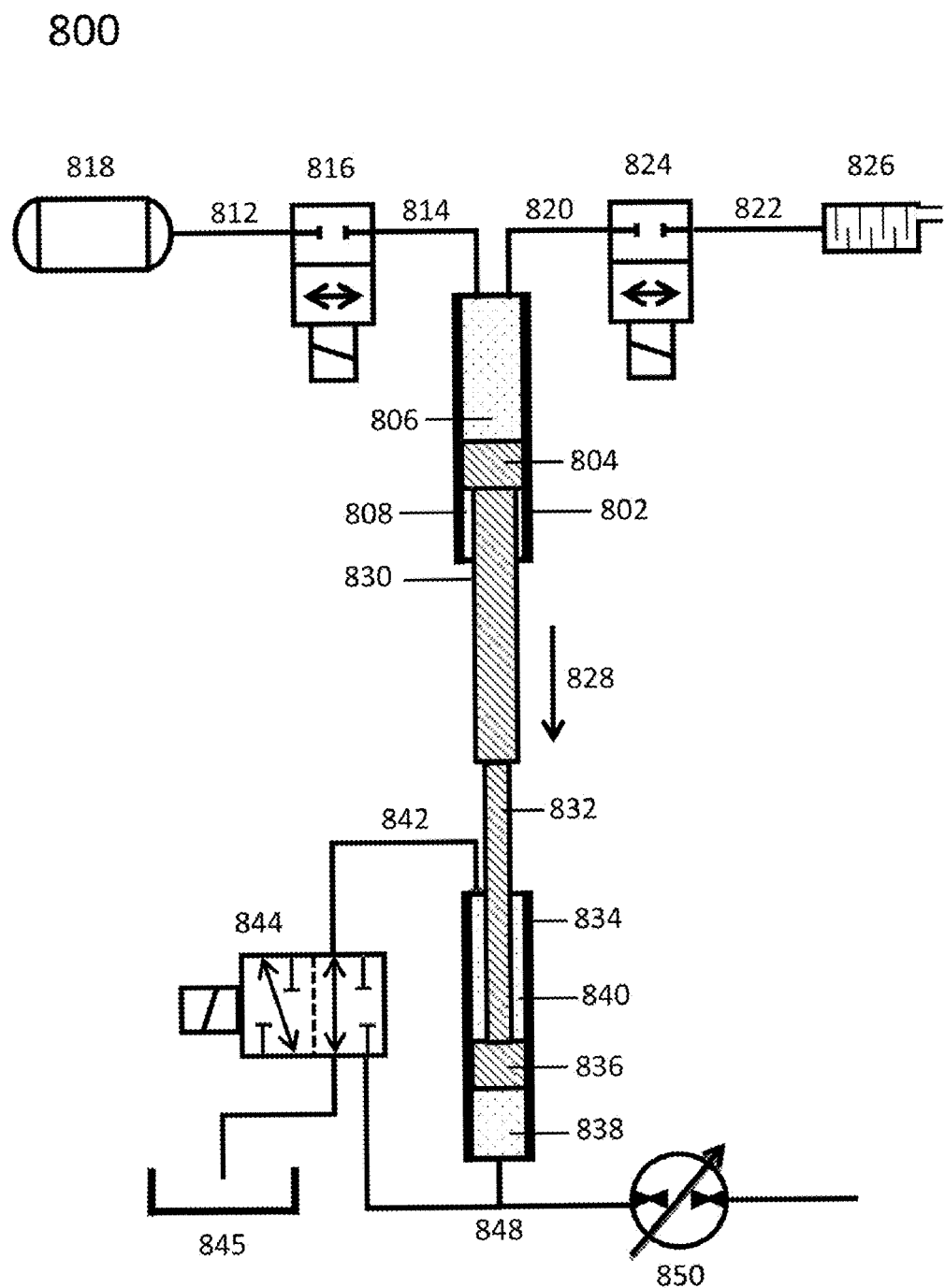
FIG. 8 is a schematic drawing of the major components of a pneumatic-hydraulic system that uses compressed air to drive a hydraulic motor in accordance with various embodiments of the invention.

FIG. 8 is a schematic of the major components of an illustrative system 800 similar to that depicted in FIG. 6A except that the block 610 in FIG. 6A is here explicitly represented as a system exchanging gas between a cylinder 102, a vessel 118, and a vent 126. The system 800 as shown in FIG. 8 includes a pneumatic cylinder 802 containing a slidably disposed piston 804 that divides the interior of the cylinder 802 into a distal chamber 806 and a proximal chamber 808. A port or ports (not shown) with associated pipes 812, 814 and a bidirectional valve 816 allows for gas from a high-pressure storage reservoir 818 to be admitted to chamber 806 as desired. A port or ports (not shown) with associated pipes 820, 822 and a bidirectional valve 824 allows for gas from the chamber 806 to be exhausted through a vent 826 (and, e.g., to the ambient atmosphere) as desired. A port or ports (not shown) allows the interior of the chamber 808 to communicate freely at all times with the ambient atmosphere.

The distal end of a rod 830 is coupled to the piston 804. The proximal end of the rod 830 is coupled to the proximal end of a second rod 832. The second rod 832 enters a hydraulic cylinder 834 containing a slidably disposed piston 836 that divides the interior of the cylinder 834 into a distal chamber 838 and a proximal chamber 840. In other embodiments, not shown, a single rod (the cross-sectional area of which may change over its length and/or be different at either end) may be used to connect pistons 804 and 836, and the two cylinders 802 and 834 may be brought into close proximity (or even into contact) in a tandem arrangement. A port or ports (not shown) allows fluid in the chamber 840 to pass through piping 842 to a valve 844, e.g., a two-position three-way bidirectional valve. The valve 844 may be set to direct its output either to a tank 845 containing fluid at low pressure or to piping 848 that is connected to chamber 838 of the cylinder 834 by a port or ports (not shown). Piping 848 is also directed to the input of a hydraulic motor 850 that may drive an electric generator (not shown), as described above.

In other embodiments, any or all of the bidirectional valves 816, 824, and 844 may be replaced by two one-directional valves in parallel, such as an actuated one-directional valve for expansion and a non-actuated check valve for compression, or by some other mechanism. Likewise, the two-position three-way valve 844 may be replaced by two two-way valves that achieve the appropriate functionality. The cylinders 802 and 834 are portrayed as vertically oriented in FIG. 8 but are arbitrarily oriented in other embodiments.

The area of piston 804 presented to chamber 806 of the pneumatic cylinder 802 may be denoted as $A_1$. The area of piston 836 presented to chamber 838 of the hydraulic cylinder 834 is $A_3$. The effective area of piston 836 presented to chamber 840 of the hydraulic cylinder 836 is $A_2$. $A_2$ is smaller than $A_3$ because rod 832 is connected to the piston 836 and present in chamber 840. The gas pressure in chamber 806 is $P_1$, the fluid pressure in chamber 840 is $P_2$, and the fluid pressure in chamber 838 is $P_3$. The pressures $P_1$, $P_2$, and $P_3$ may vary with time. Rods 830, 832 generally move in unison, as do the pistons 804, 836 coupled to the rods 830, 832.

When valve 844 is set to direct its fluid output to the tank 845, the valve 844 is in the unloading position. When valve 844 is set to direct its fluid output to piping 848 and thence to chamber 838 of the hydraulic cylinder 834 and to the hydraulic motor 850, the valve 844 is in the regenerative position. When the valve 844 is in the regenerative position, the chambers 838 and 840 are in fluid communication and their contents are presumed to be at effectively the same pressure.

In an initial state of operation, valve 844 is in the unloading position, piston 804 is near the distal end of cylinder 802, and piston 836 is near the proximal end of cylinder 834. During air expansion, valve 816 is opened and a quantity of high-pressure gas from reservoir 818 is admitted into chamber 806 at pressure $P_{1:start}$ (e.g., approximately 2,500 psig). The gas in chamber 806 exerts a force $F_1 = P_1 A_1$ on piston 804 that causes piston 804 to move in the direction indicated by arrow 828. When the gas in chamber 806 is at pressure $P_{1:start}$, the gas in chamber 806 exerts a force of $F_{1:start} = P_{1:start} A_1$ on piston 804, rods 830 and 832, and piston 836. The force $F_1 = P_1 A_1$ is transmitted by the rods 830, 832 to the hydraulic piston 836 and thence to the fluid in chamber 838. The fluid in chamber 840 exerts a force of $F_2 = P_2 A_2$ on piston 836 in the direction indicated by arrow 828. The force $F_3$ exerted by piston 836 on the fluid in chamber 838 is approximately the sum of forces $F_1$ and $F_2$ (assuming gravitational and frictional forces are negligible). Force $F_3$ produces a pressure of $P_3$ in chamber 838 according to $P_3 = F_3/A_3$.

Fluid exiting chamber 838 of the hydraulic cylinder 834 through piping 848 drives the hydraulic motor 850 and any loads (not shown) to which the mechanical output of the hydraulic motor 850 is attached in various embodiments. When a predetermined amount of air (or other gas) is admitted to chamber 806, valve 816 is closed. Subsequently, air in chamber 806 undergoes further expansion, eventually reaching an ending pressure $P_{1:end}$ at the end of the downward stroke.

As the gas in chamber 806 expands from the initial pressure of $P_{1:start}$, its pressure decreases. During this initial phase of an expansion, the pressure $P_2$ within chamber 840 of the hydraulic cylinder is effectively equal to the low pressure of the tank 845; the pressure in chamber 838, in piping 848, and at the input of the hydraulic motor 850 is $P_3 = P_1 A_1/A_3$, where $P_1$ is a decreasing function of time. At some pressure $P_{1:inter}$, less than $P_{1:start}$ but greater than $P_{1:end}$, the valve 844 is switched from its unloading position to its regenerative position. As shown above, changing the valve 844 from its unloading state to its regenerative state decreases the effective area $A_3$ presented by piston 836 to the fluid in chamber 838, increasing the pressure of the fluid in chamber 838 by a factor of $A_3/(A_3-A_2)$, from $P_{3:inter} = P_{1:inter} A_1/A_3$ to $P_{3:inter}' = P_{1:inter} A_1/(A_3-A_2)$. The pressure of the fluid in chamber 840, which is in fluid communication with chamber 838 when valve 844 is in unloading position, is at approximately the same pressure, $P_{2:inter}' = P_{3:inter}' = P_{1:inter} A_1/(A_3-A_2)$. The fluid at the input of the hydraulic pump 850 is also at approximately the same pressure, $P_{1:inter} A_1/(A_3-A_2)$.

As the gas in chamber 806 continues to expand, its pressure declines from $P_{1:inter}$ toward some low, final pressure $P_{1:end}$. Valve 844 remains in regenerative position and the fluid in chambers 840, 838 and at the input of the hydraulic motor 850 continues to be at the same pressure, $P_2 = P_3 = P_1 A_1/(A_3-A_2)$. The final pressure of the fluid in chambers 840, 838 and at the input of the hydraulic motor 850 is $P_{2:end} = P_{3:end} = P_{1:end} A_1/(A_3-A_2)$. This $P_{3:end}$ is higher by a factor of $A_3/(A_3-A_2)$ than that attained without engagement of the regenerative circuit (i.e., pipe 842, valve 844, pipe 848). The output pressure range of the hydraulic cylinder 834 (described as a ratio of the initial and the final pressures) when the regenerative circuit is employed as described above is therefore smaller by a factor of $A_1/(A_3-A_2)$ than the output pressure range of the hydraulic cylinder 834 if the valve 844 were kept in unloading position throughout the expansion of the gas in chamber 806. As described above, the hydraulic pressure ratio may be reduced to the square root of the overall pneumatic cylinder pressure ratio. For appropriate operation of the system 800 and appropriately chosen $P_{1:start}$, $P_{1:end}$, $A_1$, $A_2$, and $A_3$, the pressure of the fluid supplied to the hydraulic motor 850 may therefore range over an interval that is more favorable to efficient operation of the motor 850.

Figure 9:
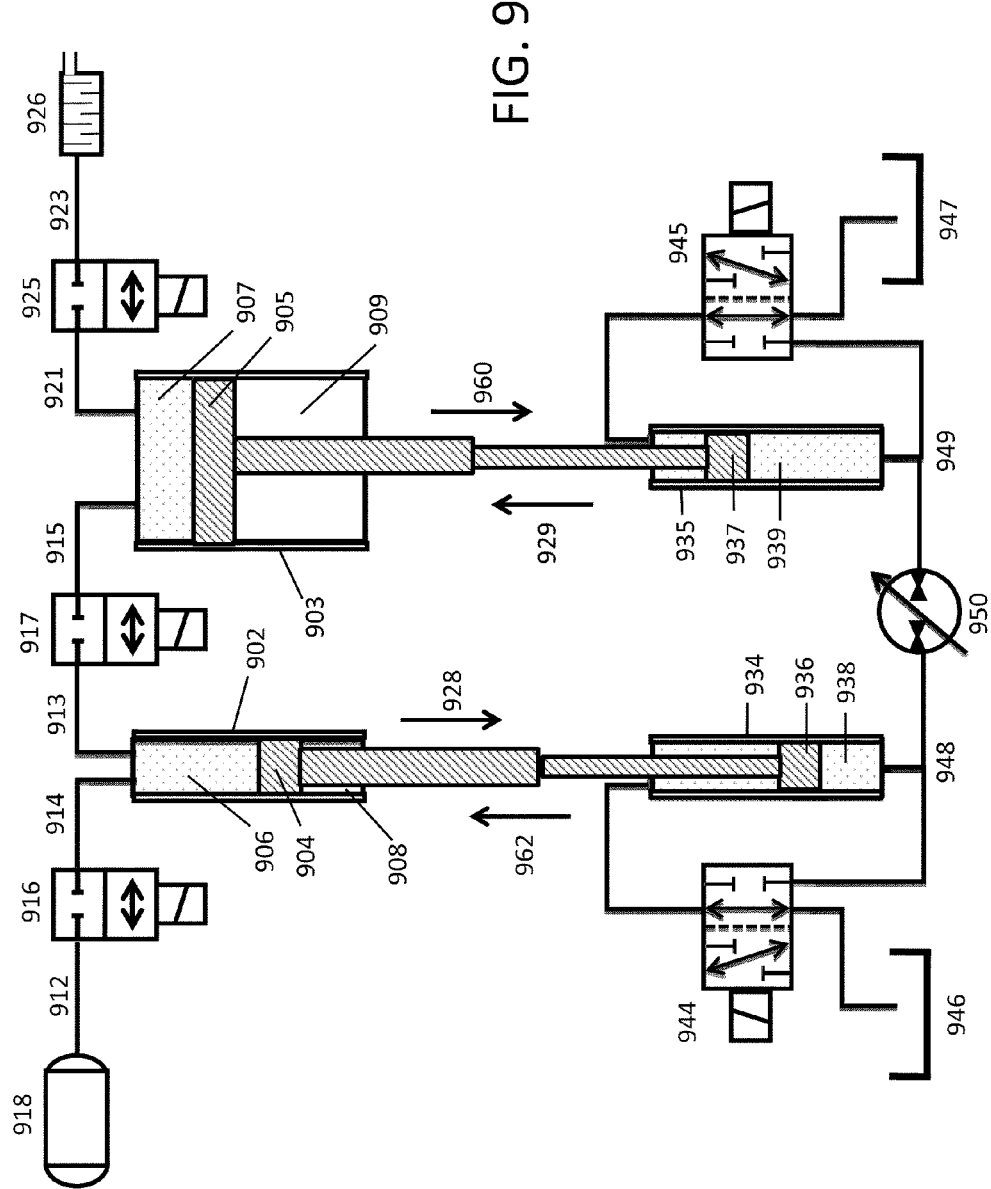
FIG. 9 is a schematic drawing of a system including two pneumatic-hydraulic systems similar to that depicted in FIG. 8, coupled to each other in accordance with alternative embodiments of the invention.

FIG. 9 is a schematic of the major components of an illustrative system 900 that employs two pneumatic-hydraulic intensifiers similar to that depicted in FIG. 8 to convert the potential energy of compressed gas to mechanical work performed by a hydraulic motor according to other embodiments of the invention.

System 900 includes a high-pressure pneumatic cylinder 902 containing a mobile piston 904 that divides the interior of the cylinder 902 into two chambers 906 and 908. A port or ports (not shown) with associated pipes 912, 914 and a valve 916 allows for fluid to be admitted to or withdrawn from chamber 906 as desired. Gas is stored at high pressure in a reservoir 918 and may be admitted to chamber 906 through the bidirectional valve 916, piping 912, 914, and an appropriate port (not shown). In this illustrative system, gas in chamber 908 is in communication with the ambient atmosphere through an appropriate port (not shown) and piping (not shown).

System 900 also includes a low-pressure cylinder 903 containing a mobile piston 905 that divides the interior of the cylinder 903 into two chambers 907 and 909. A port or ports (not shown) with associated pipes 921, 923 and a bidirectional valve 925 allows fluid to be exhausted from chamber 907 through vent 926 as desired. Gas may be passed from chamber 906 of cylinder 902 to chamber 907 of cylinder 903 through piping 913, a bidirectional valve 917, and piping 915. Gas in chamber 909 is typically in communication with the ambient atmosphere through an appropriate port (not shown) and piping (not shown). The surface area presented by piston 904 to chamber 906 of the high-pressure cylinder 902 may be smaller than the surface area presented by piston 905 to chamber 907 of the low-pressure pneumatic cylinder 903.

The pneumatic cylinders 902, 903 are associated with hydraulic cylinders 934, 935 and associated valves 944, 945 (e.g., two-position three-way bidirectional valves) that are interconnected in accordance with the description of the corresponding components of system 800 in FIG. 8. The terms "unloading position" and "regenerative position" are defined for valves 944 and 945 in FIG. 9 as defined above for valve 844 in FIG. 8. In FIG. 9, the fluid outputs of hydraulic cylinders 934, 935 are connected through piping 948, 949 to the input/output ports of a motor 950 (e.g., a hydraulic motor such as a variable-displacement over-center closed-loop hydraulic motor) that may drive an electric generator (not shown).

In other embodiments, any or all of the bidirectional valves 916, 917, 925, 944, and 945 may be replaced by two one-directional valves in parallel, such as an actuated one-directional valve for expansion and a non-actuated check valve for compression, or by some other mechanism. Likewise, the two-position three-way valves 944 and 945 may be replaced by two two-way valves that achieve the appropriate functionality. The cylinders 902, 903, 934, and 935 are portrayed as vertically oriented in FIG. 9 but are arbitrarily oriented in other embodiments.

In an initial state of operation, hydraulic valve 944 is in the unloading position, piston 904 is near the distal upper end of cylinder 902, piston 936 is near the upper (proximal) end of cylinder 934; valve 945 is in unloading position, piston 905 is near the proximal (lower) end of cylinder 905, piston 937 is near the distal (lower) end of cylinder 935. During air expansion, valve 916 is opened and a quantity of high-pressure gas from reservoir 918 is admitted into chamber 906. The gas in chamber 906 expands, performing work on piston 904. At some later point during the expansion of the gas in chamber 906, valve 916 is closed. At some still later point during the expansion of the gas in chamber 906, valve 944 is switched from unloading position to regenerative position as described for gas expansion in illustrative system 800. Consequently, the range of fluid pressures supplied by the hydraulic cylinder 934 to the hydraulic motor 950 is reduced as described for system 800.

While expanding gas in chamber 906 is moving piston 904 so as to enlarge chamber 906, piston 905 in cylinder 903 is moved so as to shrink chamber 907. During this motion, valve 917 is closed, valve 925 is open, and gas is exhausted at low pressure (e.g. atmospheric pressure) from chamber 907 through piping 921, valve 925, piping 923, and vent 926. Pistons 905 and 937 move in unison in the direction indicated by arrow 929. Pressurized fluid from chamber 938 of cylinder 934 passes through piping 948, hydraulic motor 950, and piping 949 to chamber 939 of hydraulic cylinder 935. During gas expansion in the high-pressure cylinder 902, the low-pressure cylinder 903 and its associated hydraulic cylinder 935 are, in effect, performing an unpowered withdrawal or exhaust stroke, and minimal work is being performed upon or by them.

When the piston 904 has reached its limit of motion, the pressure of the gas in chamber 906 has decreased from its original high value (e.g., approximately 2,500 psig) to a final mid-pressure (e.g., approximately 250 psig). In the illustrative embodiment shown here, near or at the end of the hydraulic cylinder stroke, the displacement of hydraulic motor 950 is brought to near zero to brake and stop motion of the pistons 936, 904, 937 and 905. The displacement of hydraulic motor 950 may then be brought over-center to start motion in the opposite direction. Direction of rotation of hydraulic motor 950 may be kept constant in this manner, even as the cylinders reciprocate, as is familiar to those skilled in the art of hydraulic machinery. Similar functionality may be achieved by open-loop hydraulic motors and fixed-displacement motors through the selective use of valves, configurations that are explicitly within the scope of embodiments of the invention.

When chamber 907 is at minimum volume and low pressure, valve 925 is closed and venting of chamber 907 ceases. Valve 917 is then opened, allowing mid-pressure gas to exit chamber 906 through pipe 913. Valve 944 is switched to its unloading setting. When fluid communication has been established between chambers 906 and 907 by opening valve 917, piston 904 in cylinder 902 may be moved so as to reduce the volume of chamber 906 while gas at mid-pressure moves to chamber 907 and there expands, performing work on piston 905, which moves in the direction indicated by arrow 960. Pistons 905 and 937 move in unison in the direction indicated by arrow 960. Pressurized fluid from chamber 939 of cylinder 935 passes through piping 949, hydraulic motor 950, and piping 948 to chamber 938 of hydraulic cylinder 934. At some later point during the expansion of the gas in chamber 907, valve 945 is switched from its unloading position to its regenerative position as described for gas expansion in system 800. Consequently, the range of fluid pressures supplied by the hydraulic cylinder 934 to the hydraulic motor 950 is reduced as described above. When piston 905 has reached its limit of motion, the gas in chamber 907 will be at low (e.g., atmospheric) pressure. During gas expansion in the low-pressure cylinder 903, the high-pressure cylinder 902 and its associated hydraulic cylinder 934 are, in effect, performing a withdrawal stroke, and minimal work is being performed upon or by them.

When piston 905 has reached its limit of motion, the first state of operation described above for system 900 may be restored and the foregoing states of operation repeated. Hydraulic fluid passes back and forth between the cylinders 934 and 935 through the hydraulic motor 950, and the potential energy of compressed air (or other gas) in the store 918 is converted into mechanical work delivered to whatever load to which the mechanical output of the hydraulic motor 950 is connected.

In FIG. 9, two pairs of cylinders (202, 934 and 903, 935) are used to extract work from gas expanding from high pressure to low (e.g., approximately atmospheric) pressure. In other embodiments, three or more pairs of cylinders are employed.

Hydraulic cylinder pairs such as that shown in FIG. 9 may be employed in a system similar to that depicted in FIG. 5, which employs two or more paired-cylinder assemblies to convert potential energy from pressurized gas to mechanical work performed by a hydraulic motor according to various embodiments of the invention.

Figure 10A:
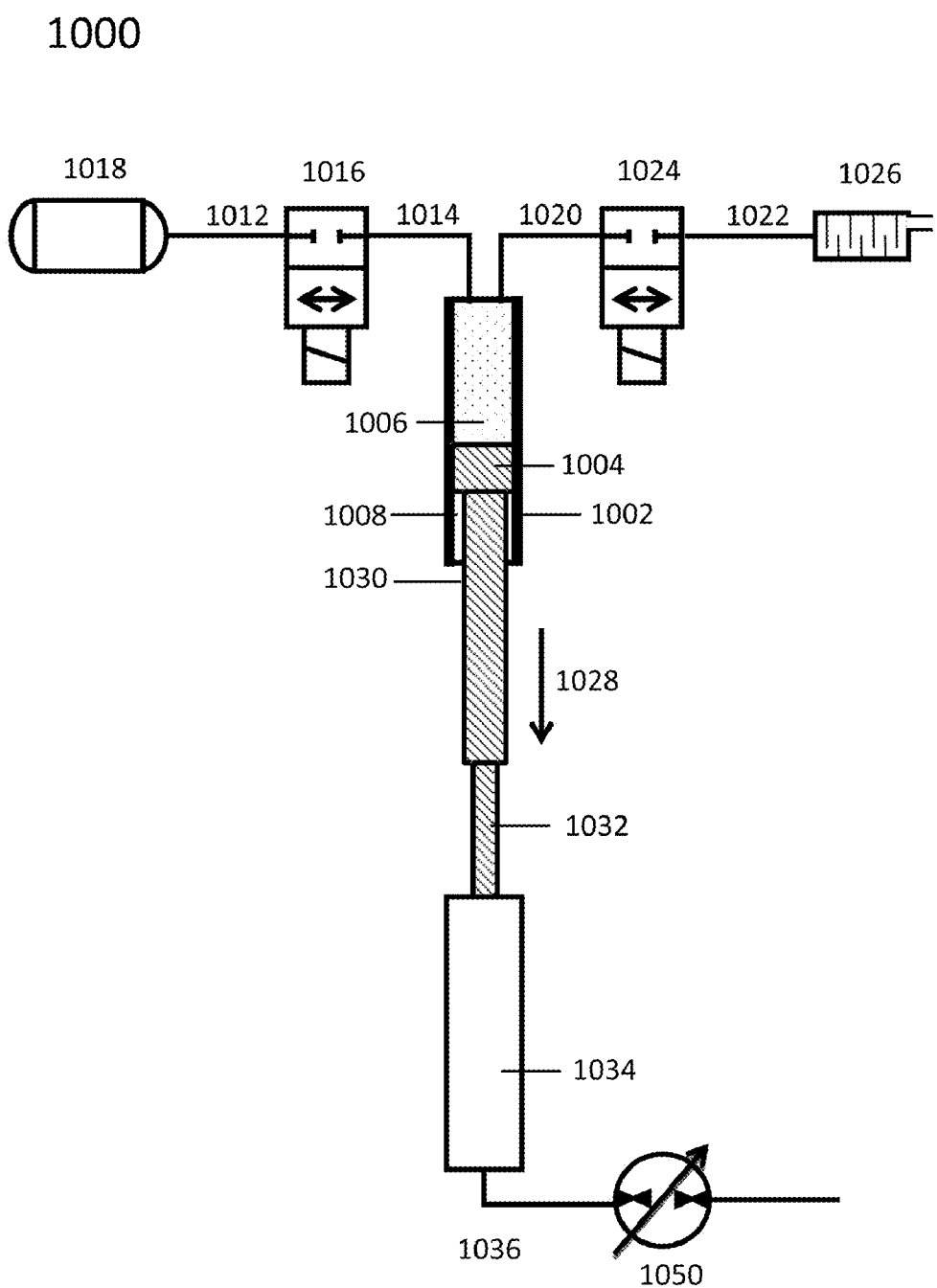
FIG. 10A is a schematic drawing of the major components of a pneumatic-hydraulic system that uses compressed air to drive a hydraulic motor in accordance with various embodiments of the invention.
Figure 10B:
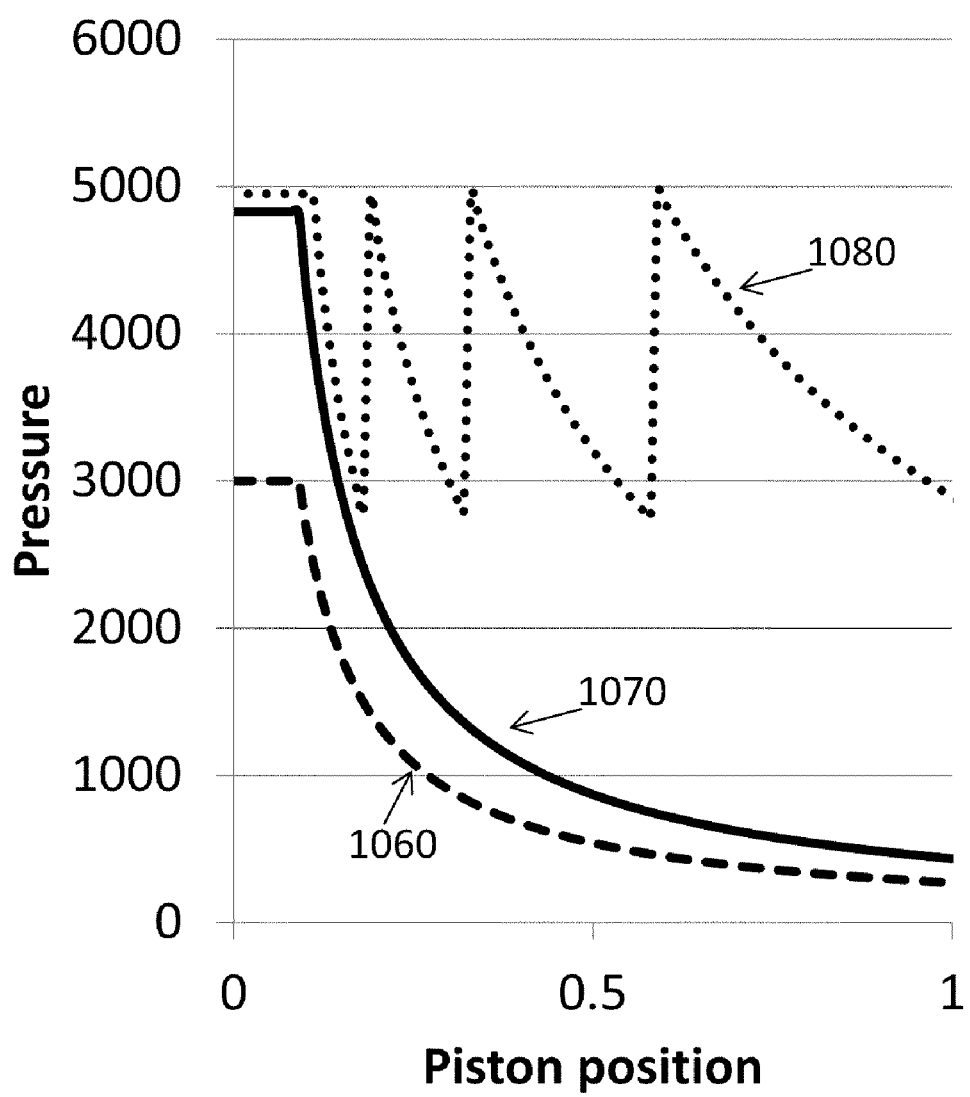
FIG. 10B illustrates exemplary pressure profiles for the system illustrated in FIG. 10A.

FIG. 10A is a schematic of the major components of an illustrative system 1000 that employs a pneumatic-hydraulic intensifier to convert the potential energy of compressed gas into mechanical work performed by a hydraulic motor. The system 1000 as shown in FIG. 10A includes a pneumatic cylinder 1002 containing a slidably disposed piston 1004 that divides the interior of the cylinder 1002 into a distal chamber 1006 and a proximal chamber 1008. A port or ports (not shown) with associated pipes 1012, 1014 and a bidirectional valve 1016 allows for gas from a storage reservoir 1018 to be admitted to chamber 1006 as desired. A port or ports (not shown) with associated pipes 1020, 1022 and a bidirectional valve 1024 allows for gas from the chamber 1006 to be exhausted through a vent 1026 (e.g., to the ambient atmosphere) as desired. A port or ports (not shown) allows the interior of the chamber 1008 to communicate freely at all times with the ambient atmosphere.

The distal end of a rod 1030 is coupled to the piston 1004. The proximal end of the rod 1030 is coupled to the proximal end of a second rod 1032. The second rod 1032 enters a digital hydraulic assembly 1034 that features a hydraulic cylinder, having three or more chambers (e.g., four chambers), valving, piping, control circuits, and a reservoir of low-pressure fluid in accordance with the '890 application. Some or all of the chambers, valves, and pipes of digital hydraulic assembly 1034 may contain low-pressure fluid in some operating conditions and high-pressure fluid in other operating conditions.

As employed in the system 1000 of FIG. 10A, the digital hydraulic assembly 1034 is functionally equivalent to a hydraulic cylinder with a discretely variable piston area. The digital hydraulic assembly 1034 is accordingly represented as device having a single fluid input/output (piping 1036) and a single mechanical force input/output (rod 1032), and its internal details as disclosed in the '890 patent are not further specified herein.

In other embodiments, not shown, a single rod (the cross-sectional area of which may change over its length and/or be different at either end) may be used to connect piston 1004 to the digital hydraulic assembly 1034 and cylinder 1002 and assembly 1034 may be brought into close proximity (or even into contact) in a tandem arrangement. Piping 1036 directs high-pressure fluid from the digital hydraulic assembly 1034 to the input of a hydraulic motor 1050 that may drive an electric generator (not shown).

In other embodiments, either or both of the bidirectional valves 1016 and 1024 may be replaced by two one-directional valves in parallel, such as an actuated one-directional valve for expansion and a non-actuated check valve for compression, or by some other mechanism. The cylinder 1002 and digital hydraulic assembly 1034 are portrayed as vertically oriented in FIG. 10A but are arbitrarily oriented in other embodiments. The gas pressure in chamber 1006, also referred to herein as $P_1$, may vary with time. Rods 1030, 1032 generally move in unison, as do the piston 1004 and components of the digital hydraulic assembly 1034 that are connected, directly or via other components, to the rod 1032.

In an initial state of operation, piston 1004 is near the distal end of cylinder 1002, rod 1032 is mostly withdrawn in the distal direction from digital hydraulic assembly 1034, and the digital hydraulic assembly 1034 is set to a connection pattern such that the effective piston area of the digital hydraulic assembly 1034 is at a relatively high initial value. During air expansion, valve 1016 is opened and a quantity of high-pressure gas from reservoir 1018 is admitted into chamber 1006 at pressure $P_{1:start}$, (e.g., approximately 2,500 psig). The gas in chamber 1006 exerts a force $F_1$ that varies with time on piston 1004. Force $F_1$ causes piston 1004, rod 1030, and rod 1032 to move in the direction indicated by arrow 1028. When the gas in chamber 1006 is at pressure $P_{1:start}$, the gas in chamber 1006 exerts a force of $F_{1:start}$ on piston 1004 and rods 1030 and 1032 that is transmitted by the rods 1030, 1032 to the digital hydraulic assembly 1034 and thence to fluids within the chambers of the digital hydraulic assembly 1034.

Fluid exiting the digital hydraulic assembly 1034 through piping 1036 drives the hydraulic motor 1050 and any loads (not shown) to which the mechanical output of the hydraulic motor 1050 is attached in various embodiments.

When a predetermined amount of air (or other gas) is admitted to chamber 1006, valve 1016 is closed. Subsequently, air in chamber 1006 undergoes further expansion, eventually reaching an ending pressure $P_{1:end}$ at the end of the downward stroke. As the gas in chamber 1006 expands from the initial pressure of $P_{1:start}$, its pressure decreases. At N intermediate gas pressures $P_{1:n}$ (where n: 10→N, N≦106, $P_{1:start} \geq P_{1:1}$, and $P_{1:N} \geq P_{1:end}$), the plurality of (e.g., four) chambers of the digital hydraulic assembly 1134 are connected to high and low pressures in a series of N connection patterns. These N connection patterns are chosen and ordered such that the effective area of the digital hydraulic assembly 1034 increases in a series of quantized steps while the force $F_1$ exerted by the gas in the expansion chamber 1006 of the pneumatic cylinder 1002 decreases, reducing the range of output fluid pressures of the digital hydraulic assembly 1034 through the expansion stroke of the system 1000. The hydraulic motor 1050 is thus driven over a narrow range of fluid pressures that may be more favorable to efficient operation of the motor 1020. Likewise, the narrower pressure range allows for the use of a smaller (lower flow rate), and (in some embodiments) less expensive, hydraulic motor 1050 for a given power level.

FIG. 10B illustrates an exemplary pressure profile for the system 1000 illustrated in FIG. 10A. Curve 1060 illustrates an exemplary pressure evolution within chamber 1006 that begins at a $P_{1:start}$ of approximately 3000 psi and ends at $P_{1:end}$ of approximately 270 psi, corresponding to a pressure range (here an expansion ratio) of approximately eleven to one (11:1). For a hydraulic cylinder with a single area ratio of, e.g., 1.65:1.00 (i.e., a hydraulic cylinder without a variable effective piston area such as cylinder 334 of FIG. 3), the hydraulic cylinder pressure would vary as depicted by curve 1070 between approximately 5000 psi and 435 psi, i.e., with approximately the same eleven-to-one ratio pressure range as the pneumatic pressure. For a hydraulic cylinder arrangement with, e.g., four or more selectable discrete effective piston areas (e.g., the digital hydraulic assembly 1034 of FIG. 10A), the resulting pressure evolution is depicted as curve 1080. In this exemplary embodiment, curve 1080 is based on four different effective piston areas, where the piston-area ratios between piston 1004 and the effective piston area of digital hydraulic assembly 1034 are approximately 1.65:1.00, 3.10:1.00, 5.70:1.00, and 10.50:1.00. As shown in FIG. 10B, at a piston position of approximately 0.2, a valve (or valves) is actuated to change the effective piston area to 3.10:1.00, boosting the pressure at pipe 1036 at the inlet of motor 1050 from 2700 psi to 5000 psi. At a piston position of approximately 0.35, a valve (or valves) is actuated to change the effective piston area to 5.70:1.00, again boosting the pressure at pipe 1036 at the inlet of motor 1050 from 2700 psi to 5000 psi. A similar boost is achieved at a piston position of approximately 0.6 (wherein the effective piston area ratio is changed to 10.50:1.00) Thus, the pressure in pipe 1036 at the inlet of hydraulic motor 1050 may vary only between the initial pressure of 5000 psi and final pressure of 2700 psi as shown in curve 1080, for a reduced pressure ratio of approximately 1.85:1.00 or nearly the fourth root of the pneumatic pressure ratio of eleven to one.

Figure 11:
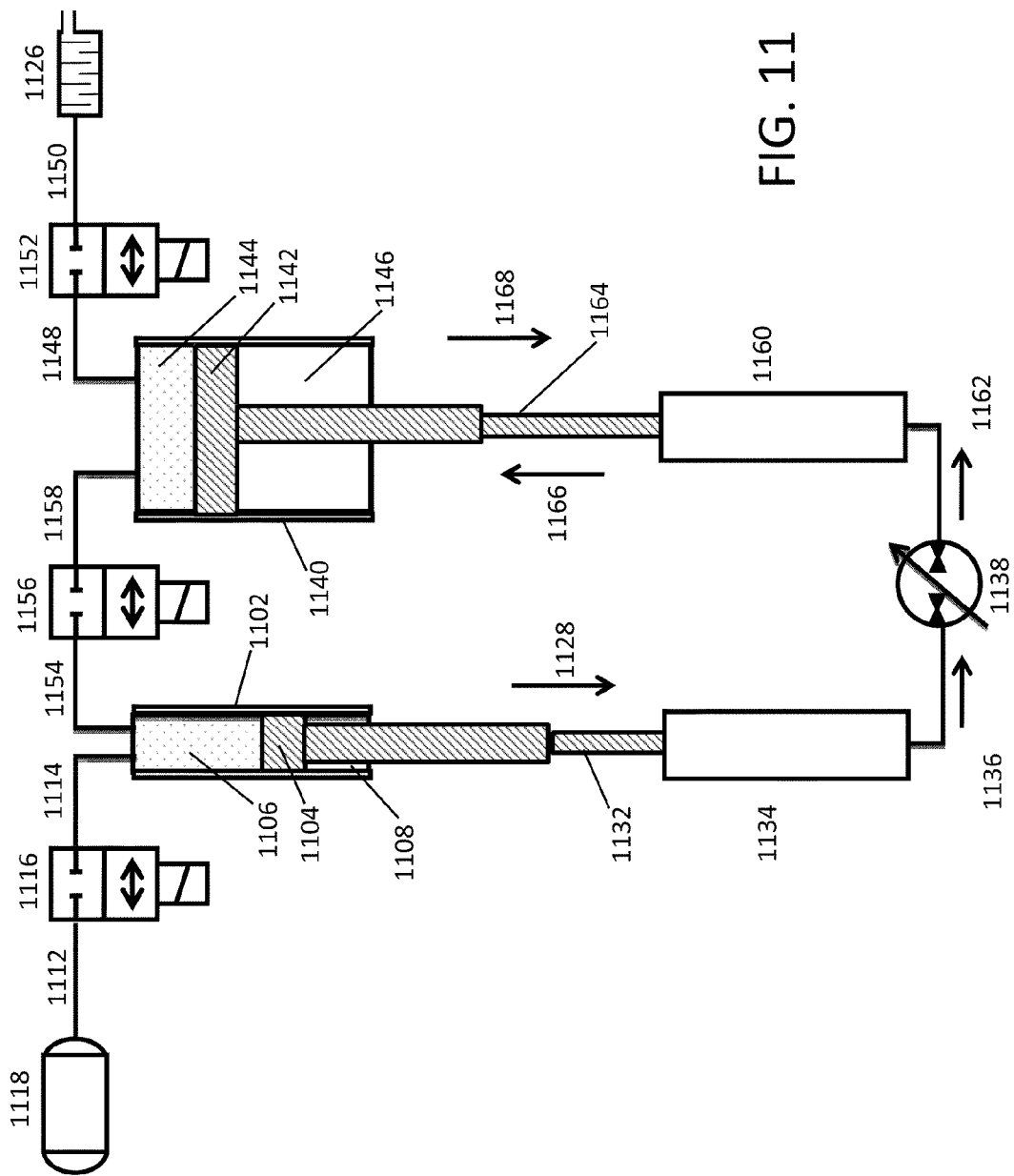
FIG. 11 is a schematic drawing of a system including two pneumatic-hydraulic systems similar to that depicted in FIG. 10A, coupled to each other in accordance with alternative embodiments of the invention.

FIG. 11 is a schematic of the major components of an illustrative system 1100 that employs two pneumatic-hydraulic intensifiers to convert the potential energy of compressed gas to mechanical work performed by a hydraulic motor according to other embodiments of the invention. System 1100 includes a high-pressure pneumatic cylinder 1102 containing a mobile piston 1104 that divides the interior of the cylinder 1102 into two chambers 1106 and 1108. A port or ports (not shown) with associated pipes 1112, 1114 and a valve 1116 allows for fluid to be admitted to or withdrawn from chamber 1106 as desired. Gas is stored at high pressure in a reservoir 1118 and may be admitted to chamber 1106 through the bidirectional valve 1116, piping 1112, 1114, and an appropriate port (not shown). In this illustrative system, gas in chamber 1108 is in communication with the ambient atmosphere through an appropriate port (not shown) and piping (not shown).

System 1100 also includes a low-pressure cylinder 1140 containing a mobile piston 1142 that divides the interior of the cylinder 1140 into two chambers 1144 and 1146. A port or ports (not shown) with associated pipes 1148, 1150 and a bidirectional valve 1152 allows fluid to be exhausted from chamber 1144 through vent 1126 as desired. Gas may be passed from chamber 1106 of cylinder 1102 to chamber 1144 of cylinder 1140 through piping 1154, a bidirectional valve 1156, and piping 1158. Gas in chamber 1146 is typically in communication with the ambient atmosphere through an appropriate port (not shown) and piping (not shown). The surface area presented by piston 1104 to chamber 1106 of the high-pressure cylinder 1102 may be smaller than the surface area presented by piston 1142 to chamber 1144 of the low-pressure pneumatic cylinder 1140.

The pneumatic cylinders 1102, 1140 are respectively associated with multiple-chamber (e.g., four-chamber) digital hydraulic assemblies 1134, 1160 in accordance with the description of the corresponding components of system 1000 in FIG. 10A. In FIG. 11, the fluid outputs of the digital hydraulic assemblies 1134, 1160 are connected through piping 1136, 1162 to the input/output ports of a motor 1138 (e.g., a hydraulic motor such as a variable-displacement over-center closed-loop hydraulic motor) that may drive an electric generator (not shown).

In other embodiments, any or all of the bidirectional valves 1116, 1156, and 1152 may be replaced by two one-directional valves in parallel, such as an actuated one-directional valve for expansion and a non-actuated check valve for compression, or by some other mechanism. The cylinders 1102, 1140 and the digital hydraulic assemblies 1134, 1160 are portrayed as vertically oriented in FIG. 11 but are arbitrarily oriented in other embodiments.

In an initial state of operation, piston 1104 is near the distal (upper) end of cylinder 1102, piston 1142 is near the proximal (lower) end of cylinder 1140, rod 1132 is largely withdrawn in the distal direction from digital hydraulic assembly 1134, the digital hydraulic assembly 1134 is set to a connection pattern such that the effective piston area of the digital hydraulic assembly 1134 is at a relatively small initial value, and rod 1164 is largely inserted in the proximal direction into digital hydraulic assembly 1160.

During air expansion, valve 1116 is opened and a quantity of high-pressure gas from reservoir 1118 is admitted into chamber 1106. The gas in chamber 1106 expands, exerting a proximally directed force $F_2$ on the piston 1104 and performing work on piston 1104. The piston 1104 and rod 1132 move in the direction indicated by arrow 1128. At some later point during the expansion of the gas in chamber 1106, valve 1116 is closed. The gas in chamber 1106 expands to some final mid pressure $P_{mid}$ and approximately maximum volume; during this expansion, at the attainment of N intermediate gas pressures $P_{1:m}$ (where m: $10 \rightarrow N$, $N \leq 106$, $P_{1:start} \geq P_{1:1}$, and $P_{1:N} \geq P_{mid}$) in chamber 1106, the multiple (e.g., four) chambers of the digital hydraulic assembly 1134 are connected to high and low pressures in a sequence of N distinct connection patterns. These N connection patterns are chosen and ordered such that the effective area of the digital hydraulic assembly 1134 increases through N discrete values while the force $F_1$ exerted by the gas in the expansion chamber 1106 of the pneumatic cylinder 1102 decreases, reducing the range of output fluid pressures of the digital hydraulic assembly 1134 throughout the expansion stroke of the cylinder 1102. The hydraulic motor 1138 is thus driven over a narrower range of fluid pressures that may be more favorable to efficient operation of the motor 1138.

While expanding gas in chamber 1106 is moving piston 1104 so as to enlarge chamber 1106, piston 1142 in cylinder 1140 is moved so as to shrink chamber 1144. During this motion, valve 1156 is closed, valve 1152 is open, and gas is exhausted at low pressure (e.g., atmospheric pressure) from chamber 1144 through piping 1148, valve 1152, piping 1150, and vent 1126. Piston 1142 and rod 1164 move in unison in the direction indicated by arrow 1166. Fluid from the output of digital hydraulic assembly 1134 passes through piping 1136, hydraulic motor 1138, and piping 1162 into one or more chambers of digital hydraulic assembly 1160. During gas expansion in the high-pressure cylinder 1102, the low-pressure cylinder 1140 and its associated digital hydraulic assembly 1160 are, in effect, performing an unpowered withdrawal or exhaust stroke, and minimal work is being performed upon or by them.

When the piston 1104 has reached its limit of motion, the pressure of the gas in chamber 1106 has decreased from its original high value (e.g., approximately 2,500 psig) to a final mid-pressure $P_{mid}$ (e.g., approximately 250 psig). In the illustrative embodiment shown here, near or at the end of the digital hydraulic assembly stroke, the displacement of hydraulic motor 1138 is brought to near zero to brake and stop motion of the pistons and rods of the pneumatic cylinders 1102, 1140 and the digital hydraulic assemblies 1134, 1160. The displacement of hydraulic motor 1138 may then be brought over-center to start motion in the opposite direction. Direction of rotation of hydraulic motor 1138 is kept constant in this manner, even as the cylinders 1102, 1140 and digital hydraulic assemblies 1134, 1160 reciprocate, as will be familiar to those skilled in the art of hydraulic machinery. Similar functionality may be achieved by open-loop hydraulic motors and fixed-displacement motors through the selective use of valves, configurations that are explicitly within the scope of embodiments of the invention.

When chamber 1144 is at approximately minimum volume and low pressure, valve 1152 is closed and venting of chamber 1144 (e.g., to the atmosphere) ceases. Valve 1156 is then opened, allowing mid-pressure gas to pass from chamber 1106 through pipe 1154, valve 1156, and pipe 1158 into chamber 1144. The connection pattern of digital hydraulic assembly 1134 may be altered. When fluid communication has been established between chambers 1106 and 1144 by opening valve 1156, piston 1104 in cylinder 1102 may be moved so as to reduce the volume of chamber 1106 while gas at mid-pressure moves to chamber 1144 and there expands, exerting a force $F_2$ on piston 1142 and performing work on piston 1142, which moves in the direction indicated by arrow 1168. Piston 1142 and rod 1164 move in unison in the direction indicated by arrow 1168. Pressurized fluid from the output of digital hydraulic assembly 1160 passes through piping 1162, hydraulic motor 1138, and piping 1136 into one or more chambers of digital hydraulic assembly 1134. The gas in chamber 1144 expands from $P_{mid}$ to some final minimum pressure $P_{2:end}$ (e.g., atmospheric pressure) and maximum volume; during this expansion, at M intermediate gas pressures $P_{2:m}$ (where m: 10→M, M≦106, $P_{mid} \geq P_{2:1}$, and $P_{2:M} \geq P_{2:end}$) the multiple (e.g., four) chambers of the digital hydraulic assembly 1160 are connected to high and low pressures in M distinct connection patterns These M connection patterns are chosen and ordered such that the effective area of the digital hydraulic assembly increases through M discrete values while the force $F_2$ exerted by the gas in the expansion chamber 1144 of the pneumatic cylinder 1140 decreases, reducing the range of output fluid pressures of the digital hydraulic assembly 1160 through the expansion stroke of the cylinder 1140. The hydraulic motor 1138 is thus driven over a narrower range of fluid pressures that may be more favorable to efficient operation of the motor 1138.

When piston 1142 has reached its limit of motion, the gas in chamber 1144 will be at low (e.g., atmospheric) pressure $P_{2:end}$. During gas expansion in the low-pressure cylinder 1140, the high-pressure cylinder 1102 and its associated digital hydraulic assembly 1134 are, in effect, performing a withdrawal stroke, and minimal work is being performed upon or by them.

When piston 1142 has reached its limit of motion, the first state of operation described above for system 1100 may be restored and the foregoing states of operation repeated. Hydraulic fluid passes back and forth between the digital hydraulic assemblies 1134 and 1160 through the hydraulic motor 1138, and the potential energy of compressed air (or other gas) in the store 1118 is converted into mechanical work delivered to whatever load to which the mechanical output of the hydraulic motor 1138 is connected. Fluid flows between the digital hydraulic assemblies 1134 and 1160 through the motor 1138 and through connections to a low pressure source (not shown) such as a hydraulic fluid reservoir. The two digital hydraulic assemblies 1134 and 1160 may be actuated in such a way as to always move at the same rate, thus moving exactly out-of-phase, or may act with different areas such that they travel at different rates (e.g., the retracting cylinder may travel at a constant speed whereas the active cylinder may travel at varying speed) as long as the retracting cylinder reaches end of stroke prior to or at the same time as the active cylinder.

A pneumatic cylinder paired with a digital hydraulic assembly either as pneumatic cylinder 1102 is paired with digital hydraulic assembly 1134 in FIG. 11, or in some functionally equivalent manner, falls within the definition, as utilized herein, of a "pneumatic-hydraulic assembly." In FIG. 11, two pneumatic-hydraulic assemblies (1102, 1134 and 1140, 1160), one featuring a high-pressure pneumatic cylinder and the other featuring a low-pressure pneumatic cylinder, are used to extract work from gas expanding from high pressure to approximately atmospheric pressure. In other embodiments, three or more pneumatic-hydraulic assemblies are employed.

In other embodiments, two pneumatic-hydraulic assemblies, each including a high-pressure pneumatic cylinder, are arranged to exchange hydraulic fluid between their respective digital hydraulic assemblies through a hydraulic motor; in such embodiments, the gas expansion chambers (e.g., 1106) of both pneumatic-hydraulic assemblies may be selectively connected through valves to a gas reservoir (e.g., 1118) or to a vent (e.g., 1126), and an inter-cylinder connection (e.g., piping 1154, valve 1156, and piping 1158) may be omitted. In other embodiments, three or more such pneumatic-hydraulic assemblies including high-pressure pneumatic cylinders are employed.

Hydraulic cylinder pairs such as that shown in FIG. 11 may be employed in a system similar to that depicted in FIG. 5, which employs two or more paired-cylinder assemblies to convert potential energy from pressurized gas to mechanical work performed by a hydraulic motor according to various embodiments of the invention.

Figure 12A:
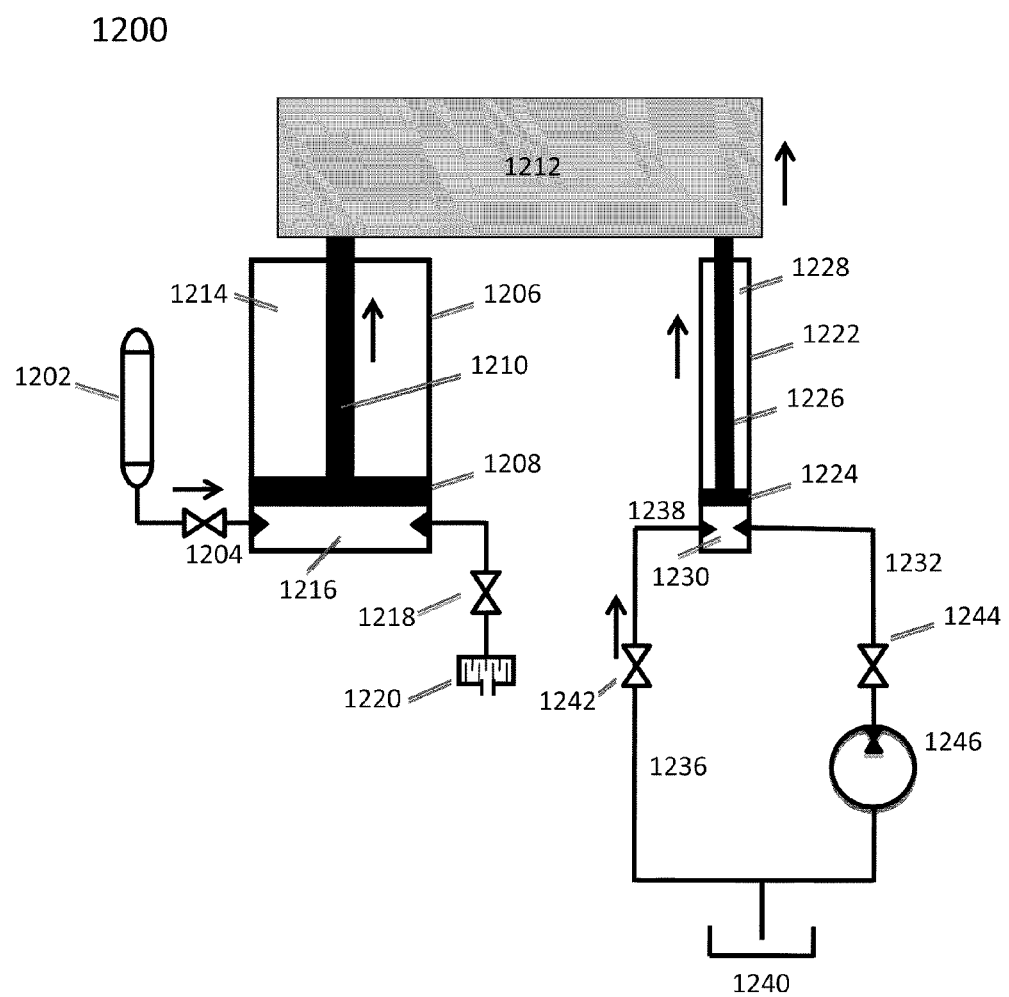
FIG. 12A is a schematic drawing of an energy storage and retrieval system that includes an elevated mass.

FIG. 12A depicts an illustrative system 1200 that stores energy by compressing gas and releases it by expanding gas. Compressed gas is stored at high pressure (e.g., 3,000 psi) in a reservoir 1202. Reservoir 1202 communicates through a valve 1204 with a vertically aligned cylinder assembly 1206 (e.g., a pneumatic cylinder assembly) that includes a piston 1208 slidably disposed therein with a rod 1210 extending from the piston 1208 and communicating mechanically with a substantial mass 1212. The piston 1208 divides the interior of the cylinder 1206 into two chambers 1214, 1216 that are generally not in fluid communication with each other. The lower chamber 1216 of the cylinder 1206 additionally communicates through a valve 1218 with a vent 1220. Alternatively, the lower chamber 1216 of cylinder 1206 may be connected to additional serially-connected pneumatic cylinders (e.g., connected in series pneumatically such that gas from a chamber of one cylinder travels to a chamber of a second cylinder for, for example, further expansion or compression) through valve 1218.

Also in FIG. 12A, a vertically aligned cylinder 1222 (e.g., a hydraulic cylinder) includes a piston 1224 slidably disposed therein with a rod 1226 extending therefrom and communicating mechanically with the elevated mass 1212. The piston 1224 divides the interior of the cylinder 1222 into two chambers 1228, 1230 that are generally not in fluid communication with each other. The lower chamber 1230 of the cylinder 1222 communicates through valves 1242 and 1244 with pipes 1238, 1232 and other valves and pipes, as further described below.

In the state of operation shown in FIG. 12A, the system 1200 is releasing energy from storage. Valve 1204 is open and gas at high pressure is entering chamber 1216 of the pneumatic cylinder 1206. The gas pressure within chamber 1216 is exerting a force on piston 1208 that is, in the state of operation depicted, greater than the weight of elevated mass 1212. This force is transmitted from piston 1208 through rod 1210 to the mass 1212. Consequently, the piston 1208, rod 1210, and mass 1212 all are accelerating and moving upward. When a predetermined amount of high-pressure gas is admitted from reservoir 1202 into chamber 1216, valve 1204 is closed and the gas in chamber 1216 undergoes free expansion. The amount of high-pressure gas admitted may be measured such that the energy recoverable from a substantially isothermal expansion of that quantity and pressure of gas is substantially equal to the gravitational potential energy transferred to the elevated mass 1212 through a complete expansion.

In FIG. 12A, furthermore, the piston 1224 and rod 1226 of the hydraulic cylinder 1222 are also moving upward, drawn by the connection of the rod 1226 to the mass 1212. Valve 1242 is open. Valve 1244 is closed. As piston 1224 rises within the hydraulic cylinder 1222, near-atmospheric-pressure air or hydraulic fluid is vented from the top chamber 1228, and near-atmospheric-pressure hydraulic fluid is drawn out of fluid tank 1240, through pipe 1236, valve 1242, and pipe 1238 into the lower chamber 1230 of the cylinder 1222, filling chamber 1230 with hydraulic fluid. These are low-resistance flow paths and the amount of work entailed is negligible for the purposes of these schematic depictions.

In the state of operation of system 1200 depicted in FIG. 12A, some portion of the elastic potential energy of the compressed gas transferred from reservoir 1202 to the lower chamber 1216 of the pneumatic cylinder 1206 is being transformed into gravitational potential energy of position of the mass 1212. At the same time, fluid is being refilled without significant resistance into the lower chamber 1230 of the hydraulic cylinder 1222.

Figure 12B:
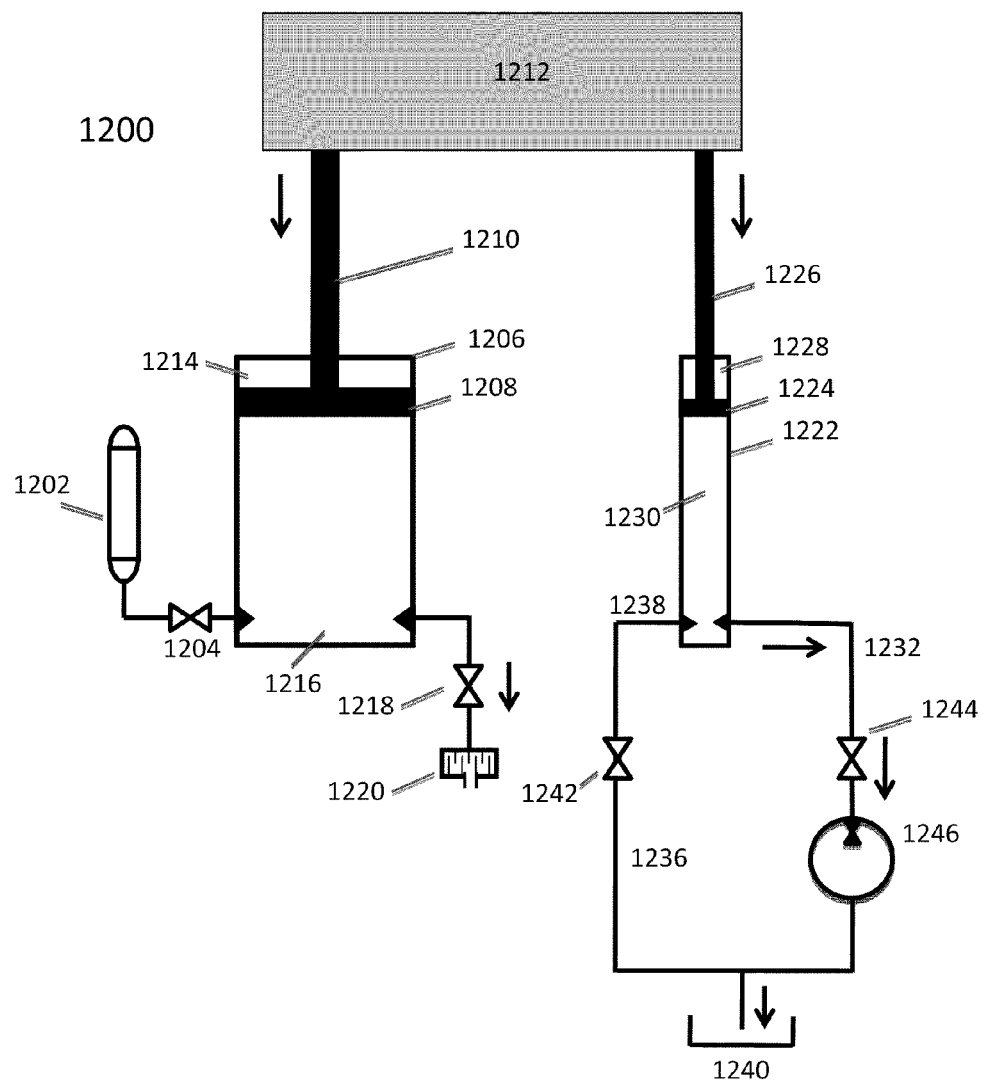
FIG. 12B depicts the system of FIG. 12A in a second state of operation.

FIG. 12B depicts another state of operation of the system 1200 also shown in FIG. 12A. In FIG. 12B, valve 1204 is closed, isolating reservoir 1202 from the rest of system 1200. Valve 1218 is open, allowing gas to pass from chamber 1216 of pneumatic cylinder 1206 to the environment (or, in another arrangement not shown, to an additional lower-pressure, larger-diameter pneumatic cylinder) through valve 1220 without resistance. Because gas may pass from chamber 1216 without resistance, piston 1208 and rod 1210 are free to move downward without resistance. The weight of mass 1212 is, consequently, borne substantially entirely by rod 1226 of the hydraulic cylinder 1222 and communicated thereby to piston 1224 and the hydraulic fluid within chamber 1230 of the hydraulic cylinder 1222.

In the state of operation depicted in FIG. 12B, valve 1242 is closed and valve 1244 is open. The hydraulic fluid in chamber 1230, pressurized by the force communicated to it by rod 1226 and piston 1224 from descending mass 1212, passes into pipe 1232 through valve 1244 into the inlet of a pump-motor 1246 (e.g., a hydraulic pump-motor), driving the pump-motor 1246. The pump-motor 1246, in turn, may drive an electrical generator (not depicted). Hydraulic fluid exits pump-motor 1246, and in the open hydraulic circuit shown, returns to tank 1240.

In the state of operation of system 1200 depicted in FIG. 12B, the gravitational potential energy of position of the mass 1212 is being transformed into work performed by the hydraulic pump-motor 1246 on its load (e.g., an electrical generator). At the same time, gas is being evacuated without significant resistance from the lower chamber 1216 of the pneumatic cylinder 1206.

It will be clear to any person familiar with the art of pneumatic and hydraulic cylinders that system 1200 depicted in FIGS. 12A and 12B may be operated in reverse, that is, to store energy rather than release it. The system 1200 is operated as an energy-storage system when energy is directed, e.g., from the hydraulic pump-motor 1246, thence to hydraulic cylinder 1222, thence to the elevated mass 1212, thence to the pneumatic cylinder 1206, and finally to the storage reservoir 1202.

Moreover, it will be clear to any person familiar with the art of pneumatic and hydraulic cylinders that multiple pneumatic cylinders, hydraulic cylinders, or pneumatic/hydraulic cylinders may be employed in place of the single pneumatic cylinder 1206 and single hydraulic cylinder 1222 depicted in FIG. 12A and in FIG. 12B. If more than one pneumatic cylinder is used, two or more pneumatic cylinders may be operated in parallel. Two or more pneumatic cylinders may also be operated in series, that is, with the high-pressure chamber of one pneumatic cylinder in fluid communication with the low-pressure chamber of the next cylinder in the series. Moreover, arrangements may be made to prevent excessive unbalancing of forces acting on the elevated mass 1212 or on the rods of the two or more cylinders employed: one such arrangement places pairs of pneumatic and/or hydraulic cylinders arranged equidistant from the central axis beneath each elevated mass so as to minimize torque (i.e., twisting force) applied to the mass and to the piston rods by the action of unbalanced forces.

Figure 13:
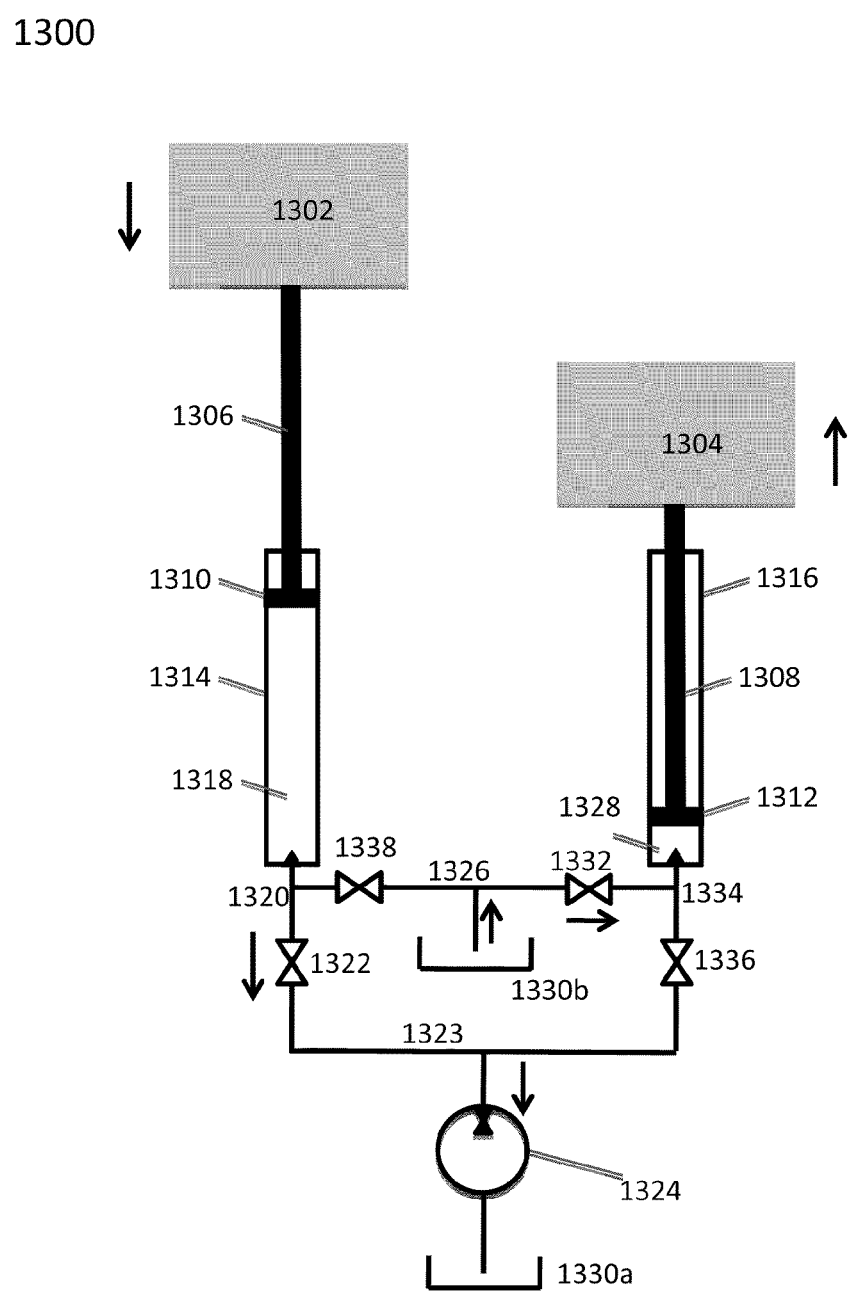
FIG. 13 is a schematic drawing of an energy storage and retrieval system that includes two elevated masses.

FIG. 13 is a schematic depiction of portions of a system 1300 that stores energy by compressing gas and releases it by expanding gas. Two elevated masses 1302 and 1304 rise and descend upon rods 1306 and 1308 attached to pistons 1310 and 1312 slidably disposed within two vertically aligned hydraulic cylinders 1314 and 1316. Two vertically aligned pneumatic cylinder assemblies (not shown in FIG. 13), each equivalent to the arrangement including cylinder 1206, piston 1208, rod 1210, storage reservoir 1202, valve 1204, valve 1218, and vent 1220 in FIG. 12A, also act upon the masses 1302 and 1306 (one pneumatic cylinder assembly per mass).

In the state of operation of system 1300 depicted in FIG. 13, the system 1300 is releasing energy from storage. Mass 1302 has been previously elevated and is now descending. Its weight is communicated by rod 1306 to piston 1310 and thence to the fluid contained in the lower chamber 1318 of cylinder 1314. This pressurized fluid is conveyed by a pipe 1320 through opened valve 1322 and pipe 1323 into the inlet of hydraulic pump-motor 1324, driving the pump-motor 1324. The pump-motor 1324, in turn, may drive an electrical generator (not depicted). Hydraulic fluid exiting the pump-motor 1324 is directed to hydraulic fluid tank 1330*a*. The fluid in chamber 1328 is, in this state of operation, essentially at atmospheric pressure as the weight 1304 is being lifted pneumatically: high-pressure air is being expanded within the pneumatic cylinder (not shown) aligned with hydraulic cylinder 1316 as in FIG. 12A and also acting upon mass 1304, exerting sufficient force to raise mass 1304. The lower chamber 1328 of cylinder 1316 is being refilled with near-atmospheric-pressure hydraulic fluid from tank 1330*b* through pipe 1326, open valve 1332, and pipe 1334. Valves 1336 and 1338 are closed in this state of operation. In some embodiments, tanks 1330*a*, 1330*b* are portions of the same larger tank of hydraulic fluid, rather than the discrete tanks depicted in FIG. 13.

A second state of operation of system 1300, not shown, is symmetrical with the state of operation shown in FIG. 13. In this second state of operation, mass 1304 descends, transferring its potential energy of position to the pump-motor 1324, while mass 1302 is elevated by high-pressure air being expanded within the pneumatic cylinder (not shown) aligned with hydraulic cylinder 1314 as in FIG. 12A. If the first and second states of operation are alternated continuously, there is no prolonged interval during which the hydraulic pump/motor 1324 is not supplied with hydraulic fluid at substantially constant pressure, and the hydraulic pump/motor 1324 runs continuously. A closed pneumatic-hydraulic accumulator or elevated-mass hydraulic accumulator (not shown) may be added to the system at pipe 1323 to supply energy to the hydraulic pump-motor 1324 during the brief interval when masses 1302 and 1304 have reached their limits of vertical motion and must reverse direction. Additionally, a second elevated-mass hydraulic accumulator (not shown) with a different operating pressure may be added to the system at pipe 1323 to supply energy to the hydraulic pump-motor 1324 during the brief interval when masses 1302 and 1304 have reached their limits of vertical motion and must reverse direction, such that one elevated-mass hydraulic accumulator works during compression mode and one during expansion mode.

Moreover, it will be clear to any person familiar with the art of pneumatic and hydraulic cylinders that multiple pneumatic cylinders, hydraulic cylinders, or pneumatic/hydraulic cylinders, in mechanical parallel or connected in fluid series, may be employed in association with each elevated mass 1302 or 1304 in place of the cylinders 1314 and 1316 depicted in FIG. 13. Moreover, as for the system shown in FIG. 12A, arrangements may be made to prevent excessive unbalancing of forces acting on the elevated masses 1302 and 1304.

In an alternative embodiment of the invention, in a system that stores energy by compressing gas and releases it by expanding gas, for example those depicted in FIG. 12A, FIG.

Figure 14:
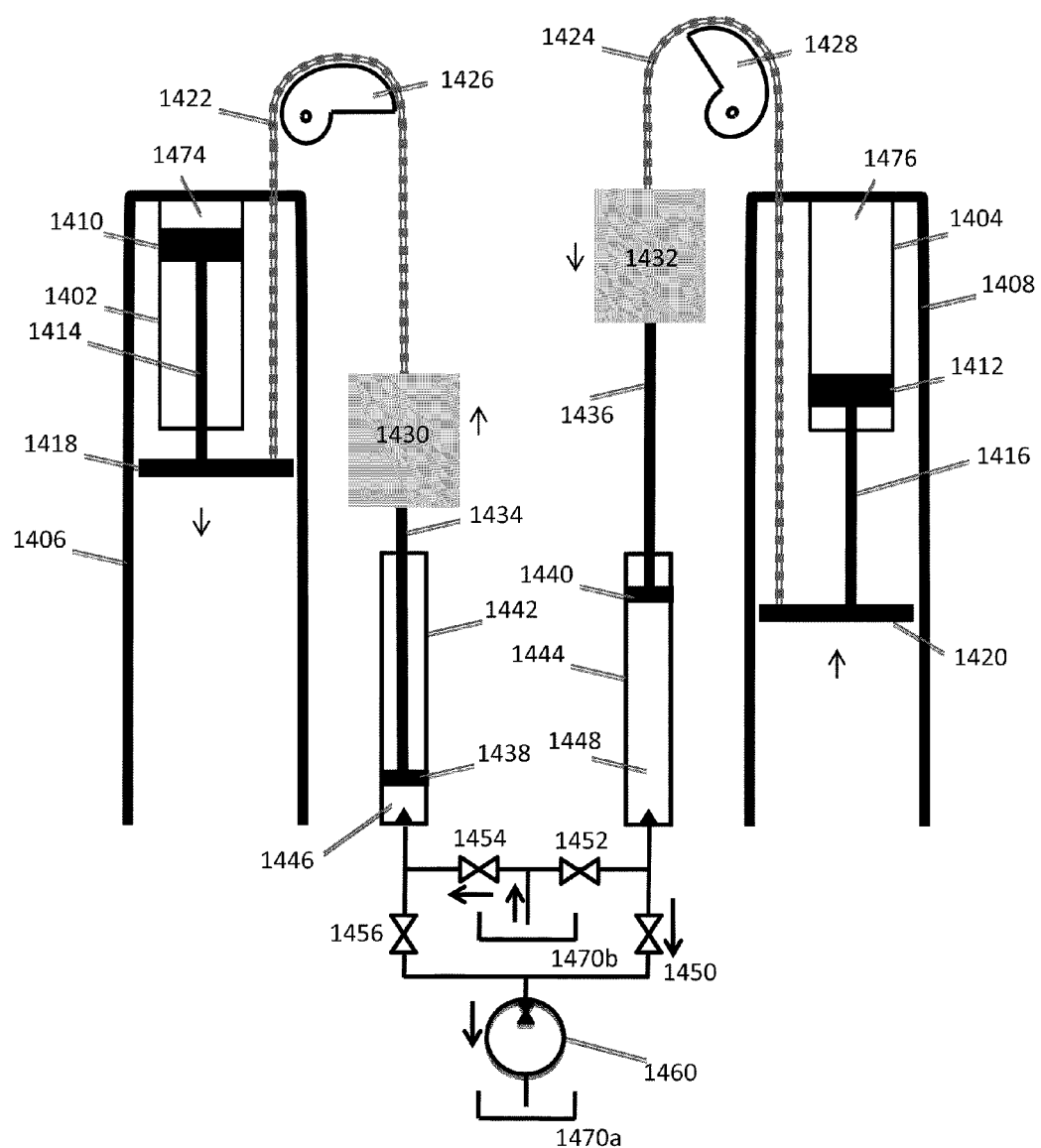
FIG. 14 is a schematic drawing of an energy storage and retrieval system that includes two elevated masses and employs nautilus gears for transmitting force.

12B, and FIG. 13, force may be communicated between each elevated mass and the one or more cylinders by means of a linkage, cable, chain, belt, or other mechanism that provides a varying gear ratio, such as the use of a cable over nautilus gear (i.e., a gear of nonuniform radius) acting as a pulley. FIG. 14 is a schematic depiction of a system 1400 including two cylinders 1402, 1404 (e.g., pneumatic cylinders) vertically aligned and affixed to two housings 1406, 1408. The cylinders 1402, 1404 contain pistons 1410, 1412 slidably disposed within cylinders 1402, 1404 and attached to rods 1414, 1416. Each rod 1414, 1416 is connected to a bar or coupling device 1418, 1420. Each bar is also coupled to a cable, chain, belt, or other connecting member 1422, 1424 that passes over a nautilus gear 1426, 1428. Each chain is attached at one end to an elevated mass 1430, 1432 each attached to a rod 1434, 1436 attached to a piston 1438, 1440 slidably disposed within a hydraulic cylinder 1442, 1444. Pressurized fluid from the lower chamber 1446, 1448 of each hydraulic cylinder 1442, 1444 is conducted via piping through a network of valves 1450, 1452, 1454, 1456 that direct flow through a hydraulic pump-motor 1460 or from one or more hydraulic fluid tanks 1470a, 1470b.

In the state of operation shown in FIG. 14, energy is being released from storage. Mass 1430 is ascending and mass 1432 is descending. Mass 1430 is being raised by force originating by the expansion of a quantity of high-pressure gas in the upper chamber 1474 of the pneumatic cylinder 1402, which is depressing the piston 1410, rod 1414, and bar 1418, pulling chain 1422 over the nautilus gear 1426. The varying gear ratio of the nautilus gear 1426 modifies the acceleration, velocity, and position profile of the lifted mass; however, the amount of work performed by the pneumatic cylinder 1402 on the mass 1430 remains the same as in the systems of FIGS. 12A, 12B, and 13. Hydraulic fluid at relatively low pressure from tank 1470b is passing through open valve 1454 and is entering the lower chamber 1446 of the hydraulic cylinder 1442 as the piston 1438 and rod 1434 of the cylinder 1442 are raised along with mass 1430.

Simultaneously, in the state of operation shown in FIG. 14, the weight of mass 1432 is forcing rod 1436 and piston 1440 downward, pressurizing the hydraulic fluid in the lower chamber 1448 of hydraulic cylinder 1444. This pressurized fluid is exiting the chamber 1448 and being directed through open valve 1450 to the inlet of the hydraulic pump-motor 1460. The pump-motor 1460, in turn, may drive an electrical generator (not depicted). Thus, energy from stored pressurized gas admitted to chamber 1474 of pneumatic cylinder 1402 is being transformed into potential energy of position of mass 1430 while potential energy of position of mass 1432 is being transformed into work performed by the hydraulic pump-motor 1460 on its load (e.g., a generator). The rod 1416 and piston 1412 of cylinder 1404 are being raised, but because the upper chamber 1476 of cylinder 1404 is vented (e.g., to the environment) by arrangements not depicted, cylinder 1404 presents no significant resistance to the motion of its rod 1416 and piston 1412.

In another state of operation, not depicted, the roles of the two masses 1430, 1432 and the cylinders 1402, 1404, 1442, 1444 associated with them are reversed: while mass 1432 ascends, gaining potential energy, mass 1430 descends, giving up potential energy. If these two states of operation are continually alternated, there will generally be no prolonged interval during which the hydraulic pump/motor 1460 is not supplied with hydraulic fluid at substantially constant pressure, and the hydraulic pump/motor will therefore run continuously.

The effective gear ratio of the nautilus gear 1426 or 1428 changes with angular displacement (rotation). Coupling the varying force exerted by pneumatic cylinder 1402 or 1404 in which gas is expanding to an elevated mass 1430 or 1432 by means of an appropriate nautilus gear 1426 or 1428 may decrease the range of variation of the power transmitted from the expanding gas to the mass 1430 or 1432. This has the advantage of lower maximum piston speeds and lower instantaneous air power; lower instantaneous air power allows for more time for heat transfer to occur and more nearly isothermal expansions and compressions within the air cylinders for a given heat transfer rate.

It will be clear to any person familiar with the art of pneumatic and hydraulic cylinders that multiple pneumatic cylinders, in mechanical parallel or connected in fluid series, may be employed in place of the cylinders 1402, 1404, 1442, 1444 depicted in FIG. 14 without entailing undue experimentation. It will also be clear that the system 1400 depicted in FIG. 14 may be reversed, so that instead of releasing energy from quantities of gas in chambers 1474 and 1476, energy is transferred to gas in those chambers, which may be conducted thence to storage reservoirs.

Generally, the systems described herein may be operated in both an expansion mode and in the reverse compression mode as part of a full-cycle energy storage system with high efficiency. For example, the systems may be operated as both compressor and expander, storing electricity in the form of the potential energy of compressed gas and producing electricity from the potential energy of compressed gas. Alternatively, the systems may be operated independently as compressors or expanders.

Systems in accordance with embodiments of the invention may utilize a substantially incompressible fluid and/or one or more pressurized reservoirs to minimize or eliminate dead space within one or more cylinder assemblies, as described in U.S. patent application Ser. Nos. 13/080,910 and 13/080,914, filed Apr. 6, 2011, the entire disclosure of each of which is incorporated herein by reference. As also described in these applications, embodiments of the invention may incorporate mechanisms for substantially preventing the flow of gas from the cylinder assembly into the heat-exchange components (e.g., heat exchangers, pumps, and/or pipes connected thereto and/or between the cylinder assembly and such components), and may thereby substantially prevent formation of dead space in the heat-exchange components. For example, various embodiments incorporate one or more check valves on the upstream side of one or more of the nozzles in the spray mechanism introducing heat-exchange fluid into a cylinder assembly.

In various embodiments of the invention, the heat-exchange fluid utilized to thermally condition gas within one or more cylinders incorporates one or more additives and/or solutes, as described in U.S. patent application Ser. No. 13/082,808, filed Apr. 8, 2011 (the '808 application), the entire disclosure of which is incorporated herein by reference. As described in the '808 application, the additives and/or solutes may reduce the surface tension of the heat-exchange fluid, reduce the solubility of gas into the heat-exchange fluid, and/or slow dissolution of gas into the heat-exchange fluid. They may also (i) retard or prevent corrosion, (ii) enhance lubricity, (iii) prevent formation of or kill microorganisms (such as bacteria), and/or (iv) include a defoaming agent, as desired for a particular system design or application.

Embodiments of the invention may also feature spray-mechanism designs described in U.S. patent application Ser. Nos. 13/105,986 and 13/105,988, filed May 12, 2011, the entire disclosure of each of which is incorporated herein by reference, e.g., spray mechanisms configured to fill substantially all of the volume of a cylinder with overlapping sprays of heat-exchange fluid. As also described in these applications, embodiments of the invention may control the number of nozzles of a spray mechanism actively spraying heat-exchange fluid based on, e.g., the pressure inside the cylinder assembly, rather than merely increasing a volumetric flow of heat-exchange fluid through the nozzles. Embodiments may utilize multiple groups of nozzles (of similar or different designs), more of which are utilized as the pressure within the cylinder assembly increases.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method for energy recovery, the method comprising:
    within a first cylinder assembly, expanding a gas to produce a pressure smoothly decreasing over a first pressure range;
    producing, (i) from pressures within the first pressure range and in reaction to the gas expansion and (ii) within a second cylinder assembly mechanically coupled to the first cylinder assembly, a hydraulic pressure varying over a second pressure range smaller than the first pressure range; and
    driving a motor via only the hydraulic pressure varying over the second pressure range,
    wherein the second cylinder assembly comprises a cylinder having a discretely variable effective piston area.

2. The method of claim 1, further comprising generating electricity with the driven motor.

3. The method of claim 1, wherein the motor has an optimal operating pressure range (i) smaller than the first pressure range and (ii) at least partially overlapping the second pressure range.

4. The method of claim 1, further comprising expanding gas within a third cylinder assembly mechanically coupled to a fourth cylinder assembly, the expansion in the third cylinder assembly translating fluid from the fourth cylinder assembly to drive the motor in alternation with the expansion in the first cylinder assembly.

5. The method of claim 1, further comprising, prior to the expansion, receiving the gas from a fluid source.

6. The method of claim 5, wherein the fluid source comprises a compressed-gas reservoir.

7. The method of claim 1, further comprising venting the expanded gas to atmosphere after expansion.

8. The method of claim 1, wherein gas is expanded to supply energy when an intermittent source of renewable energy is nonfunctional.

9. The method of claim 1, further comprising thermally conditioning the gas during expansion.

10. The method of claim 9, wherein the thermal conditioning comprises maintaining the gas at a substantially constant temperature during the expansion.

11. The method of claim 1, further comprising, prior to expanding the gas, storing energy originating from an intermittent renewable energy source of wind or solar energy in the form of the gas, wherein the gas is expanded when the intermittent renewable energy source is nonfunctional.

12. The method of claim 1, wherein (i) the second cylinder assembly comprises first and second separated compartments and (ii) during the gas expansion, the second compartment of the second cylinder assembly is selectively fluidly connected to, in turn, (a) a volume of hydraulic fluid at a pressure lower than a minimum pressure of the second pressure range and (b) the first compartment of the second cylinder assembly, thereby reducing the hydraulic pressure range to the second pressure range.

13. The method of claim 1, wherein the second cylinder assembly comprises a plurality of separate compartments, at least one of the compartments being deactivated during the gas expansion to reduce the hydraulic pressure range to the second pressure range.

14. The method of claim 13, wherein deactivating the at least one compartment comprises disconnecting the at least one compartment from the motor and connecting the at least one compartment to a volume of hydraulic fluid having a pressure lower than a minimum pressure of the second pressure range.

15. A method for energy recovery, the method comprising:
    expanding a gas to produce a pressure smoothly decreasing over a first pressure range;
    producing, from pressures within the first pressure range and in reaction to the gas expansion, a hydraulic pressure varying over a second pressure range smaller than the first pressure range; and
    driving a motor via only the hydraulic pressure varying over the second pressure range,
    wherein the hydraulic pressure produced in reaction to the gas expansion oscillates over the second pressure range.

16. A method for energy recovery, the method comprising:
    within a first cylinder assembly, expanding a gas to produce a pressure smoothly decreasing over a first pressure range;
    producing, (i) from pressures within the first pressure range and in reaction to the gas expansion and (ii) within a second cylinder assembly mechanically coupled to the first cylinder assembly, a hydraulic pressure varying over a second pressure range smaller than the first pressure range; and
    driving a motor via only the hydraulic pressure varying over the second pressure range,
    wherein (i) the second cylinder assembly comprises first and second separated compartments and (ii) during the gas expansion, the second compartment of the second cylinder assembly is selectively fluidly connected to, in turn, (a) a volume of hydraulic fluid at a pressure lower than a minimum pressure of the second pressure range and (b) the first compartment of the second cylinder assembly, thereby reducing the hydraulic pressure range to the second pressure range.

17. The method of claim 16, further comprising thermally conditioning the gas during expansion.

18. The method of claim 17, wherein the thermal conditioning comprises maintaining the gas at a substantially constant temperature during the expansion.

19. A method for energy recovery, the method comprising:
    within a first cylinder assembly, expanding a gas to produce a pressure smoothly decreasing over a first pressure range;
    producing, (i) from pressures within the first pressure range and in reaction to the gas expansion and (ii) within a second cylinder assembly mechanically coupled to the first cylinder assembly, a hydraulic pressure varying over a second pressure range smaller than the first pressure range; and
    driving a motor via only the hydraulic pressure varying over the second pressure range,
    wherein the second cylinder assembly comprises a plurality of separate compartments, at least one of the compartments being deactivated during the gas expansion to reduce the hydraulic pressure range to the second pressure range.

20. The method of claim 19, wherein deactivating the at least one compartment comprises disconnecting the at least one compartment from the motor and connecting the at least one compartment to a volume of hydraulic fluid having a pressure lower than a minimum pressure of the second pressure range.

* * * * *